(12) United States Patent
Aoyama et al.

(10) Patent No.: US 7,725,412 B2
(45) Date of Patent: May 25, 2010

(54) IDENTIFYING TEMPORAL SEQUENCES USING A RECURRENT SELF ORGANIZING MAP

(75) Inventors: Kazumi Aoyama, Saitama (JP); Kohtaro Sabe, Tokyo (JP); Hideki Shimomura, Kanagawa (JP)

(73) Assignee: Sony Corporation, Tokyo (JP)

( * ) Notice: Subject to any disclaimer, the term of this patent is extended or adjusted under 35 U.S.C. 154(b) by 434 days.

(21) Appl. No.: 11/732,644

(22) Filed: Apr. 4, 2007

(65) Prior Publication Data

US 2007/0280006 A1 Dec. 6, 2007

(30) Foreign Application Priority Data

Apr. 6, 2006 (JP) ............................. 2006-105544

(51) Int. Cl.
*G06F 15/00* (2006.01)
(52) U.S. Cl. .......................................... 706/20; 706/30
(58) Field of Classification Search ................... 706/12; 365/189.15
See application file for complete search history.

(56) References Cited

U.S. PATENT DOCUMENTS

| | | | | | |
|---|---|---|---|---|---|
| 5,307,444 | A | * | 4/1994 | Tsuboka | 706/20 |
| 5,724,487 | A | * | 3/1998 | Streit | 706/25 |
| 5,870,729 | A | * | 2/1999 | Yoda | 706/26 |
| 6,321,216 | B1 | * | 11/2001 | Otte et al. | 706/21 |
| 6,608,924 | B2 | * | 8/2003 | Soliman | 382/157 |
| 6,965,885 | B2 | * | 11/2005 | Gutta et al. | 706/26 |
| 7,006,205 | B2 | * | 2/2006 | Agarwal et al. | 356/72 |

(Continued)

FOREIGN PATENT DOCUMENTS

JP 11-126198 5/1999

(Continued)

OTHER PUBLICATIONS

Barreto, Guilherme de A., Aluizio F. R. Araújo, Stefan C. Kremer. A Taxonomy for Spatiotemporal Connectionist Networks Revisited: The Unsupervised Case. Neural Comutation 2003 15:6, 1255-1320.*

(Continued)

*Primary Examiner*—David R Vincent
*Assistant Examiner*—David H Kim
(74) *Attorney, Agent, or Firm*—Frommer Lawrence & Haug LLP; William S. Frommer; Ellen Marcie Emas

(57) ABSTRACT

A data processing device for processing time-sequence data includes a data extracting unit extracting time-sequence data for a predetermined time unit from time-sequence data; and a processing unit obtaining scores for nodes of an SOM configured from multiple nodes provided with a spatial array configuration, the scores showing applicability to time-sequence data for a predetermined time unit thereof. The node with the best score is determined to be the winning node which is the node most applicable. The processing unit obtains scores as to the time-sequence data for one predetermined time unit, regarding a distance-restricted node wherein distance from the winning node as to the time-sequence for a predetermined time unit immediately preceding the time-sequence data of one predetermined time unit is within a predetermined distance. The distance-restricted node with the best the score is determined to be the winning node.

5 Claims, 51 Drawing Sheets

U.S. PATENT DOCUMENTS

| | | | |
|---|---|---|---|
| 7,133,855 B2 * | 11/2006 | Ueda et al. | 706/20 |
| 7,171,269 B1 * | 1/2007 | Addison et al. | 607/7 |
| 7,296,005 B2 | 11/2007 | Minamino et al. | |
| 7,463,927 B1 * | 12/2008 | Chaouat | 607/46 |
| 7,496,561 B2 * | 2/2009 | Caudill et al. | 707/3 |
| 2002/0129015 A1 * | 9/2002 | Caudill et al. | 707/6 |
| 2003/0140019 A1 * | 7/2003 | Gutta et al. | 706/15 |
| 2006/0164997 A1 * | 7/2006 | Graepel et al. | 370/241 |

FOREIGN PATENT DOCUMENTS

| | | |
|---|---|---|
| JP | 2005-174040 | 6/2005 |
| JP | 2006-162898 | 6/2006 |

OTHER PUBLICATIONS

Barreto, G. de. A.; Araujo, A.F.R., "A self-organizing NARX network and its application to prediction of chaotic time series," Neural Networks, 2001. Proceedings. IJCNN '01. International Joint Conference on , vol. 3, No., pp. 2144-2149 vol. 3, 2001.*

Carpinteiro, O.A.S. A Hierarchical Self-orginising Map Model for Sequence Recognition. Pattern Analysis & Applications. vol. 3, No. 3. pp. 279-287. Sep. 20, 2000.*

Fausett, D.W., "Strictly local backpropagation," Neural Networks, 1990., 1990 IJCNN International Joint Conference on , vol., No., pp. 125-130 vol. 3, Jun. 17-21, 1990.*

James, Daniel L., Risto Miikkulainen. SARDNET: A Self-Organizing Feature Map for Sequences. Advances in Neural Information Processing Systems 7. MIT Press. 1995, pp. 577-584.*

Koskela, T.; Varsta, M.; Heikkonen, J.; Kaski, K., "Temporal sequence processing using recurrent SOM," Knowledge-Based Intelligent Electronic Systems, 1998. Proceedings KES '98. 1998 Second International Conference on , vol. 1, No., pp. 290-297 vol. 1, Apr. 21-23, 1998.*

McQueen, T. A., A. A. Hopgood, J. A. Tepper and T. J. Allen. A Recurrent Self-Organizing Map for Temporal Sequence Processing. Applications and Science in Soft Computing, A. Lotfi & J.Garibaldi (eds.), Advances in Soft Compuing Series, Springer 2003, pp. 3-8.*

Somervuo, P. and Kohonen, T. 1999. Self-Organizing Maps and Learning Vector Quantization forFeature Sequences. Neural Process. Lett. 10, 3 (Oct. 1999), 151-159.*

Varsta, Heikkonen, Lamp. Temporal Kohonen Map and the Recurrent Self-Organizing Map: Analytical and Experimental Comparison. Neural Processing Letters. vol. 13. No. 3. pp. 237-251, Jun. 1, 2001.*

Voegtlin, T. 2002. Recursive self-organizing maps. Neural Netw. 15, 8-9 (Oct. 2002), 979-991.*

Hammer, B., Micheli, A., Sperduti, A., and Strickert, M. 2004. Recursive self-organizing network models. Neural Netw. 17, 8-9 (Oct. 2004), 1061-1085.*

Araújo, A. F. and Barreto, G. d. 2002. A Self-Organizng Context-Based Approach to the Tracking of Multiple Robot Trajectories. Applied Intelligence 17, 1 (Jun. 2002), 101-119.*

Syuji Kaneko, "Representing the bifurcation structure of BVP neuron model onto a self-organizing map by using modular network SOM (mnSOM)", Institute of Electronics, Information and Communication Engineers technical study reports vol. 104 No. 471, Japanese corporate judicial person Institute of Electronics, Information and Communication Engineers, Nov. 19, 2004, vol. 104.

* cited by examiner

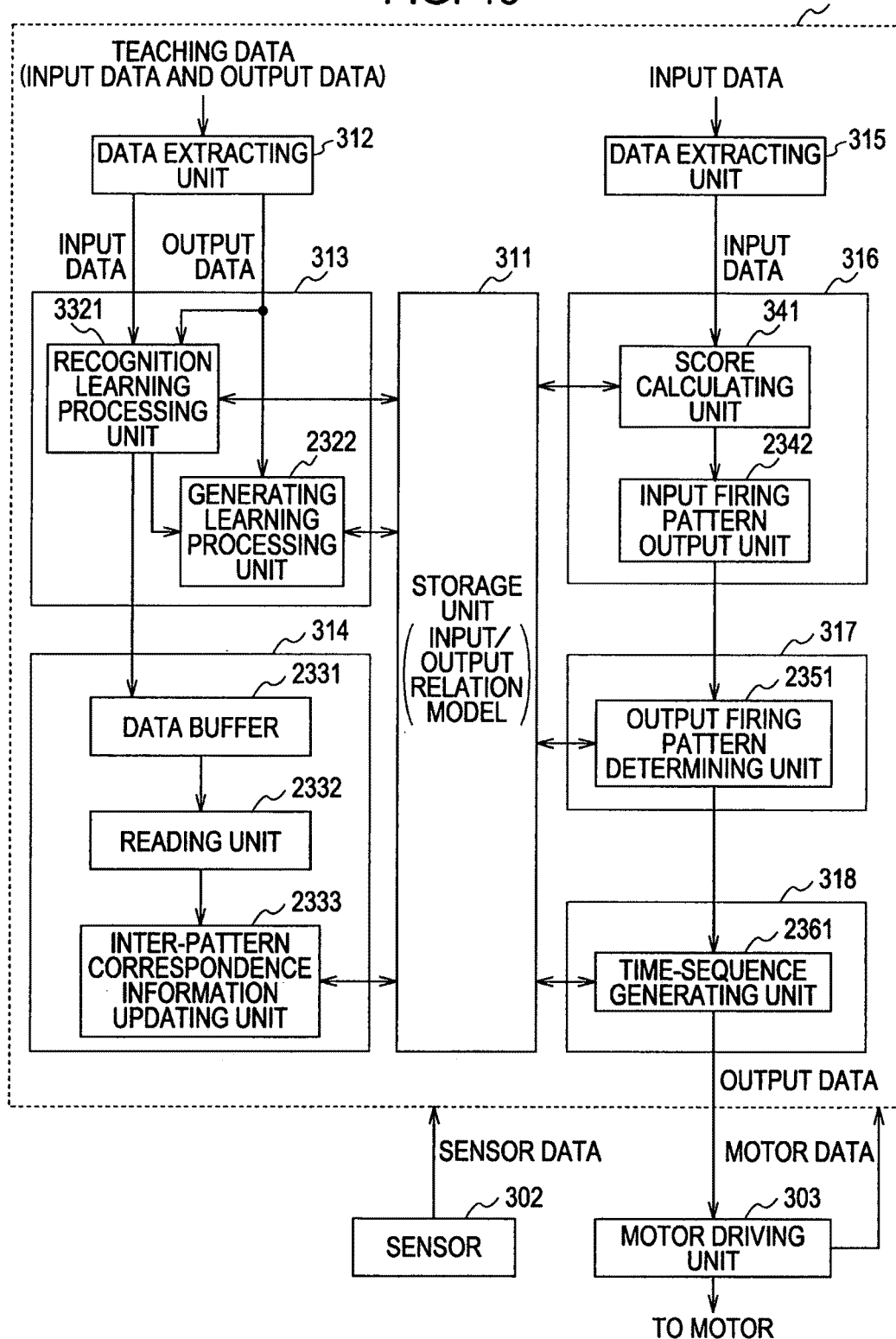

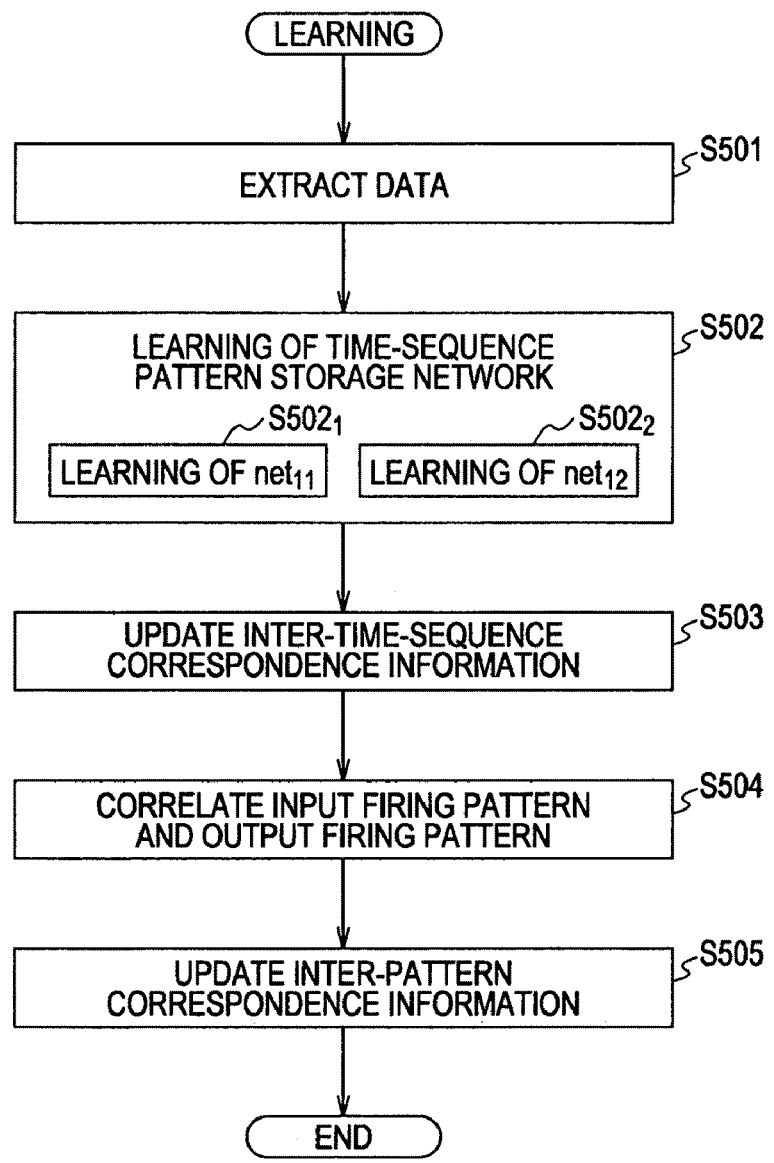

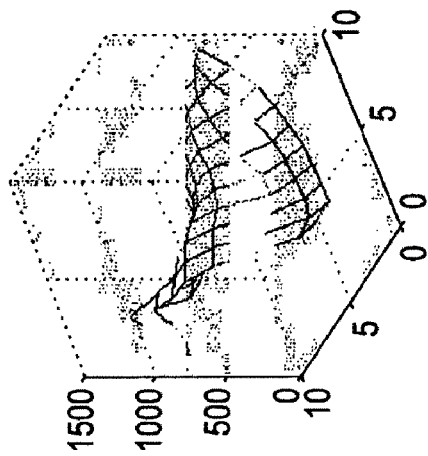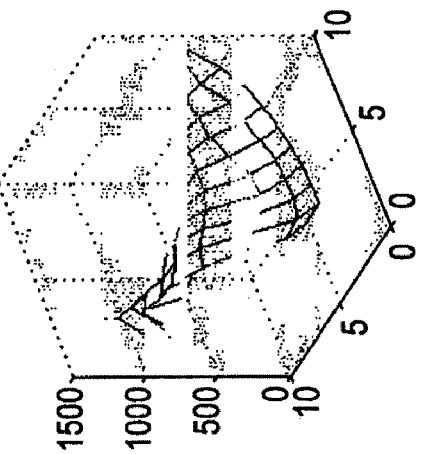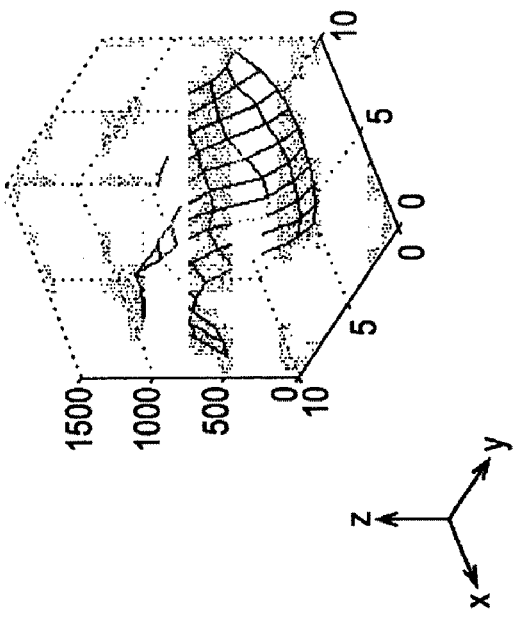

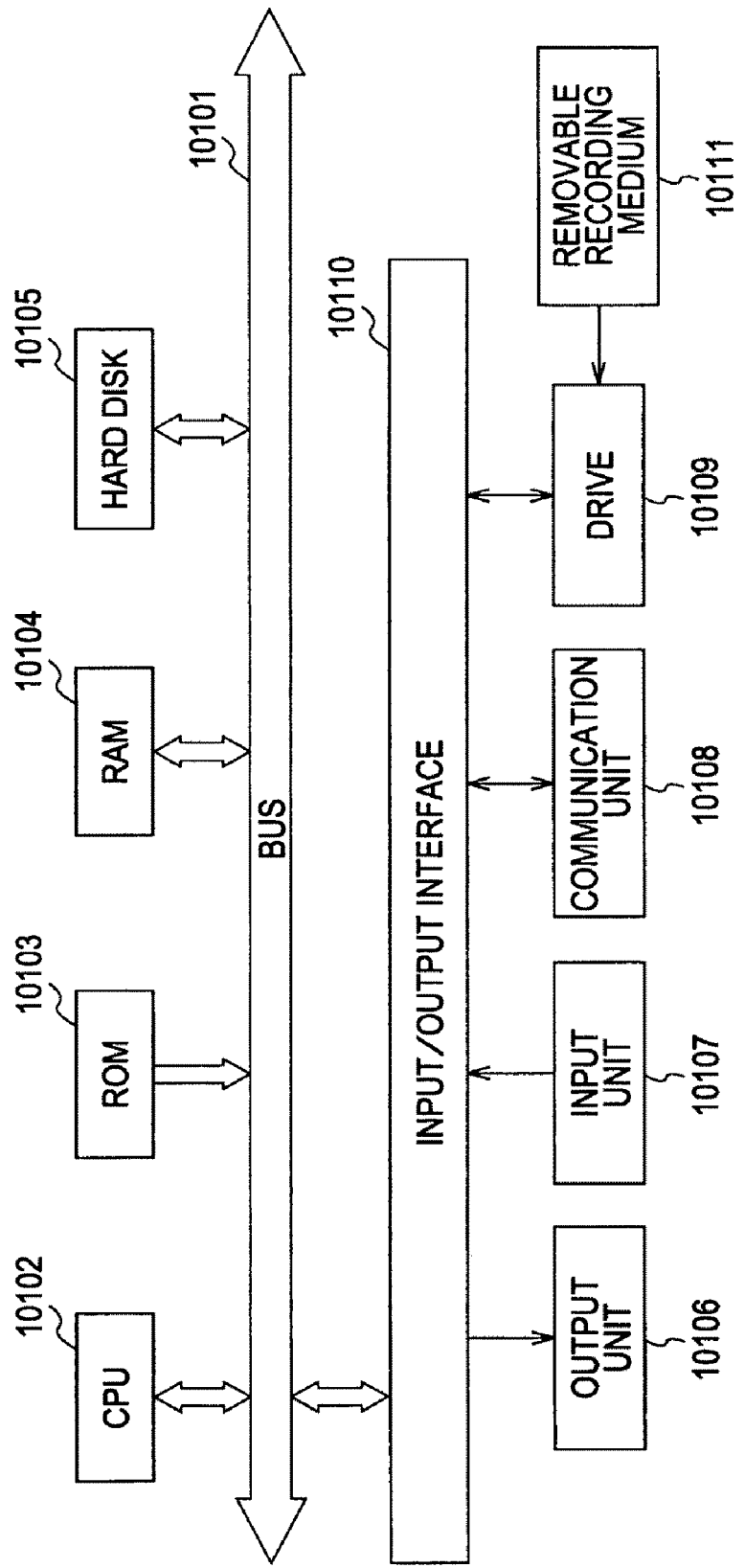

IDENTIFYING TEMPORAL SEQUENCES USING A RECURRENT SELF ORGANIZING MAP

CROSS REFERENCES TO RELATED APPLICATIONS

The present invention contains subject matter related to Japanese Patent Application JP 2006-105544 filed in the Japanese Patent Office on Apr. 6, 2006, the entire contents of which are incorporated herein by reference.

BACKGROUND OF THE INVENTION

1. Field of the Invention

The present invention relates to a data processing device, a data processing method, and a program, and more particularly relates to a data processing device, a data processing method, and a program to lessen the burden of processing by a robot or the like, for example.

2. Description of the Related Art

Forward models and inverse models can be applied to realize robots which autonomously perform tasks, for example.

FIG. 1 illustrates the concept of forward models and inverse models. Let us say that there is certain input data serving as time-sequence data (data in time-sequence), and there is an object of control, which outputs output data serving as other time-sequence data, that is provided for the input data. Here, while detailed information relating to the object of control is unknown (i.e., while the interior of the object of control is unknown), the input data provided to the object of control, and the output data obtained from the object of control with regard to the input data, can be observed.

The physical value of the input data provided to the object of control and the output data obtained from the object of control with regard to the input data may be large or small, as long as it is observable. Also, any object (thing) will work as long as input data can be provided thereto and further output data can be obtained as to the input data.

Accordingly, various objects can be the object of control, examples of which include a ball, musical instrument, automobile, gas stove, to mention just a few. For example, in the case of a ball, applying (providing) force as input data yields the position and speed of the ball as output data which changes as to the input data. Also, in the case of an automobile, operating the steering wheel, gas pedal, brake, etc., i.e., providing operations thereof, yields the position and speed of the automobile as output data which changes as to the input data. Further, in the case of a gas stove, operating the size of the flame as input data yields room temperature as output data which changes as to the input data.

It should be noted that the term "data" as used in "input data", "output data", later-described "control data", and so forth, throughout the present Specification, and the drawings, claims, and all other documents attached thereto, is not restricted to the concept of structured or formatted information; rather, this term encompasses all forms of energy and force applied to the object or effected thereby, as long as such can be physically observed, measured, and/or quantified. A specific example of the scope of such input would be to say that the action of operating a valve, for example, in the above-described gas stove, to change the size of the flame would constitute such input data, but the intent of operator to do so would not. More specifically, any physical action of which the physical value is meaningful to, or effectually acts upon the object, is what is meant by this term, and accordingly, verbal instructions given to the gas stove would not be included in this scope if the gas stove is only operable by a twist knob for example, but would be included in this scope if the gas stove were provided with, for example, a microphone, speech recognition functions, command analysis functions, and a mechanism to execute physical action of changing the flame size so as to carry out the verbal command issued by the user. On the other hand, in a rather unlikely case wherein the input data to be applied is to physically throw the gas stove a certain distance, for example, the force applied thereto to that end would be the input data. In this way, the intent, or motive, behind the input data is not unrelated to what constitutes the input data; however, the intent or motive is never part of the input data. Moreover, even in a case wherein control of the object is realized by electroencephalography, such as technology being developed by MIT Media Lab Europe wherein a device or computer can be controlled wirelessly directly from the human brain, the output from the headset would serve as the input data to the object of control, while the intent or motive of the user would not. The scope of the term "data" as used in the present specification is to be thus understood.

With an arrangement wherein input data is thus provided to an object of control and output data is obtained thereby, the modeled object of control is a forward model.

With a forward model, upon inputting input data (upon input data being provided), an estimation value of output data obtained from the object of control as to that input data is output. Accordingly, with a forward model, output data which would be obtained from the object of control as to input data can be predicted even without providing the object of control with actual input data.

On the other hand, an inverse model is a model wherein a target value of output data obtained from the object of control is determined, and the input data to be provided to the object of control so as to obtain the output data of that target value is estimated. While a forward model can be viewed as mapping input data to output data, an inverse model is the opposite thereof.

Hereinafter, the input data to be provided to the object of control so as to obtain output data of the target value with an inverse model will be referred to as "control data" as appropriate.

Forward models and inverse models such as described above can be applied to robots, more particularly to the configuration of robots.

Let us say that a robot has a microphone and camera so as to be capable of input of audio (sound) data and image data, and also has a speaker and actuator (motor) so as to be capable of outputting audio (audio data) and moving an arm by driving the motor following motor data (motor signals).

With such a robot, a traditional approach for outputting audio data as output data or moving a desired arm as output data, in response to input data such as audio data or image data, is to use an audio recognition device or image recognition device and to program (design) beforehand what sort of audio data should be output or what sort of motor data should be output in response to recognition results of the audio data or image data input to the robot.

Conversely, using a forward model enables a robot which outputs desired audio data as output data or moving a desired arm as output data, in response to input data such as audio data or image data to be envisioned as an object of control, and the actual robot to be configured as a forward model of the robot envisioned as the object of control (hereinafter referred to as "anticipated robot" as suitable), as shown in FIG. 2. That is to say, a robot can be configured as a forward model of the envisioned robot, if an actual robot can be made to learn the relation between input data and output data to and from the anticipated robot.

Specifically, input data such as the audio data and image data to be input to the anticipated robot, and output data such as audio data and motor data to be output in response to the respective input data, are prepared beforehand as a set, and provided to an actual robot. If the actual robot can obtain a forward model of the anticipated robot estimating (i.e., outputting) output data corresponding to the input data, using only the set of input data and output data externally provided thereto (hereinafter referred to as "teaching data" as suitable), then output data such as desired audio data and motor data and the like can be output in response to input data such as audio data and image data and the like which is actually input.

Also, using an inverse model enables arm control equipment for controlling a robot arm, as the object of control, as shown in FIG. 3.

That is to say, let us say that there is a robot arm here which is moved by a motor which performs driving according to motor data, which is input data, and that the position of the tip of the arm changes accordingly. Further, let us say that, with the center of gravity of the robot as the point of origin thereof, the position of the tip of the arm can be represented with the coordinates (x, y, z) in a three-dimensional coordinate system, in which the forward (frontal) direction of the robot is the x axis, the sideways direction of the robot is the y axis, and the vertical direction thereof is the z axis. In this case, the motor performs driving in accordance with the motor data so as to further change the position of the tip of the arm, such that the tip of the arm traces a certain path, in accordance with the three-dimensional coordinate system. Note that here, the sequence of coordinates of the path which the tip of the arm traces (tip position path) will be referred to as "tip position path data".

In order to cause the arm to trace a desired tip position path, i.e., in order to obtain output of desired tip position path data as the output data, motor data whereby the motor performs driving such that the arm traces such a tip position path needs to be provided to the motor as input data.

Now, if an inverse model can be obtained for estimating motor data serving as input data (control data) whereby certain tip position path data can be obtained as target values, using only teaching data made up of the set of motor data serving as input data and tip position path data serving as output data due to the motor data having been supplied to the motor, the inverse model can be used for arm control equipment for determining motor data corresponding to tip position path data which is the target value.

With arm control equipment serving as an inverse model for an arm, inputting tip position path data as input data to the robot allows the robot to use the arm control equipment to determine the corresponding motor data (control data). The robot then drives the motor thereof following the motor data, whereby the arm of the robot moves so as to trace a path corresponding to the tip position path data which is the input data.

Thus, if a forward model or inverse model can be obtained using only the set of input data and output data (i.e., teaching data), a robot which outputs output data corresponding to the respective input data can be readily configured, using forward and inverse models.

As for a method for obtaining such a forward model or inverse model as described above, there is modeling using a linear system.

With modeling using a linear system, as shown in FIG. 4 for example, with input data to the object of control at point-in-time t as u(t) and output data thereat as y(t), the relation between the output data y(t) and input data u(t), i.e., the object of control is approximated as a linear system obtained from Expression (1) and Expression (2)

$$x(t+1)=Ax(t)+Bu(t) \quad (1)$$

$$y(t)=Cx(t) \quad (2)$$

Here, x(t) is called a state variable of the linear system at the point-in-time t, with A, B, and C being coefficients. To facilitate description here, if we say that the input data u(t) and output data y(t) are one-dimensional vectors (scalar) and the state variable x(t) an n'th dimensional vector (wherein n is an integer value of 2 or higher in this case), A, B, and C are each matrices of constants obtained from an n×n matrix, n×1 matrix, and 1×n matrix, respectively.

With modeling using a linear system, the matrices A, B, and C are determined such that the relation between the observable input data u(t) and the output data y(t) observed when the input data u(t) is provided to the object of control satisfies the Expression (1) and Expression (2), thereby yielding a forward model of the object of control.

However, modeling using a linear system is insufficient for complicated objects of control, i.e., is insufficient for modeling an object of control having non-linear properties, for example.

That is to say, an actual object of control is complicated, and often has non-linear properties, but modeling the object of control by approximating a simple linear system results in great estimation error in the output data estimated as to the input data in a forward model or input data (control data) estimated as to the output data in an inverse model, so estimation with high precision is difficult.

Accordingly, as for a method to obtain a forward model or inverse model as to an object of control which has non-linear properties, there is a method for using a neural network to learn teaching data, i.e., a set of input data provided to the object of control and output data observed from the object of control when the input data is provided thereto. A neural network is a network configured by mutually connecting man-made elements imitating neurons (neurons), and can learn the relation between externally provided teaching data, i.e., the relation between input data and output data.

However, in order to suitably model the object of control with a neural network, there is the need for the size of the neural network to be great according to the complexity of the object of control. Increasing the size of the neural network markedly increases the time necessary for learning, and also stable learning becomes more difficult. This also holds true in the event that the order of dimension of the input data or output data is great.

On the other hand, in the event of obtaining a forward model or inverse model using only the set of input data and output data (teaching data), there is the need for learning to be performed using the teaching data, and for whether or not the teaching data falls under one of several patterns to be recognized. That is to say, there is the need for patterns of input data and output data serving as teaching data to be learned and recognized.

The technique for learning and recognizing patterns is generally called pattern recognition, and learning under pattern recognition can be classified into learning with a tutor (supervised learning) and learning without a tutor (unsupervised learning).

Supervised learning is a method wherein information is provided regarding to which class learning data of each pattern belongs (called "true label"), and learning data belonging to a pattern is learnt for each pattern, with many learning methods using neural networks or the HMM (Hidden Markov Model) having been proposed.

FIG. 5 illustrates an example of supervised learning.

With supervised learning, learning data to be used for learning is provided beforehand in anticipated categories (classes), such as categories of phonemes, phonetic categories, word categories, and so forth, for example. For example, in a case of learning audio data of voices "A", "B", and "C", audio data for a great number of each of "A", "B", and "C" is prepared.

On the other hand, anticipated categories are prepared by category for models used for learning as well (models by which learning data of each category is learnt). Now, models are defined by parameters. For example, HMMs or the like are used as a model for learning audio data. An HMM is defined by the probability of state transition from one state to another state (including the original state), an output probability density function representing the probability density of observed values output from the HMM, and so forth.

With supervised learning, learning of the models of each category (class) is performed using only the learning data of that category. That is to say, in FIG. 5, learning of the category "A" model is performed using only learning data of the category "A", learning of the category "B" model is performed using only learning data of the category "B", and learning of the category "C" model is performed using only learning data of the category "C".

With supervised learning, there is the above-described need to use learning data of each category to perform learning of a model of that category, so learning data is prepared for each category, learning data of that category is provided as to model learning for the category, and thus a model is obtained for each category. Consequently, accordingly supervised learning, a template (a model of a class (category) represented by the true label) can be obtained for each class, based on the true label.

At the time of recognition, a template which most closely matches data which is the object of recognition (a template with the greatest likelihood, or a template with the smallest distance or error) is obtained, and the true label of that template is output as the recognition result.

On the other hand, unsupervised learning is learning performed in a state wherein no true label is provided to learning data of each pattern, and is a learning method which uses a neural network or the like, for example. Unsupervised learning differs greatly from supervised learning in that no true label is provided.

Now, pattern recognition can be viewed as quantization of a signal space where data (signals) to be recognized by the pattern recognition is observed. Particularly, pattern recognition in cases wherein the data to be recognized is vector data may be called vector quantization.

With learning of vector quantization (codebook generation), a representative vector corresponding to a class (referred to as "centroid vector") is situated in the signal space where the data to be recognized is observed.

A representative technique for unsupervised learning of vector quantization is the K-means clustering method. With the K-means clustering method, in an initial state, centroid vectors are randomly situated, a vector serving as learning data is assigned to a centroid vector at the closest distance, and the centroid vectors are updated by an average vector of the learning data assigned to the centroid vectors, with this process being repeatedly performed. Note that a group of centroid vectors is called a codebook.

Now, the method for accumulating a great number of learning data and using all to perform learning is called "batch learning"; K-means clustering is classified in batch learning. As opposed to batch learning, learning wherein each time learning data is observed the learning data is used to perform learning, thereby updating parameters (centroid vector components, output probability density functions defining an HMM, etc.) a little at a time is called "on-line learning".

A known form of on-line learning is learning with SOM (self-organization map), proposed by Teuvo Kohonen. With learning with SOM, the weight of an input layer and output layer of a SOM is gradually corrected (updated) by on-line learning.

That is to say, in a SOM, an output layer has multiple nodes, with weight vectors provided to each node of the output layer. In a case wherein the weight vector is a centroid vector, vector quantization learning can be performed.

Specifically, with nodes in an output layer of a SOM, a node of which the distance between a weight vector and a vector serving as the learning data is the closest is determined to be the winning node matching that vector best, and the weight vector of the winning node is updated so as to be closer to the vector serving as the learning data. Further, weight vectors nearby the winning node are also updated so as to be closer to the learning data. Consequently, as learning progresses, nodes with similar weight vectors are placed so as to be closer to one another on the output layer, and dissimilar nodes distant one from another. Accordingly, a map is configured on the output layer, corresponding to a pattern included in the learning data, as if it were. This sort of learning wherein similar nodes (nodes of which weight vectors are similar) are grouped close to one another as learning processes so as to configure a map corresponding to a pattern included in the learning data is referred to as "self-organizing", or "self organization".

Now, with K-means clustering, only the vector closest to the learning data is updated, so the updating method thereof is called "WTA (winner-take-all)". On the other hand, learning with a SOM is such that not only the weight vector of the nearest node to the learning data (winning node) but also weight vectors of nodes nearby the winning node are also updated, so the updating method thereof is called "SMA (soft-max adaptation)". It is known that while WTA learning tends to fall into localized learning, the problem of falling into localized learning can be improved with SMA learning.&

For more about SOM, see "Self-Organization Map" by Teuvo Kohonen, published by Springer Japan, for example.

Now, research is being performed on a framework for a robot to acquire a structure for perceptive actions through the actions of the robot itself, so as to make the behavior (actions) of the robot in the real world more natural. Note that "perceptive actions" means that a robot or the like perceives (recognizes) an external state (including the state of the robot itself) and acts according to the results of the perception.

In order to cause a robot to perform perceptive actions, there is the need to obtain appropriate motor data to serve as motor data supplied to the motor driving the robot, as to sensor data which a sensor detecting the external state outputs, for example.

Generally, sensor data output from a sensor, and motor data supplied to a motor, are both continuous time-sequence data. Also, robots which perform perceptive actions in the real word need to handle data with a great number of dimensions for the sensor data and motor data. Moreover, the behavior of sensor data and motor data handled by the robot is complex, and cannot readily be modeled with a linear system.

Now, the present assignee has already proposed a method for using a time-sequence pattern storage network configured of multiple nodes having a time-sequence pattern model representing a time-sequence pattern, which is a pattern of time-sequence data such as sensor data or motor data, to perform self-organizing learning of time-sequence data such as sensor data and motor data which are time-sequence systems of multi-dimensional vectors, and further to joint the nodes of a time-sequence pattern storage network which has learned time-sequence data which is input data with those of a time-sequence pattern storage network which has learned time-sequence data which is output data, so as to perceive an external state, and generate output data, based on input data, corresponding to actions the robot should take based on the results of perception (e.g., see Japanese Unexamined Patent Application Publication No. 2004-353382).

Now, a time-sequence pattern storage network is common with known SOMs in that it is configured of multiple nodes and can perform learning, and accordingly can be said to be a type of SOM. However, a time-sequence pattern storage network differs from known SOMs in that the nodes have time-sequence pattern models and that time-sequence patterns are held in storage structures of the time-sequence pattern models.

SUMMARY OF THE INVENTION

Note that with the previously proposed method, learning of a time-sequence pattern storage network is performed using time-sequence data serving as input data or output data, and the learning thereof has been performed as follows.

That is to say, with the learning of the time-sequence pattern storage network, nodes seek a score expressing the applicability of the input data or output data serving as the time-sequence data, the node with the highest score thereof is determined to be the winning node serving as the node most applicable to the time-sequence data, and the time-sequence pattern storage network is updated in a self-organizing manner based on the winning node thereof, thereby performing learning.

Accordingly, with the learning of the time-sequence pattern storage network, in order to determine the winning node calculating the scores for all nodes, configuring the time-sequence pattern storage network has been necessary. Therefore, as the number of nodes increase, the burden of processing score calculations also increases accordingly.

The present invention takes into consideration such a situation, and enables the processing burden to be lessened.

A data processing device according to an embodiment of the present invention is a data processing device for processing time-sequence data including: data extracting means for extracting time-sequence data for a predetermined time unit from time-sequence data; and processing means for obtaining scores for nodes of an SOM (Self-Organizational Map) configured from a plurality of nodes provided with a spatial array configuration, the scores showing the applicability to time-sequence data for a predetermined time unit of the nodes, wherein the node with the best score thereof is determined to be the winning node which is the node most applicable to time-sequence data for a predetermined time unit; the processing means obtaining scores as to the time-sequence data for one predetermined time unit, regarding a distance-restricted node wherein the distance from the winning node as to the time-sequence for a predetermined time unit immediately preceding the time-sequence data of one predetermined time unit is within a predetermined distance; and wherein, of the distance-restricted nodes, the node with the best the score is determined to be the winning node as to the time-sequence data for the one predetermined time unit.

A data processing method, or a program, according to an embodiment of the present invention, is a data processing method of the data processing device for processing time-sequence data, or a program to cause a computer to execute the data processing wherein time-sequence data is processed, includes the steps of: data extracting for extracting time-sequence data for a predetermined time unit from time-sequence data; and processing for obtaining scores for nodes of an SOM (Self-Organizational Map) configured from a plurality of nodes provided with a spatial array configuration, the scores showing the applicability to time-sequence data for a predetermined time unit of the nodes, wherein the node with the best score thereof is determined to be the winning node which is the node most applicable to time-sequence data for a predetermined time unit; wherein, in the processing, scores are obtained as to the time-sequence data for one predetermined time unit, regarding a distance-restricted node wherein the distance from the winning node as to the time-sequence for a predetermined time unit immediately preceding the time-sequence data of one predetermined time unit is within a predetermined distance; and wherein, of the distance-restricted nodes, the node with the best the score is determined to be the winning node as to the time-sequence data for the one predetermined time unit.

According to an embodiment of the present invention, time-sequence data is extracted for a predetermined time unit from time-sequence data. Scores are obtained for nodes of an SOM configured from a plurality of nodes provided with a spatial array configuration, such scores showing the applicability to time-sequence data for a predetermined time unit of the nodes, wherein the node with the best score thereof is determined to be the winning node which is the node most applicable to time-sequence data for a predetermined time unit. In this case, scores are obtained as to the time-sequence data for one predetermined time unit, regarding a distance-restricted node wherein the distance from the winning node as to the time-sequence for a predetermined time unit immediately preceding the time-sequence data of one predetermined time unit is within a predetermined distance; and of the distance-restricted nodes, the node with the best score is determined to be the winning node as to the time-sequence data for the one predetermined time unit. Thus, the burden of processing can be reduced.

BRIEF DESCRIPTION OF THE DRAWINGS

FIG. 46 is a block diagram for illustrating a fourth configuration example of a robot with application to the input/output relation model;

FIG. 47 is a flowchart for describing learning of the input/output relation model $M_{1112}$;

FIG. 48 is a diagram illustrating experiment results of an experiment predicting an output firing pattern from an input firing pattern;

FIG. 52 is a block diagram illustrating a configuration example of an embodiment of a computer to which the present invention has been applied.

DESCRIPTION OF THE PREFERRED EMBODIMENTS

Before describing embodiments of the present invention, the correspondence between the elements of the present invention and the embodiments described in the specification and the drawings is discussed below. This description is intended to assure that embodiments supporting the present invention are described in this specification and the drawings. Thus, even if an element in the specification and the drawings is not described here as an arrangement corresponding to a certain element of the present invention, that does not necessarily mean that the arrangement does not correspond to that element. Conversely, even if an arrangement is described herein as corresponding to a certain element, that does not necessarily mean that the arrangement does not relate to the other elements.

Figure 25:
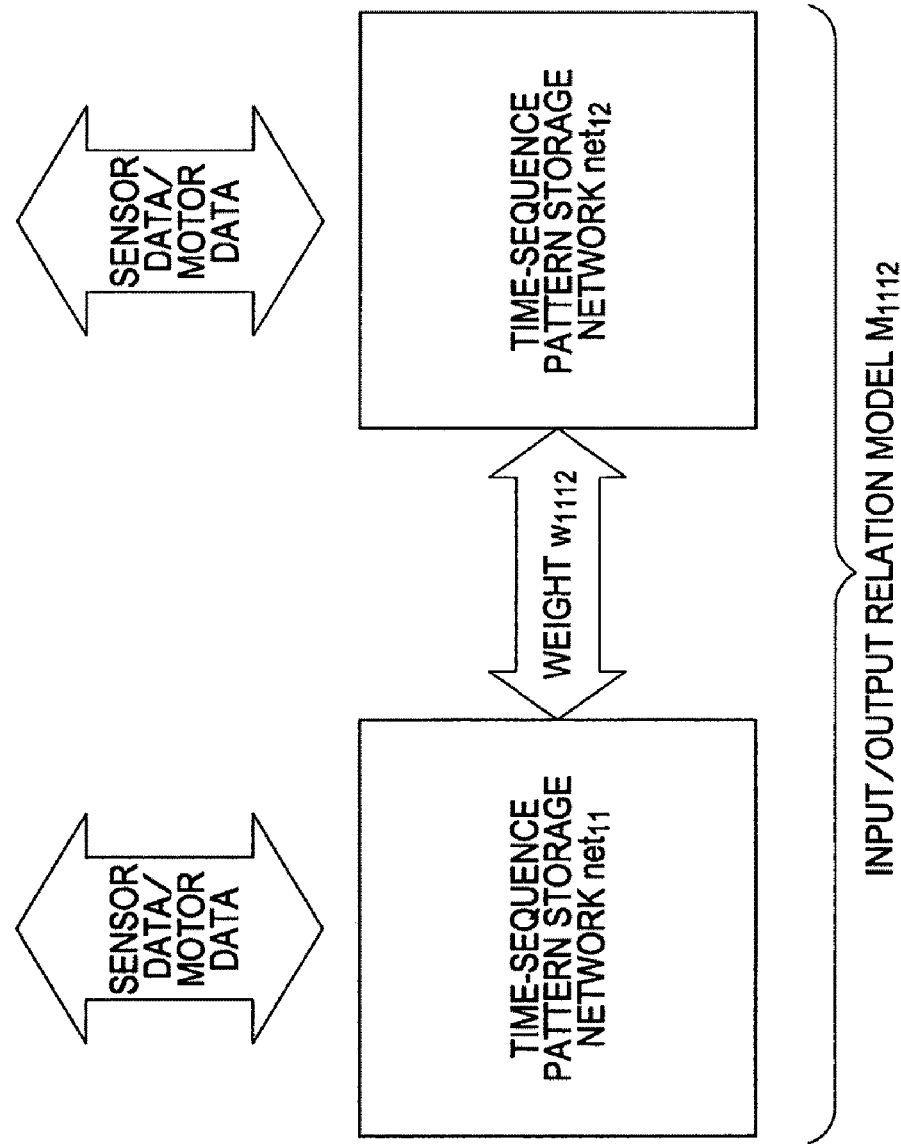
FIG. 25 is a diagram illustrating an input/output relation model $M_{1112}$.
Figure 32:
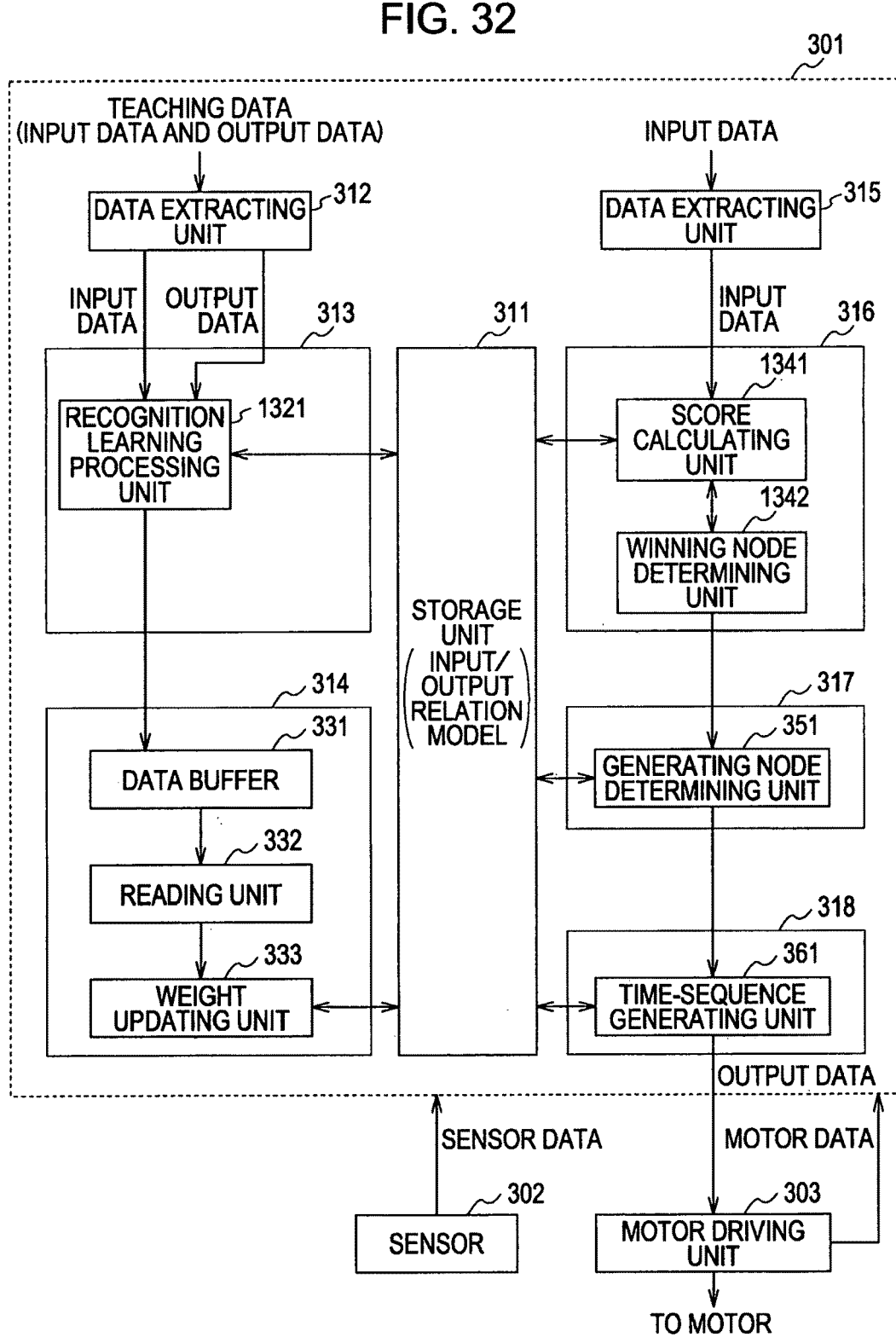
FIG. 32 is a block diagram illustrating a second configuration example of a robot with application to the input/output relation model.

A data processing device according to an embodiment of the present invention is a data processing device (for example, the data processing device 301 in FIG. 32) for processing time-sequence data comprising: data extracting means (for example, the data extracting units 312 or 315 in FIG. 32) for extracting time-sequence data for a predetermined time unit from time-sequence data; and processing means (for example, the recognition learning processing unit 1321 or the recognizing unit 316 in FIG. 32) for obtaining scores for nodes of an SOM (Self-Organizational Map) (for example, the time-sequence pattern storage networks $net_{11}$ or $net_{12}$ in FIG. 25) configured from a plurality of nodes provided with a spatial array configuration, the scores showing the applicability to time-sequence data for a predetermined time unit of the nodes, wherein the node with the best score thereof is determined to be the winning node which is the node most applicable to time-sequence data for a predetermined time unit; such processing means obtaining scores as to the time-sequence data for one predetermined time unit, regarding a distance-restricted node wherein the distance from the winning node as to the time-sequence for a predetermined time unit immediately preceding the time-sequence data of one predetermined time unit is within a predetermined distance; and of the distance-restricted nodes, the node with the best score is determined to be the winning node as to the time-sequence data for the one predetermined time unit.

A data processing method, or a program, according to an embodiment of the present invention, is a data processing method of the data processing device for processing time-sequence data, or a program to cause a computer to execute the data processing wherein time-sequence data is processed, includes the steps of: data extracting (for example, step S341 in FIG. 33 or step S381 in FIG. 35) for extracting time-sequence data for a predetermined time unit from time-sequence data; and processing (for example, step S342 in FIG. 33 or step S382 in FIG. 35) for obtaining scores for nodes of an SOM (Self-Organizational Map) (for example, the time-sequence pattern storage networks $net_{11}$ or $net_{12}$ in FIG. 25) configured from a plurality of nodes provided with a spatial array configuration, the scores showing the applicability to time-sequence data for a predetermined time unit of the nodes, wherein the node with the best score thereof is determined to be the winning node which is the node most applicable to time-sequence data for a predetermined time unit; such processing step obtaining scores as to the time-sequence data for one predetermined time unit, regarding a distance-restricted node wherein the distance from the winning node as to the time-sequence for a predetermined time unit immediately preceding the time-sequence data of one predetermined time unit is within a predetermined distance; and of the distance-restricted nodes, the node with the best score is determined to be the winning node as to the time-sequence data for the one predetermined time unit.

Embodiments of the present invention will be described below with reference to the drawings, but in preparation, a time-sequence pattern storage network will be described.

Figure 6:
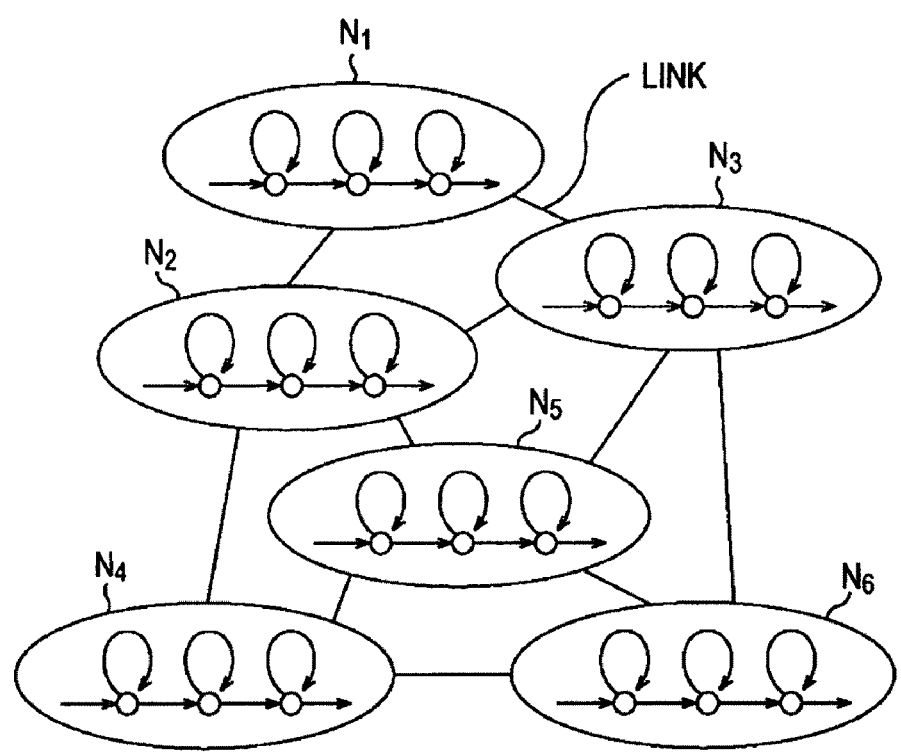
FIG. 6 is a diagram illustrating a first configuration example of a time-sequence pattern storage network.

FIG. 6 schematically illustrates a time-sequence pattern storage network.

The time-sequence pattern storage network is a network configured from multiple nodes having a time-sequence pattern model expressing a time-sequence pattern, and as described above, is a type of SOM. The time-sequence pattern storage network can store a time-sequence pattern for just the number of nodes within the entire network (performs classification).

In FIG. 6, the time-sequence pattern storage network is configured of six nodes, node $N_1$ through $N_6$.

The nodes $N_i$ (wherein i=1, 2, and so on through 6 in FIG. 6) making up the time-sequence pattern storage network have a time-sequence pattern model representing a time-sequence pattern. Also, the nodes $N_i$ can have a jointed relation with other nodes $N_j$ (wherein j=1, 2, and so on through 6 in FIG. 6). This jointed relation is called linking. In FIG. 6, the node $N_1$ for example has a direct jointed relation with nodes $N_2$ and $N_3$. Also, for example, the node $N_3$ has a direct jointed relation with nodes $N_1$, $N_2$, $N_5$, and $N_6$, and accordingly, the $N_5$ and $N_6$ have an indirect jointed relation with the $N_1$ via the node $N_3$. Note that when considering the jointed relation between two nodes $N_i$ and $N_j$, the jointed relation over the closest distance between the nodes $N_i$ and $N_j$ will be considered.

Figure 1:
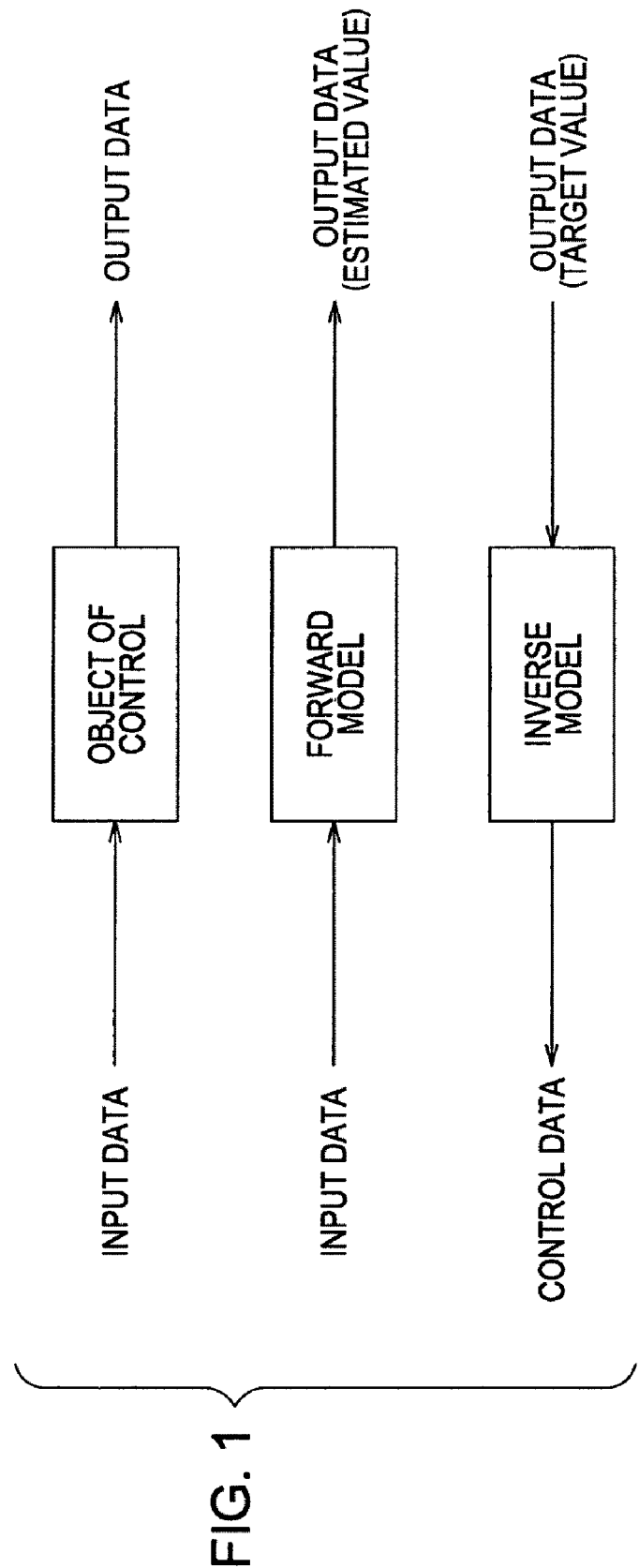
FIG. 1 is a diagram for describing an object of control, and a forward model and inverse model.
Figure 2:
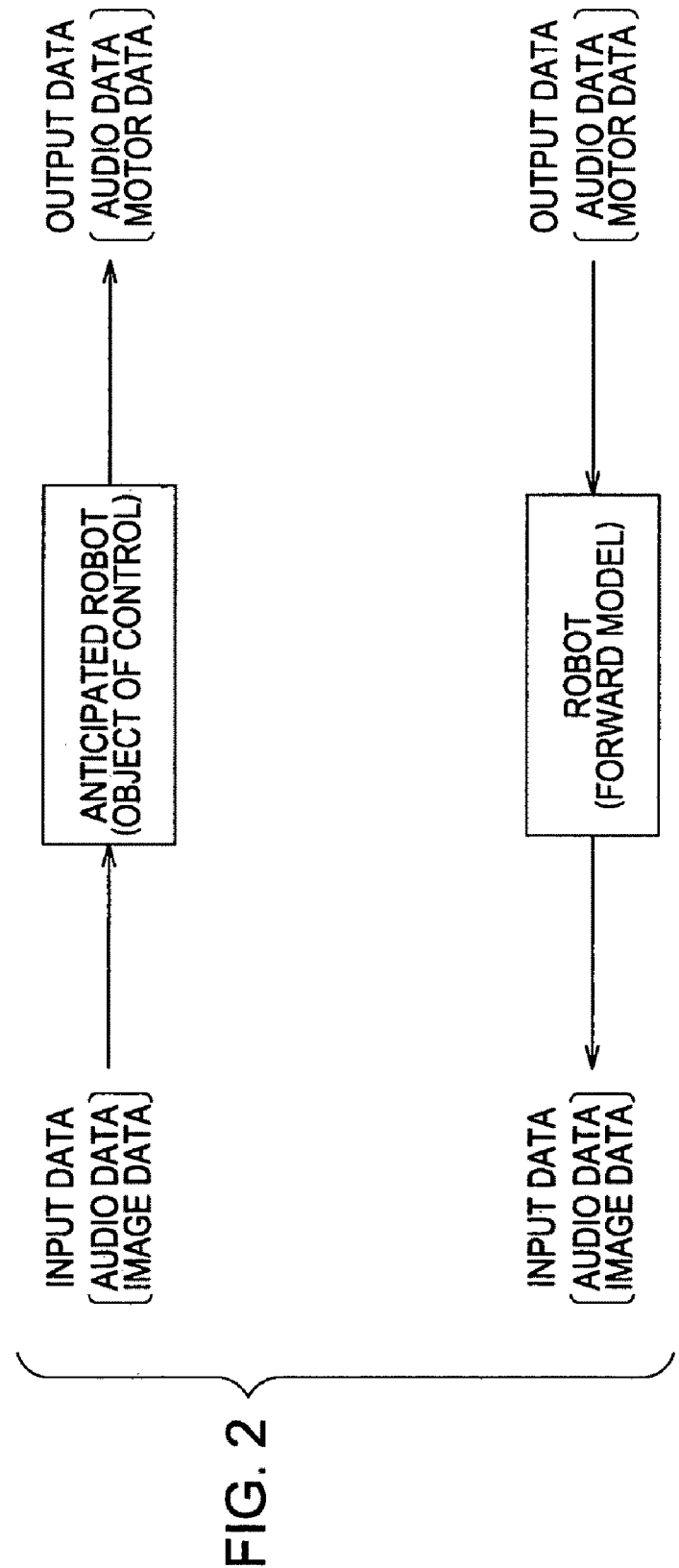
FIG. 2 is a diagram illustrating an anticipated robot as an object of control, and a forward model of the anticipated robot.
Figure 3:
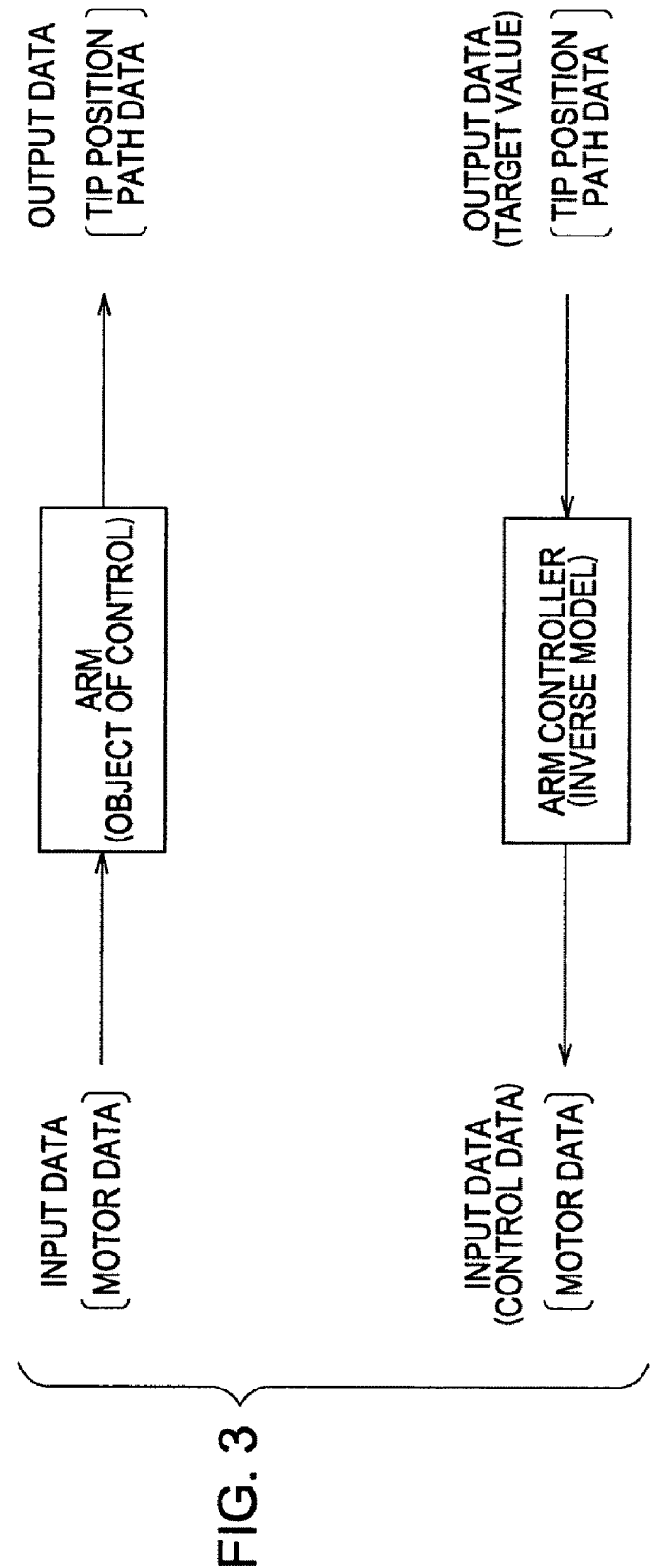
FIG. 3 is a diagram illustrating a robot arm as an object of control, and an arm control device of the arm, using an inverse model.
Figure 4:
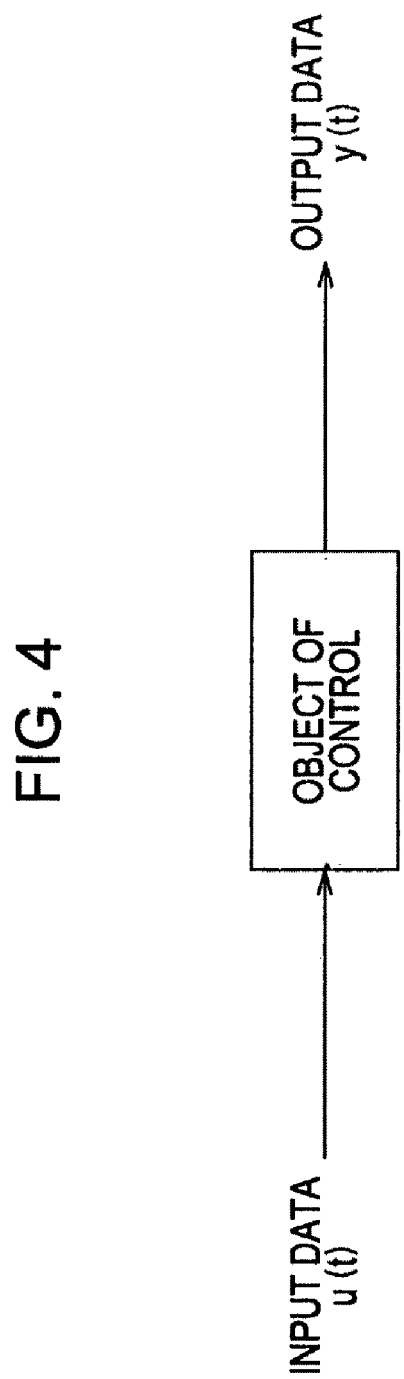
FIG. 4 is a diagram for describing modeling using a linear system.
Figure 5:
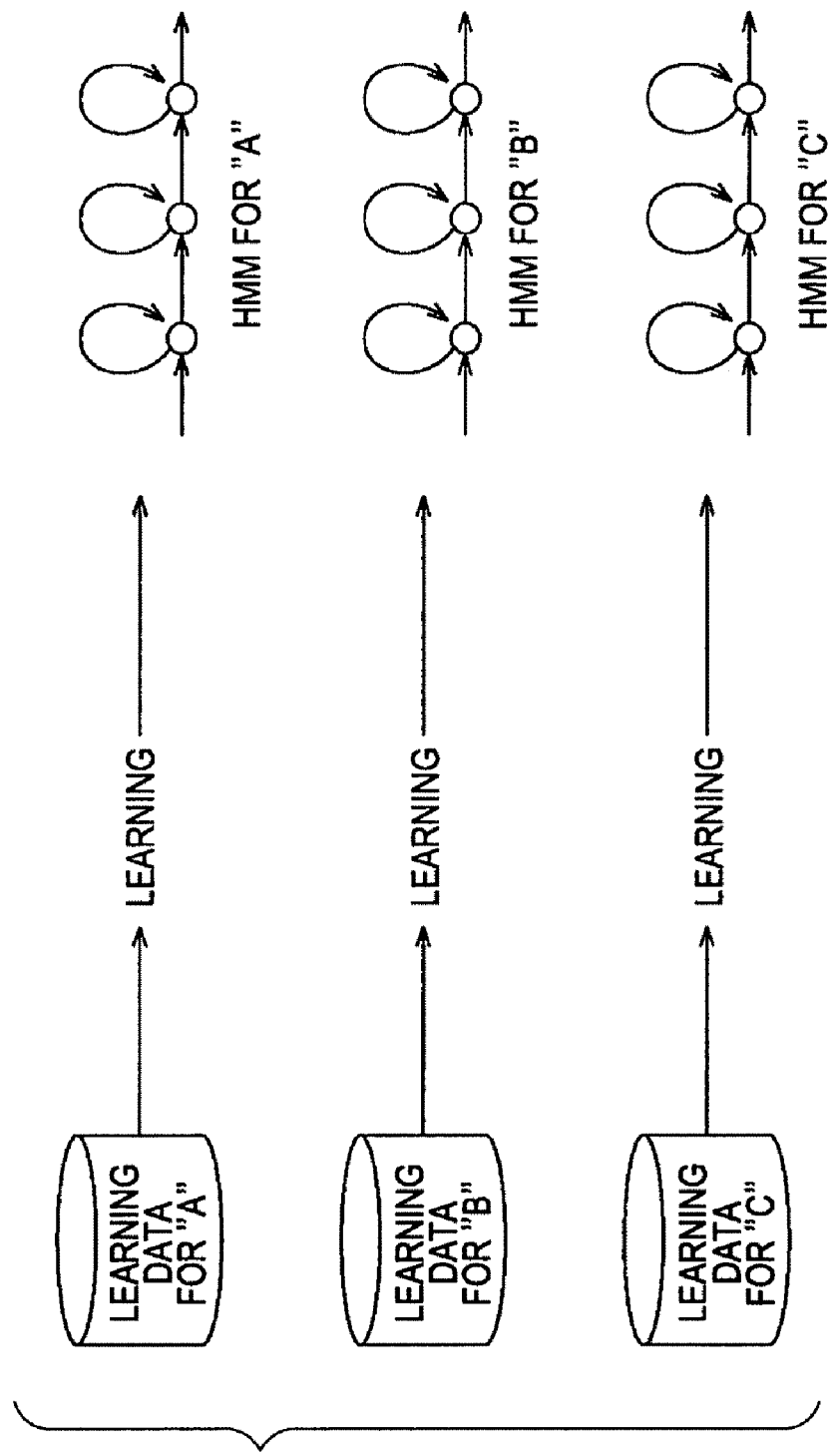
FIG. 5 is a diagram for describing an example of supervised learning.

Learning with a time-sequence pattern storage network (learning wherein a time-sequence pattern storage network is made to store time-sequence patterns) is carried out using time-sequence data as learning data with which to perform learning. However, this learning with a time-sequence pattern storage network differs greatly from the supervised learning described above with reference to FIG. 5 in that the types of categories and number of categories in the learning data is unknown. Also, there is no true label provided to learning data used in learning with a time-sequence pattern storage network. Accordingly, the supervised learning described with reference to FIG. 5 above cannot be applied thereto.

Thus, supervised learning cannot be applied to learning with a time-sequence pattern storage network, and also, the types of categories and number of categories of the learning data are unknown. Accordingly, learning with a time-sequence pattern storage network is performed in a self-organizing manner by all of the nodes thereof, such that the characteristics of the learning data (time-sequence pattern) can be appropriately represented.

Note that learning with a time-sequence pattern storage network is unsupervised learning. Also, in learning with a time-sequence pattern storage network, a certain node and a certain category do not necessarily correspond one to another in a one-on-one manner. That is to say, with a time-sequence pattern storage network, there are cases wherein learning is performed with one node and one category corresponding one to another in a one-on-one manner, cases wherein learning is performed with multiple nodes corresponding to one category, and further, cases wherein learning is performed with one node corresponding to multiple categories. Accordingly, even in cases wherein the learning data cannot be clearly categorized, learning with a time-sequence pattern storage network can be performed.

Figure 7:
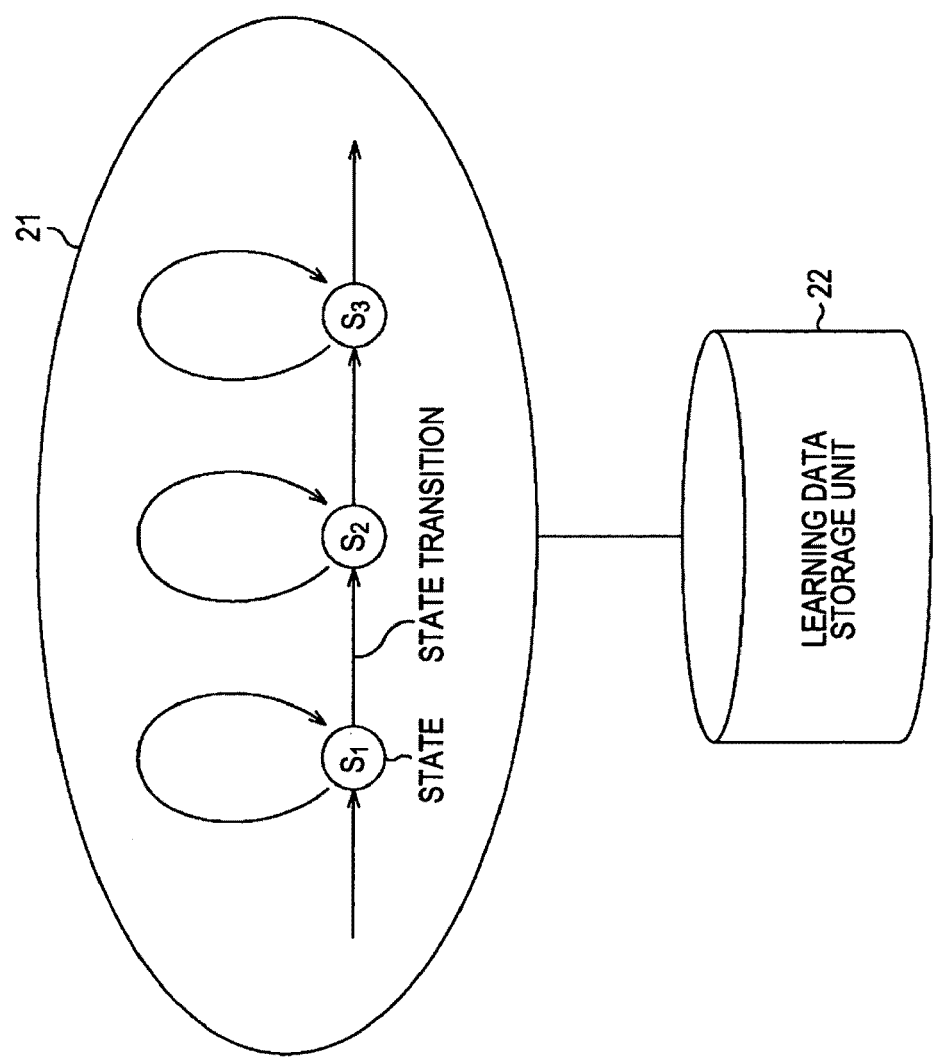
FIG. 7 is a diagram illustrating a configuration example of a node.

Next, FIG. 7 schematically illustrates a configuration example of a node $N_i$ in a time-sequence pattern storage network.

The node $N_i$ is configured of a time-sequence pattern model 21 representing a time-sequence pattern, and a learning data storage unit 22 for storing learning data used for learning the time-sequence pattern model 21.

In FIG. 7, the time-sequence pattern model 21 employed is an HMM (continuous HMM), which is a type of state probability transition model. Also, in FIG. 7, the HMM has three states $S_1$, $S_2$, and $S_3$, in a left-to-right form, wherein each state can only either loop back on itself or make transition to the next state (state to the right). The circles in the time-sequence pattern model 21 in FIG. 7 represent states, and the arrows indicate state transitions. Note that the HMM serving as the time-sequence pattern model 21 is not restricted to a left-to-right type, to a three-state type, etc.

In the event that the time-sequence pattern model 21 is an HMM such as shown in FIG. 7, the HMM serving as the time-sequence pattern model 21 is defined by state transition probability and output probability density function (in the event that the HMM is a discreet HMM, the probability that a discrete symbol, which is a scalar quantity, will be output).

The state transition probability is the probability that a state will make transition in an HMM, and is provided to each state transition indicated by arrows in the time-sequence pattern model 21 in FIG. 7. The output probability density function represents the probability density of a value observed from the HMM at the time of state transition. An example of an output probability density function employed is contaminated normal distribution or the like. Such HMM parameters (state transition probability and output probability density function) can be learned (estimated) with the Baum-Welch method.

At the nodes $N_i$, the statistical properties of the learning data stored in the learning data storage unit 22, i.e., the time-sequence pattern of the learning data stored in the learning data storage unit 22, is learnt at the time-sequence pattern model 21, and thus the time-sequence pattern model 21 and the learning data stored in the learning data storage unit 22 are in a correlated relation.

Note that learning with a time-sequence pattern storage network, and by extension learning with the time-sequence pattern model 21 of the node $N_i$, learning is performed by on-line learning, wherein learning is performed each time time-sequence data is provided to the time-sequence pattern storage network. Accordingly, the parameters of the time-sequence pattern storage network, i.e., the parameters of the node $N_i$ time-sequence pattern model 21 (in the event that the time-sequence pattern model 21 is an HMM, the state transition probability and output probability density function as described above) are updated a little at a time, each time time-sequence data is provided to the time-sequence pattern storage network.

That is to say, as described later more specifically, as the learning of the time-sequence pattern storage network processes, the learning data stored in the learning data storage unit 22 is updated by the time-sequence data provided to the time-sequence pattern storage network, and accordingly changes a little at a time. Learning is performed at the time-sequence pattern model 21 by the learning data which changes a little at a time, whereby the parameters of the time-sequence pattern model 21 also change a little at a time.

Figure 8:
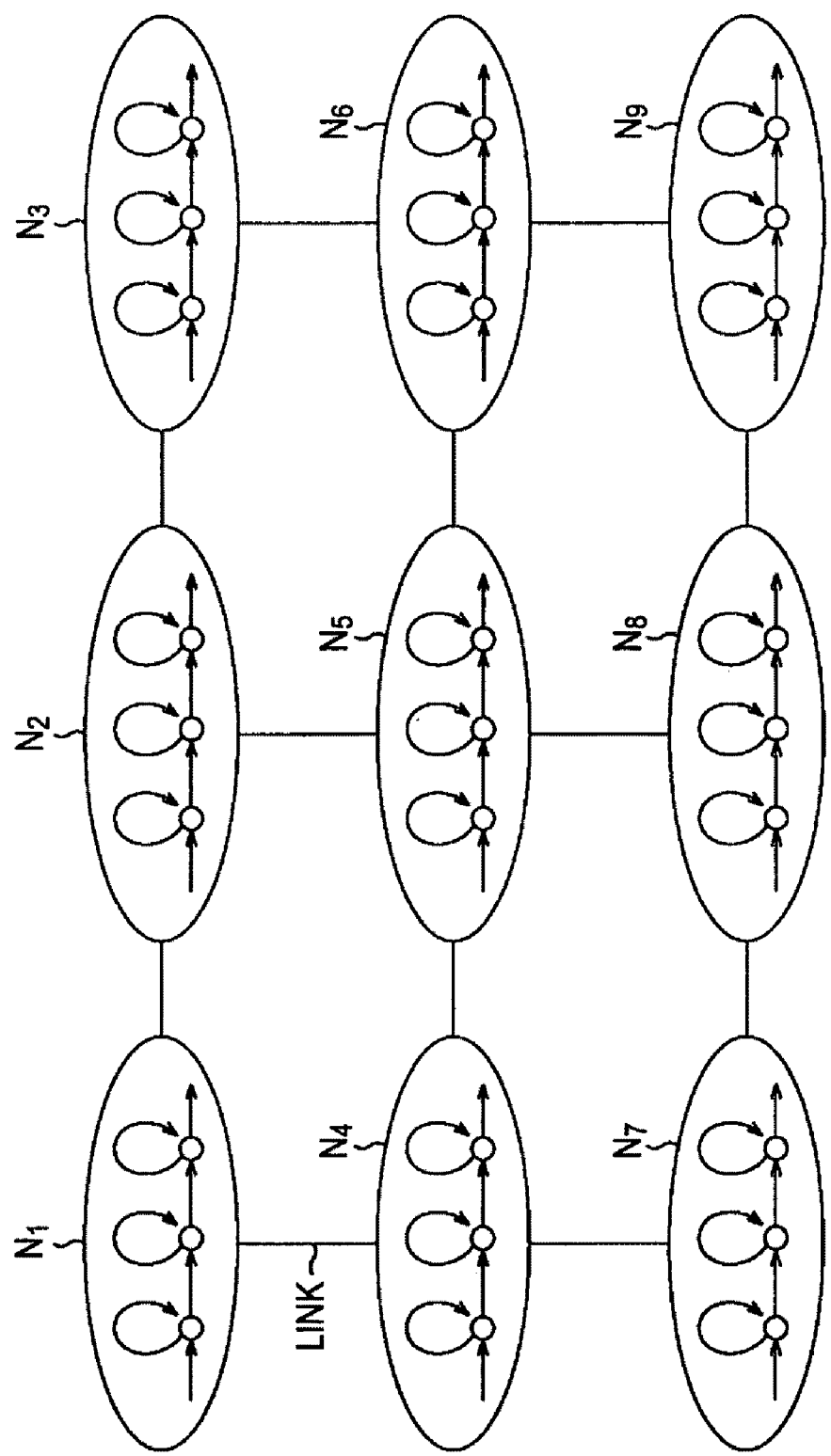
FIG. 8 is a diagram illustrating a second configuration example of a time-sequence pattern storage network.

Next, FIG. 8 schematically illustrates another example of a time-sequence pattern storage network.

In FIG. 8, the time-sequence pattern storage network is configured of nine nodes $N_1$ through $N_9$, with the nine nodes $N_1$ through $N_9$ being arrayed two-dimensionally. That is to say, in FIG. 8, the nine nodes $N_1$ through $N_9$ are arrayed so as to be 3×3 on a two-dimensional plane.

Further, in FIG. 8, each of the nine nodes $N_1$ through $N_9$ arrayed two-dimensionally are linked (in a jointed relation) with the horizontally adjacent nodes and vertically adjacent nodes. Such linking can be said to provide the nodes making up the time-sequence pattern storage network with an array structure that is arrayed spatially two-dimensionally.

With a time-sequence pattern storage network, the distance between two nodes in this space can be defined based on the spatial node placement provided by linking, and the distance between two nodes can be used as an inter-pattern distance (similarity between time-sequence patterns) of the time-sequence patterns, which the time-sequence pattern models 21 of each of the two nodes has.

Note that the inter-pattern distance between the time-sequence patterns represented by the distance between the two nodes can be said to be an inter-pattern distance based on the jointed relation (linking) of the two nodes.

As for the distance between two nodes, the number of links making up the shortest path connecting the two nodes can be employed, for example. In this case, if we take interest in a certain node, a node which has a direct link with that node of interest (in FIG. 8, the nodes horizontally and vertically adjacent to the node of interest) are at the closest distance to the node of interest, and nodes which can arrive at the node of interest by following links behind the nodes having direct links to the node of interest are farther from the node of interest in proportion to the number of links which must be traversed.

Note that the links provided to the nodes are no restricted to the arrangements shown in FIGS. 6 and 8. Also, while the linking shown in FIGS. 6 and 8 illustrate two-dimensional array structures, linking may be such so as to provide a one-dimensional array structure or a three-dimensional array structure.

Figure 9:
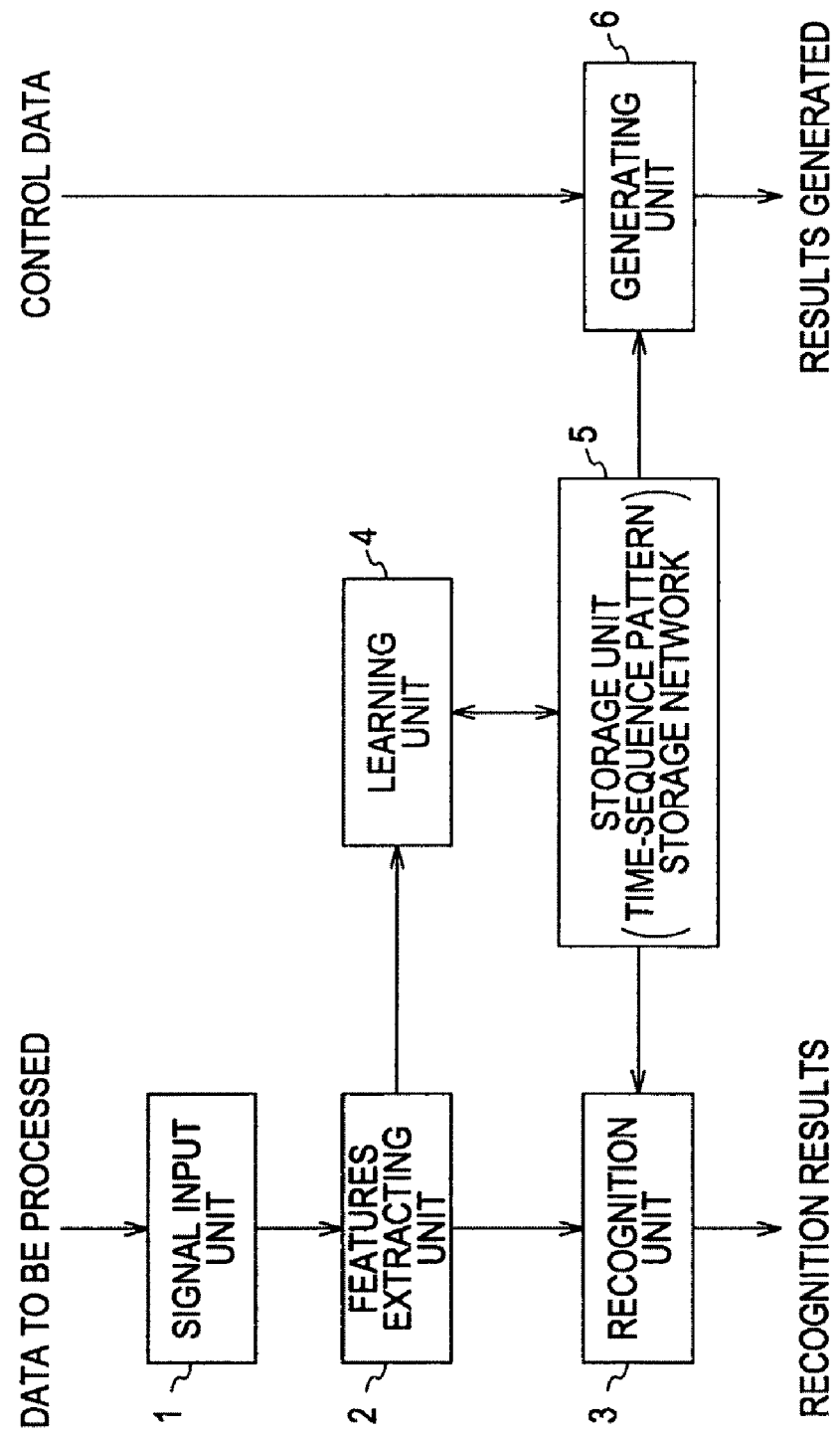
FIG. 9 is a block diagram illustrating a configuration example of a data processing device for performing processing using a time-sequence pattern storage network.

Next, FIG. 9 illustrates a configuration example of a data processing device which performs various types of processing using a time-sequence pattern storage network.

Data, which is to be subjected to later-described learning processing and recognition processing (hereinafter referred to as "data to be processed") is input to a signal input unit 1. The data to be processed here us observation values such as sound, images, brightness of an LED (Light-Emitting Diode), rotational angle or angular velocity of a motor, and so forth, i.e., values (signals) which can be externally observed. Alternatively, data to be processed may be data output from an input device (sensor) which accepts input to a system to which the data processing device shown in FIG. 9 is applied, or may be data provided to an output device which performs some sort of output.

That is to say, in the event that the data processing device shown in FIG. 9 is applied to a robot such as a bipedal robot for example, with the bipedal robot performing some sort of processing in response to an external state, the signal input unit 1 can be configured of a sensor sensing the external state. Specifically, the signal input unit 1 can be configured of a microphone or camera or the like, for example.

In the event that the signal input unit 1 is configured of a microphone, audio generated externally (all sounds, including human voices, animal sounds, sounds of other things, etc.) is input as input data to the bipedal robot (i.e., the system to which the data processing device has been applied), and corresponding audio data is supplied to a features extracting unit 2. Also, in the event that the signal input unit 1 is configured of a camera, external light to the camera is input as input data to the bipedal robot, and corresponding image data is supplied to the features extracting unit 2.

Also, in the event that the bipedal robot is capable of moving a portion equivalent to an arm or leg or the like for example, by a motor serving as an actuator, the signal input unit 1 can be configured of a measuring device for measuring the rotational angle of the motor or the angular velocity thereof (i.e., a sensor for sensing the rotational angle or the angular velocity). Note that a motor which moves a portion of the bipedal robot equivalent to an arm or leg or the like is rotated not only by being provided with driving signals which are electric signals for rotational driving of the motor, but also by external force being applied to the portion equivalent to an arm or leg or the like. The measuring device can measure the rotational angle or the angular velocity of rotations generated in either case.

In the event that the signal input unit 1 is configured of a measuring device, signals representing the rotational angle or the angular velocity of the motor are input to the measuring device as output data from the bipedal robot, and the measurement results thereof are supplied to the feature extracting unit 2.

Note that the data to be processed which is input to the signal input unit 1 may be stationary data (stationary signals) of which temporal change is constant, or may be non-stationary data (non-stationary signals) of which temporal change is not constant.

Also, we will say in the following that audio, which is a type of time-sequence data, for example, will be input to the signal input unit 1. Further, we will say that only audio data of what we will call an "audio section" is supplied from the signal input unit 1 to the feature extracting unit 2. Note that the method for detecting an audio section is not restricted in particular. Also, audio data supplied from the signal input unit 1 to the feature extracting unit 2 is not necessarily restricted to the length of an audio section, as long as it is sectioned into suitable lengths. That is to say, the audio data supplied from the signal input unit 1 to the feature extracting unit 2 may be in phonetic increments of phonemes or the like for example, or may be in increments of words, sentences, from one punctuation mark to another punctuation mark, etc.

Now, the data to be processed which is supplied from the signal input unit 1 to the feature extracting unit 2 is not restricted to audio data, and sectioning thereof is not restricted in particular, either. That is to say, it is sufficient for data to be processed, which has been sectioned into suitable lengths with an optimal method, to be supplied from the signal input unit 1 to the feature extracting unit 2. Also, sections of data to be processed, supplied from the signal input unit 1 to the feature extracting unit 2, may be constant or not constant.

The feature extracting portion 2 extracts a feature amount from the audio data serving as time-sequence data which is the data to be processed from the signal input unit 1, and the time-sequence feature amount serving as the time-sequence data obtained as a result thereof is supplied to the recognition portion 3 and the learning portion 4. In other words, the feature extracting unit 2 performs processing such as frequency analysis with a fixed time interval as to the audio data from the signal input unit 1, and for example, extracts a feature amount such as a MFC (Mel Frequency Cepstrum Coefficient), and supplies the time-sequence data of the Mel Frequency Cepstrum Coefficient to the recognition portion 3 and the learning portion 4. Note that the time-sequence data supplied from the feature extracting unit 2 to the recognition portion 3 and the learning portion 4 are measurable values which can be measured externally.

The recognizing unit 3 recognizes (perceives) the time-sequence data supplied from the features extracting unit 2 based on the time-sequence pattern storage network stored in the storage unit 5, and outputs the recognition results thereof.

The learning unit 4 performs updating in a self-organizing manner of the time-sequence pattern storage network stored in the storage unit 5, based on the observation values of the time-sequence data supplied from the features extracting unit 2. That is to say, the learning unit 4 updates the parameters of the time-sequence pattern storage network stored in the storage unit 5, based on the time-sequence data supplied from the features extracting unit 2. Note that the updating of these parameters may also be called "learning".

Upon being provided repeatedly with time-sequence data to which a true label has not be provided, the learning unit 4 executes unsupervised learning, wherein feature patterns (time-sequence patterns) in the provided time-sequence data are acquired in a self-organizing manner. Consequently, representative time-sequence patterns are efficiently stored in the time-sequence pattern storage network in the storage unit 5. That is to say, the time-sequence data which the features extracting unit 2 supplies to the recognizing unit 3 and the learning unit 4 can be classified into several patterns (time-sequence patterns), with the learning unit 4 performing learning so as to store (capture) the representative time-sequence patterns of the time-sequence data in the time-sequence pattern storage network.

The storage unit 5 stores the time-sequence pattern storage network, with the parameters of the time-sequence pattern storage network being suitably updated by the learning unit 4.

Control data is supplied to a generating unit 6. the control data supplied to the generating unit 6 is such that represents one of time-sequence patterns stored in the time-sequence pattern storage network of the storage unit 5 (e.g., a later-described node label), with the generating unit 6 generating and outputting time-sequence data of the time-sequence pattern which the control data supplied thereof represents, based on the time-sequence pattern storage network of the storage unit 5.

Figure 10:
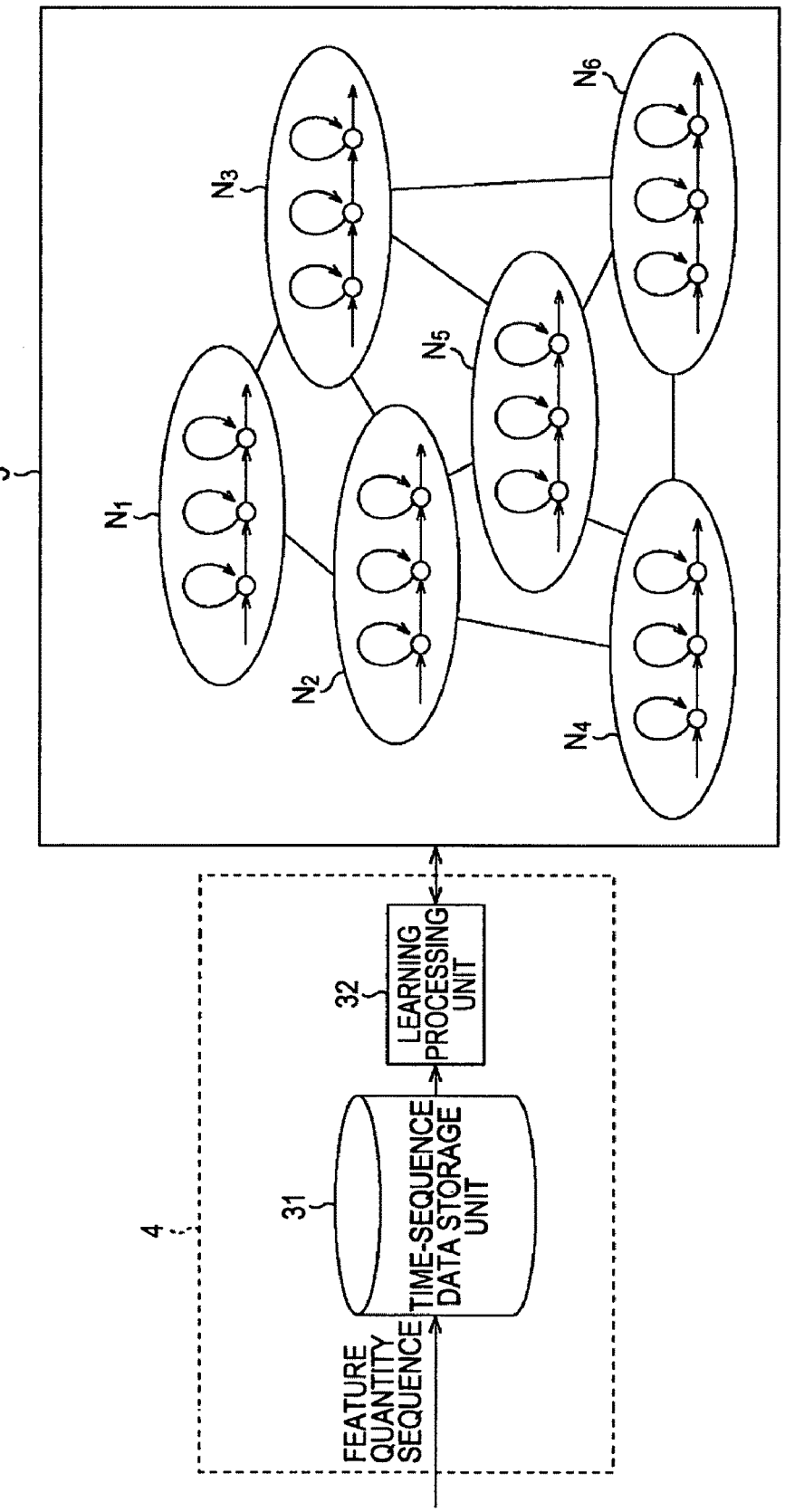
FIG. 10 is a block diagram illustrating a configuration example of a learning unit 4.

Next, FIG. 10 illustrates a configuration example of the learning unit 4 shown in FIG. 9.

The learning unit 4 is configured of a time-sequence data storage unit 31 and learning processing unit 32.

The time-sequence data storage unit 31 is supplied with a sequence of feature quantity from the features extracting unit 2, as new time-sequence data (for a single section). The time-sequence data storage unit 31 stores the new time-sequence data from the features extracting unit 2 temporarily (until processing using the new time-sequence data with the learning processing unit 32 ends).

The learning processing unit 32 updates, in a self-organizing manner, the time-sequence pattern storage network stored in the storage unit 5, based on the observation values of the new time-sequence data stored in the time-sequence data storage unit 31.

Figure 11:
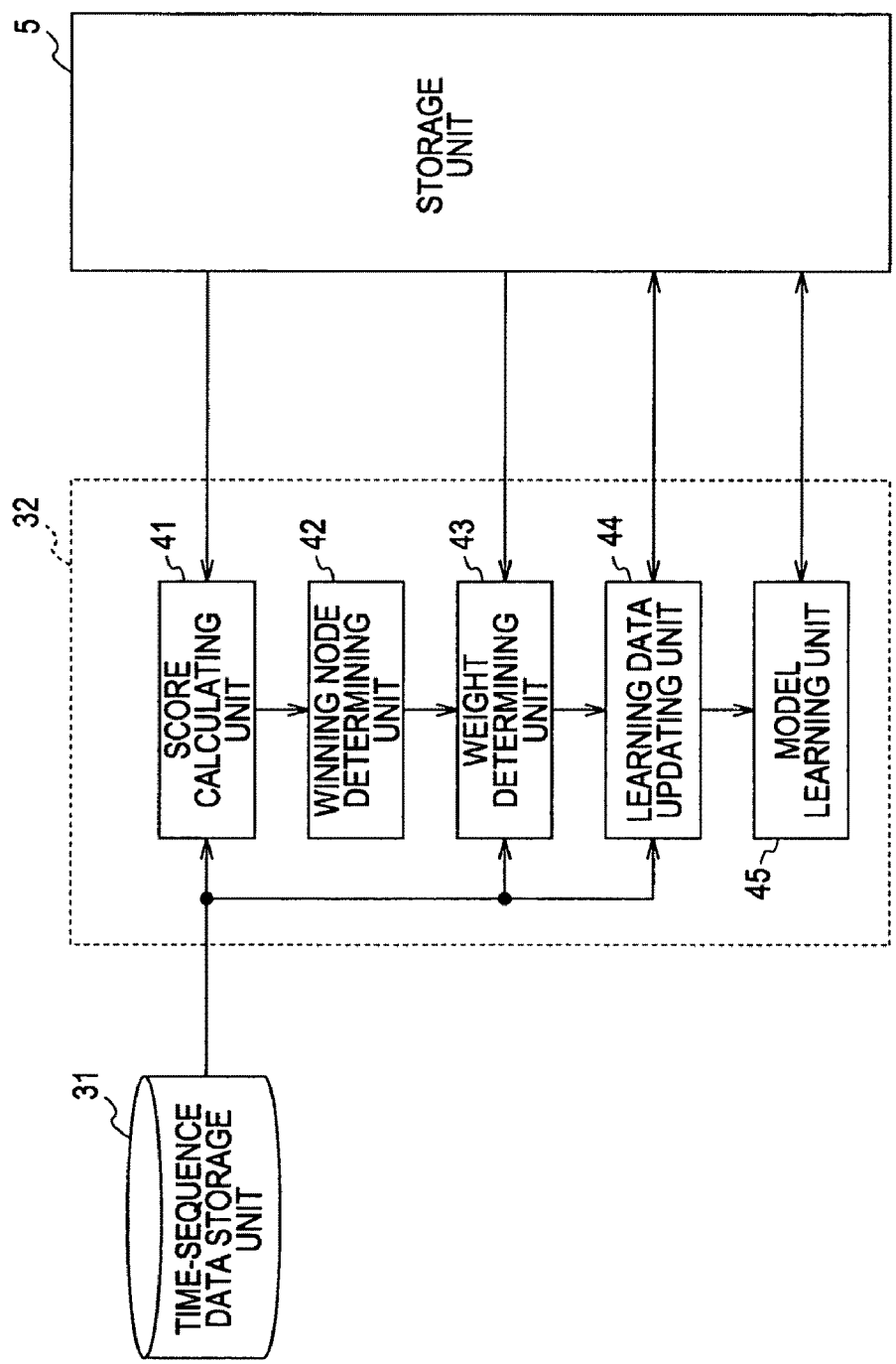
FIG. 11 is a block diagram illustrating a configuration example of a learning processing unit 32.

Next, FIG. 11 illustrates a configuration example of the learning processing unit 32 shown in FIG. 10.

A score calculating unit 41 obtains, regarding each node making up the time-sequence pattern storage network stored in the storage unit 5, the degree of that node matching the observation value of the time-sequence data stored in the time-sequence data storage unit 31, in the form of a score, and supplies the score to a winning node determining unit 42. That is to say, in the event that the time-sequence pattern model 21 which a node has is an HMM such as shown in FIG. 7 for example, the score calculating unit 41 obtains the likelihood of the time-sequence data stored in the time-sequence data storage unit 31 being observed from the HMM serving as the time-sequence pattern model 21 of the node, and supplies this as the score of the node to the winning node determining unit 42.

The winning node determining unit 42 obtains the node most closely matching the time-sequence data stored in the time-sequence data storage unit 31 within the time-sequence pattern storage network stored in the storage unit 5, and determines that node to be the winning node.

That is to say, of the nodes making up the time-sequence pattern storage network stored in the storage unit 5, the winning node determining unit 42 determines the node with the highest score from the score calculating unit 41 to be the winning node. The winning node determining unit 42 then supplies information representing the winning node to a weight determining unit 43.

Now, the nodes making up the time-sequence pattern storage network can be provided with node labels, which are labels for identifying each node. These node labels can be used for information indicating the winning node, and information indicating other nodes. It should be noted that a node label is a label for identifying the node itself, and has nothing to do with a true label which indicates which is true.

The weight determining unit 43 determines later-described updating weighting for each of the nodes making up the time-sequence pattern storage network stored in the storage unit 5, based on the winning node indicated by the node label supplied from the winning node determining unit 42, and supplies this to a learning data updating unit 44.

That is to say, the weight determining unit 43 determines updating weighting of each node making up the time-sequence pattern storage network stored in the storage unit 5 (including the winning node) based on the inter-pattern distance between that node and the winning node, and supplies this to the learning data updating unit 44.

Now, the time-sequence pattern model 21 (FIG. 7) which a node has is updated using the new time-sequence data sorted in the time-sequence data storage unit 31 (FIG. 10), regarding which the updating weight of a node representing the degree of effect of the new time-sequence data which the time-sequence pattern model 21 is subjected to be updating of the time-sequence pattern model 21 of the node. Accordingly, in the event that the updating weight of the node is zero, this means that the time-sequence pattern model 21 of the node is not affected by the new time-sequence data (i.e., is not updated).

The learning data updating unit 44 updates the learning data stored in the learning data storage unit 22 (FIG. 7) which each node of the time-sequence pattern storage network stored in the storage unit 5 has.

That is to say, the learning data updating unit 44 mixes the learning data already stored in the learning data storage unit 22 of the node and the time-sequence data stored in the time-sequence data storage unit 31 based on the corresponding node updating weight from the weigh determining unit 43, and stores the mixed results as new learning data in the learning data storage unit 22, thereby updating the stored contents of the learning data storage unit 22.

The learning data updating unit 44 updates the learning data stored in the learning data storage unit 22 (FIG. 7) according to the updated weight, as described above, and thereupon supplies a model learning unit 45 with an end notification to the effect that updating thereof has ended.

Upon receiving the end notification from the learning data updating unit 44, the model learning unit 45 uses the learning data stored in the learning data storage unit 22 (FIG. 7) after updating of the learning data thereof by the learning data updating unit 44, to perform learning of the time-sequence pattern model 21 which each node in the time-sequence pattern storage network has, thereby updating the time-sequence pattern model 21.

Accordingly, updating of the time-sequence pattern model 21 which a node has by the model learning unit 45 is performed based on the learning data (more particularly, a part thereof) stored in the learning data storage unit 22 (FIG. 7) which the node has, and the new time-sequence data stored in the time-sequence data storage unit 31. Note that the stored contents of the learning data storage unit 22 are updated according to the updating weight, so updating of the time-sequence pattern model 21 by the model learning unit 45 can be said to be performed based on the updating weight.

Figure 12:
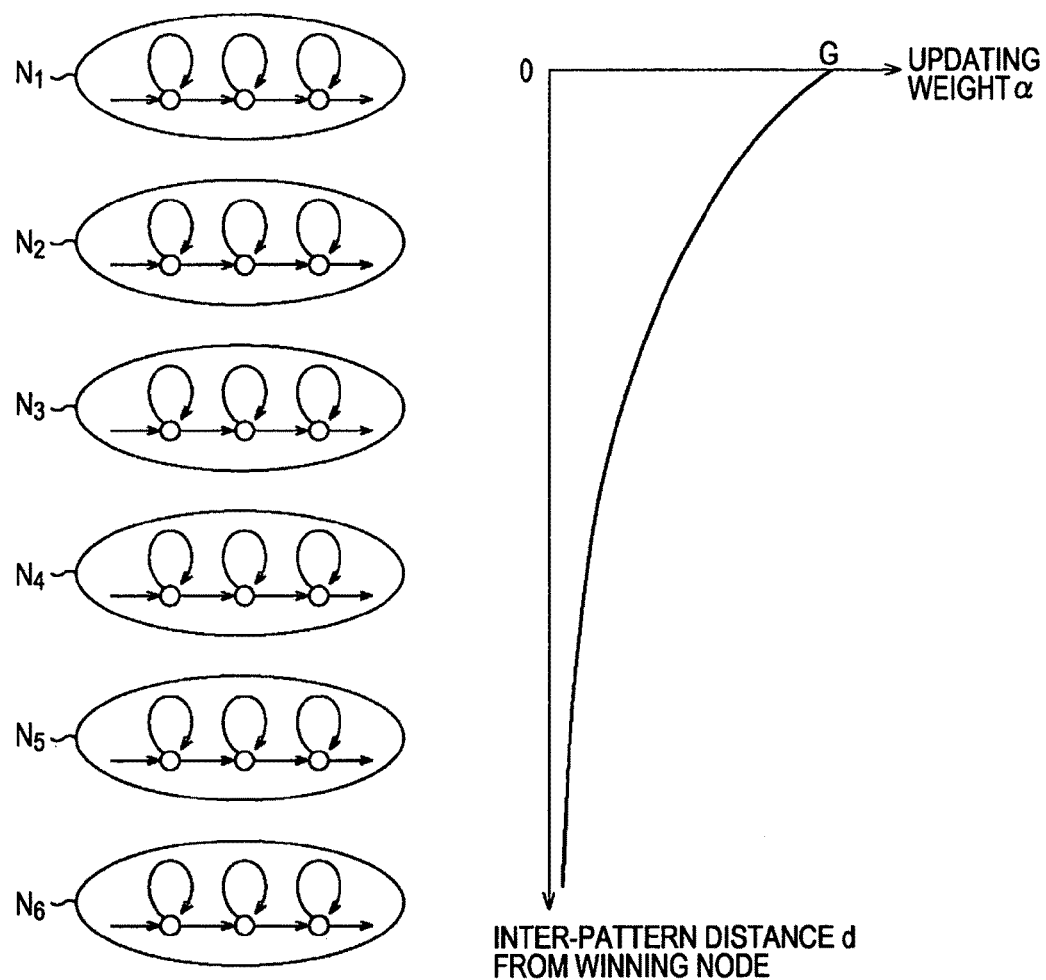
FIG. 12 is a diagram for describing a determining method for determining updating weight.

Next, FIG. 12 illustrates a determining method for determining updating weight at the weight determining unit 43 in FIG. 11.

The weight determining unit 43 determines the updating weight for the node (node updating weight) $\alpha$ according to a curve representing the relation in which the updating weight $\alpha$ decreases as the inter-pattern distance d as to the winning node increases (hereinafter referred to as distance/weight curve), such as shown in FIG. 12 for example. According to the distance/weight curve, the shorter the inter-pattern distance d as to the winning node is, the greater the determined updating weight $\alpha$ is, and the longer the inter-pattern distance d as to the winning node is, the smaller the determined updating weight $\alpha$ is.

In the distance/weight curve shown in FIG. 12, the horizontal axis (from the left towards the right) represents the updating weight $\alpha$, and the vertical axis (from the top towards the bottom) represents the inter-pattern distance d.

FIG. 12 shows the positions (positions on the vertical axis) wherein six nodes $N_1$ through $N_6$ configuring the time-sequence pattern storage network correspond to the pattern space distance d of each node $N_i$ and the winning node, along the vertical axis of the diagram.

In FIG. 12, the six nodes $N_1$ through $N_6$ making up the time-sequence pattern storage network are distanced from the winning node in that order, and also the inter-pattern distance d becomes closer to the winning node. Of the six nodes $N_1$ through $N_6$ configuring the time-sequence pattern storage network, the node $N_1$ which is the node wherein the pattern distance d is the closest to the winning node, i.e. the node wherein the pattern distance d from the winning node is 0 is the (node serving as the) winning node.

Now, with this in mind, let us look at FIG. 8 again. In the event that a time-sequence pattern storage network has a two-dimensional array structure such as shown in FIG. 8 for example, and the winning node in this case is node $N_6$ for example, the distance between the winning node $N_6$ and the node $N_6$ is the closest (No. 1) 0, so the inter-pattern distance d between the node $N_6$ and the winning node $N_6$ is also 0. Also, the distance between the winning node $N_6$ and the nodes $N_3$ and $N_5$ is the second closest 1, so the inter-pattern distance d between the winning node $N_6$ and the nodes $N_3$ and $N_5$ or $N_9$ is also 1. Further, the distance between the winning node $N_6$ and the nodes $N_2$, $N_4$ and $N_8$ is the third closest 2, so the inter-pattern distance d between the winning node $N_6$ and the nodes $N_2$, $N_4$ and $N_8$ is also 2. Moreover, the distance between the winning node $N_6$ and the nodes $N_1$ and $N_7$ is the farthest (fourth closest) 3, so the inter-pattern distance d between the winning node $N_6$ and the nodes $N_1$ and $N_7$ is also 3.

Next, the distance/weight curve such as shown in FIG. 12 for example, representing the relation between the updating weight $\alpha$ and the inter-pattern distance d is provided by Expression (3), for example.

$$\alpha = G\gamma^{\frac{d}{\Delta}} \tag{3}$$

In this Expression (3), G is a constant representing the updating weight of the winning node, and $\gamma$ is an attenuation coefficient and is a constant in the range of $0 < \gamma < 1$. Further, a variable $\Delta$ is a variable for adjusting the updating weight $\alpha$ of a node in close proximity to the winning node (a node of which the distance to the winning node is close), in a case of employing the above-described SMA, as an updating method for updating the time-sequence pattern storage network.

In a case wherein, as described above, 0 is provided for the inter-pattern distance d of the node which is the winning node, and 1, 2, and so on is provided as the inter-pattern distance d for the other nodes in accordance with the distance to the winning node, in the event that G=8, $\gamma$=0.5, and $\Delta$=1 for example in Expression (3), 8 (i.e., G) is obtained as the updating weight $\alpha$ of the node which is the winning node. Thereafter, the updating weight $\alpha$ of the node decreases in value, i.e., 4, 2, 1, and so on, as the distance as to the winning node increases.

Now, in the case that the attenuation coefficient $\Delta$ in Expression (3) is a large value, the change to the updating weight $\alpha$ as to the changes of the pattern distance d becomes gradual, and conversely, in the case that the attenuation coefficient Δ is a value close to 0, the change of the updating weight α as to change in the inter-pattern distance d is steep.

Accordingly, adjusting the attenuation coefficient Δ so as to gradually approach 0 from 1 as described above causes the change of the updating weight α as to change in the inter-pattern distance d to become steep, and the updating weight α becomes smaller in value as the inter-pattern distance d increases. Finally, when the attenuation coefficient Δ draws close to 0, the updating weight α of nodes other than the node serving as the winning node is almost 0, and in this case, this situation is almost equivalent to a case of employing the above-described WTA as the updating method for updating the time-sequence pattern storage network.

Accordingly, adjusting the attenuation coefficient Δ enables adjusting of the updating weight α of nodes near the winning node, in the event of employing SMA as the updating method for updating the time-sequence pattern storage network.

An arrangement can be made wherein the value of the attenuation coefficient Δ is great at the time of starting updating (learning) of the time-sequence pattern storage network, and then the value decreases over time, i.e., as the number of times of updating increases. In this case, at the time of starting of updating of the time-sequence pattern storage network, the updating weight α of each node of the time-sequence pattern storage network is determined according to the distance/weight curve which has a gentle change of updating weight α as to inter-pattern distance d, and as updating (learning) progresses, the updating weight α of each node of the time-sequence pattern storage network is determined according to the distance/weight curve of which change of updating weight α as to inter-pattern distance d becomes steeper.

That is to say, in this case, updating of the winning node (more particularly, the time-sequence pattern model 21 thereof) thereof is powerfully influenced by new time-sequence data stored in the time-sequence data storage unit 31 (FIG. 11), regardless of the progress of learning (updating). On the other hand, updating of nodes (more particularly, the time-sequence pattern models 21 thereof) other than the winning node are affected by the new time-sequence data over a relatively wide range of nodes at the time of starting learning, i.e., from nodes with a small inter-pattern distance d as to the winning node, to nodes of which the inter-pattern distance d as to the winning node is somewhat great. As learning processes, updating of nodes other than the winning node gradually comes to be performed so as to be affected by the new time-sequence data only within a narrow range.

The weight determining unit 43 shown in FIG. 11 determines the updating weight α of each node of the time-sequence pattern storage network, and the learning data updating unit 44 updates the learning data stored in the learning data storage unit 22 which each node has, based on the updating weight α of that node.

Next, an updating method for updating the learning data stored in the learning data storage unit 22 which a node has will be described with reference to FIG. 13.

Now, let us say that a learning data storage unit 22 which a certain node $N_i$ has already has learning data stored therein, and the time-sequence pattern model 21 of the node $N_i$ is due to learning performed using the learning data already stored in the learning data storage unit 22.

As described above, the learning data updating unit 44 mixes the learning data already stored in the learning data storage unit 22 which the node $N_i$ has (hereinafter referred to as "old learning data"), and the new time-sequence data stored in the time-sequence data storage unit 31 (FIG. 11), according to the updating weight α of the node $N_i$ from the weight determining unit 43, and stores the mixed results thereof in the learning data storage unit 22 as new learning data, thereby updating the stored contents of the learning data storage unit 22 to new learning data.

That is to say, by adding new time-sequence data to the old learning data, the learning data updating unit 44 yields new learning data wherein the old learning data and new time-sequence data are mixed, with addition of new time-sequence data to the old learning data (mixing of the old learning data and the new time-sequence data) being performed according to a ratio corresponding to the updating weight α of the node $N_i$.

Now, updating to the time-sequence pattern model 21 (FIG. 7) of the node $N_i$ is performed by learning using the new learning data, so changing the ratio at which the new time-sequence data and the old learning data are mixed enables the degree (intensity) of effect of the new time-sequence data on the time-sequence pattern model 21 due to updating to be changed.

A value corresponding to the updating weight α of the node $N_i$ is employed for the ratio at which the new time-sequence data and the old learning data are mixed at the node $N_i$, and for example, a value is used wherein the greater the updating weight α is, the greater the percentage of the new time-sequence data is (i.e., the percentage of the old learning data is small).

Specifically, a certain number of sets of time-sequence data (learning data) is stored in the learning data storage unit 22 of the node $N_i$, this certain number being represented by H. In this case, the learning of the time-sequence pattern model 21 of the node $N_i$ is always performed using H sets of learning data (time-sequence data).

In the event that the certain number H of sets of learning data is always stored in the learning data storage unit 22, the number of sets of new learning data obtained by mixing the new time-sequence data and the old learning data needs to be H, and as a method for performing mixing of the new time-sequence data and the old learning data at a ratio corresponding to the updating weight α of the node $N_i$ in this way, there is a method of mixing the new time-sequence data and the old learning data at a ratio of α:H−α.

Figure 13:
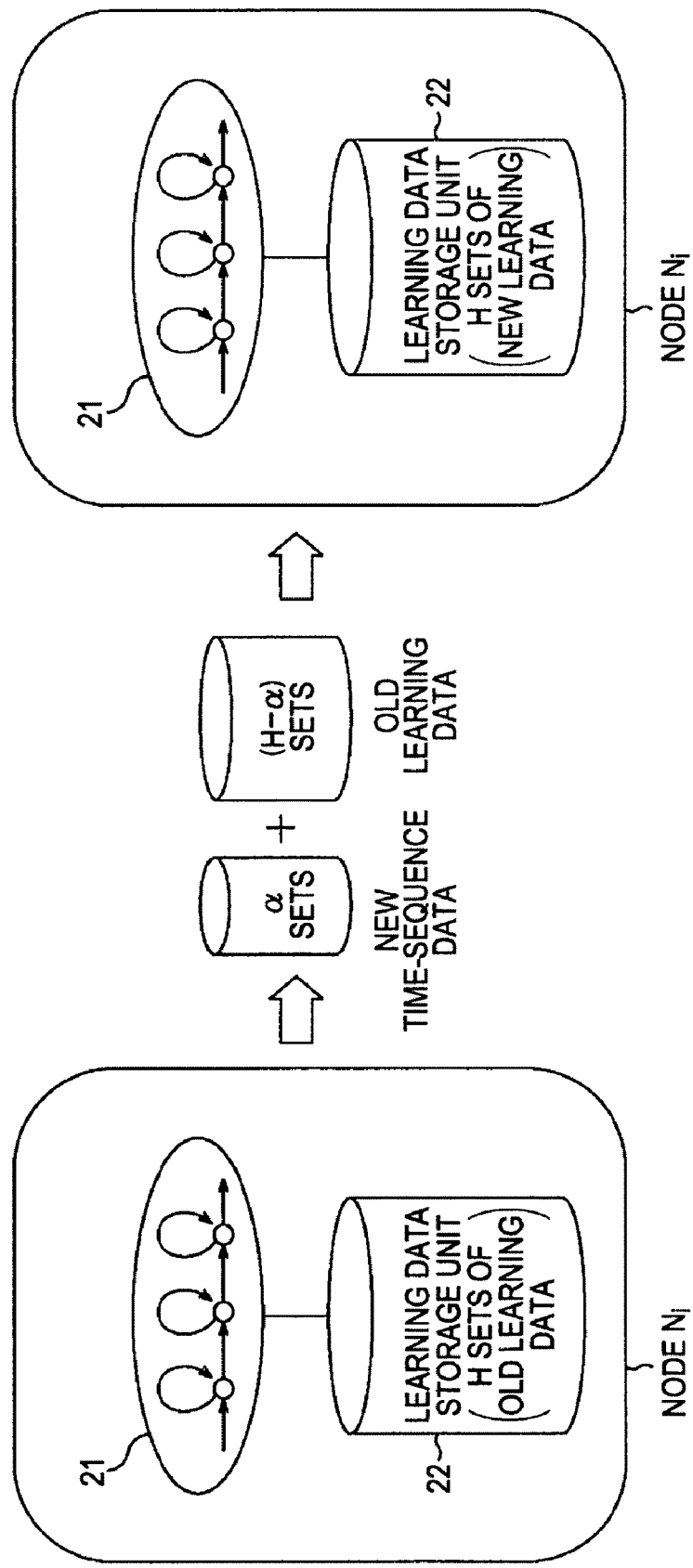
FIG. 13 is a diagram for describing an updating method for updating learning data to be stored in a learning data storage unit 22.

AS for a specific method to mix the new time-sequence data and the old learning data at a ratio of α:H−α, as shown in FIG. 13, there is a method wherein α sets of new time-sequence data are added to H−α sets of old learning data out of the H sets of old learning data, thereby obtaining H sets of new learning data.

In this case, if we say that the number H of time-sequence data stored in the learning data storage unit 22 is 100 for example, and the updating weight α of the node $N_i$ is 8 for example, the stored contents of the learning data storage unit 22 is updated to 100 new sets of learning data, obtained by adding 8 sets of new time-sequence data to 92 out of the 100 sets of old learning data.

While there is a method of adding the α sets of new time-sequence data to the H−α sets of old learning data out of the H sets of old learning data, by waiting for α sets of new time-sequence data to be obtained, this method does not enable the stored contents of the learning data storage unit 22 to be updated each time a single set of time-sequence data is obtained.

Accordingly, updating of the stored contents of the learning data storage unit 22 can be performed such that each time a single new set of time-sequence data is obtained, α sets of the new time-sequence data are added to the H−α sets of old learning data. That is to say, the single new set of time-sequence data is copied to make α sets of new time-sequence data, and the α sets of new time-sequence data are added to the H–α sets of old learning data obtained by removing α sets of old learning data from the H sets of old learning data, starting from the oldest, thereby updating the stored contents of the learning data storage unit 22. Thus, the stored contents of the learning data storage unit 22 can be obtained each time a single new set of time-sequence data is obtained.

Thus, updating the stored contents of the learning data storage unit 22 means that only the newest H sets of time-sequence data are held as learning data in the learning data storage unit 22 at all times, with the ratio (percentage) of the new time-sequence data in the learning data being adjusted by the updating weigh α.

Next, the learning processing of learning with the time-sequence pattern storage network, performed at the data processing device shown in FIG. 9, will be described with reference to the flowchart shown in FIG. 14.

First, in step S1, the learning processing unit 32 of the learning unit 4 (FIG. 10) performs initialization processing, for initializing parameters of the time-sequence pattern storage network stored in the storage unit 5, i.e., parameters of the HMM for example, serving as the time-sequence pattern model 21 (FIG. 7) which each node of the time-sequence pattern storage network has. This initialization processing yields a suitable initial value for the HMM parameters (state transition probability and output probability density function). Note that there is no particular restriction on what sort of initial values are given to the HMM parameters in the initialization processing.

Subsequently, in step S2, upon a single set of data to be processed, i.e., audio data of a single audio section for example, being input to the signal input unit 1, the signal input unit 1 supplies the data to be processed to the features extracting unit 2. The features extracting unit 2 extracts feature quantity from the data to be processed, and supplies time-sequence data of the feature quantity (a single new set of time-sequence data) to the learning unit 4.

The learning unit 4 (FIG. 10) temporarily stores the new time-sequence data from the features extracting unit 2 in the time-sequence data storage unit 31, and in the following steps S3 through S7, updates (learns) the time-sequence pattern storage network stored in the storage unit 5 in a self-organizing manner, based on the new time-sequence data stored in the time-sequence data storage unit 31 (more particularly, the observation values thereof).

That is to say, at the learning processing unit 32 (FIG. 11) of the learning unit 4, in step S3, the score calculating unit 41 reads out the new time-sequence data stored in the time-sequence data storage unit 31, and obtains a score representing the degree to which a node matches the new time-sequence data, for every node of the time-sequence pattern storage network stored in the storage unit 5.

Specifically, in the event that the time-sequence pattern model 21 (FIG. 7) which a node has is an HMM for example, the log likelihood that new time-sequence data will be observed is obtained as a score. An example of a method for calculating the log likelihood is to use a Viterbi algorithm.

Upon calculating scores for new time-sequence data for all of the nodes which the time-sequence pattern storage network has, the score calculating unit 41 supplies the scores for each of the nodes to the winning node determining unit 42.

In step S4, the winning node determining unit 42 obtains, of the nodes making up the time-sequence pattern storage network, the node with the highest score given from the score calculating unit 41, and determines this node to be the winning node. The winning node determining unit 42 then supplies a node label serving as information representing the winning node to the weight determining unit 43.

In step S5, the weight determining unit 43 determines the updating weight for each of the nodes making up the time-sequence pattern storage network, using the winning node which the node label from the winning node determining unit 42 represents as a reference.

That is to say, as described with FIG. 12, the weight determining unit 43 determines the updating weight α of each node making up the time-sequence pattern storage network, following the distance/weight curve given in Expression (3) wherein the change of the updating weight α, which changes as to change in the inter-pattern distance d, becomes more steep updating (learning) of the time-sequence pattern storage network progresses, and supplies the determined updating weight α to the learning data updating unit 44.

In step S6, the learning data updating unit 44 updates the learning data stored in the learning data storage unit 22 (FIG. 7) which each node in the time-sequence pattern storage network has, according to the updating weight of the corresponding node as supplied from the weight determining unit 43. That is to say, as described with reference to FIG. 13, the learning data updating unit 44 mixes the new time-sequence data stored in the time-sequence data storage unit 31 and the old learning data stored in the learning data storage unit 22 of the node, according to the ratio α:H–α corresponding to the updating weight α of that node, thereby obtaining H sets of new learning data, and updating the stored contents of the learning data storage unit 22 with the H sets of new learning data.

Upon updating the stored contents of the learning data storage unit 22 (FIG. 7) of all of the nodes of the time-sequence pattern storage network, the learning data updating unit 44 supplies an end notification to the effect that updating has ended, to the model learning unit 45.

Upon receiving the end notification from the learning data updating unit 44, in step S7 the model learning unit 45 updates the parameters of the time-sequence pattern storage network.

That is to say, the model learning unit 45 performs learning of the time-sequence pattern model 21 for each node of the time-sequence pattern storage network, using the new learning data stored in the learning data storage unit 22 following updating by the learning data updating unit 44, thereby updating the time-sequence pattern model 21.

Specifically, in the event that the time-sequence pattern model 21 of a node is an HMM for example, the new learning data stored in the learning data storage unit 22 which the node has is used for learning of the HMM. With this learning, for example, with the state transition probability and the output probability density function of the current HMM (obtained with learning using old learning data) serving as the initial value, and using new learning data, a new state transition probability and output probability density function are each obtained with the Baum-Welch method. Then with this new state transition probability and output probability density function, the state transition probability and the output probability density function of the HMM are each updated.

Subsequently, the flow returns from step S7 to S2, and after awaiting for the next data to be processed to be input to the signal input unit 1, the same processing is thereafter repeated.

Figure 14:
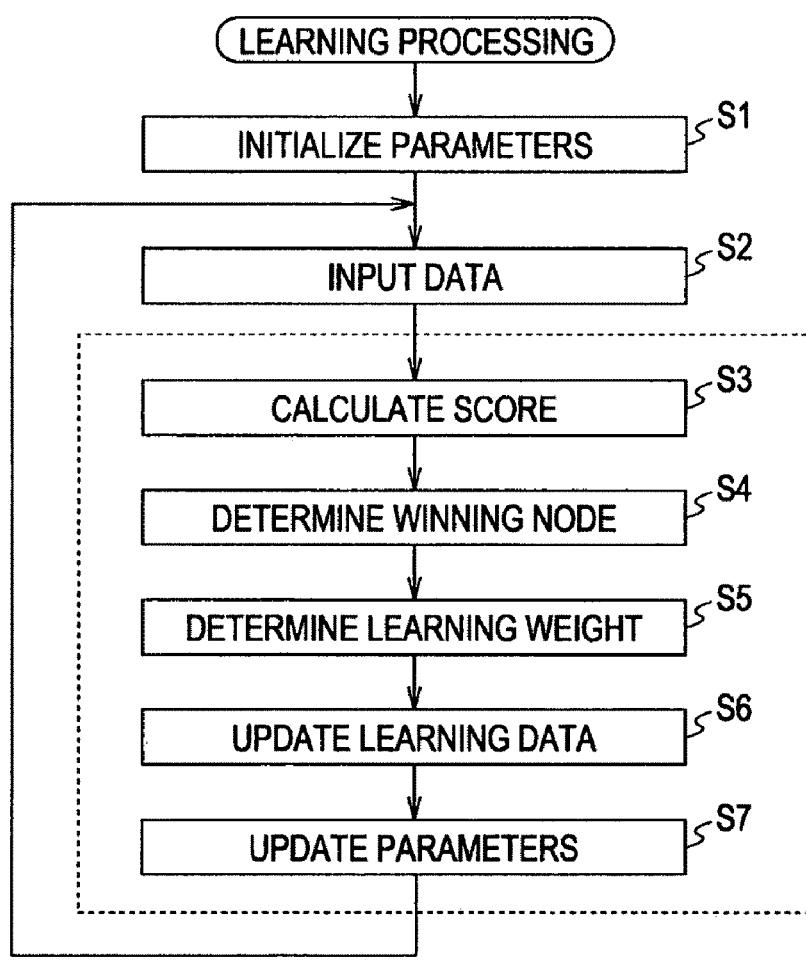
FIG. 14 is a flowchart for describing learning processing.

With the learning processing shown in FIG. 14, upon a single new set of time-sequence data being obtained, a winning node is determined regarding that new time-sequence data from the nodes making up the time-sequence pattern storage network (step S4). Further, with the winning node as a reference, the updating weight of each node making up the time-sequence pattern storage network is determined (step S5). Based on the updated weight, the parameters of the time-sequence pattern model 21 (FIG. 7) of each node making up the time-sequence pattern storage network are updated.

That is to say, with the learning processing in FIG. 14, updating of the parameters of the nodes making up the time-sequence pattern storage network is performed once for every new set of time-sequence data, and subsequently, updating of node parameters is repeated in the same way each time a new set of time-sequence data is obtained, thereby carrying out learning is a self-organizing manner.

By learning being sufficiently performed, the time-sequence pattern model 21 which each node of the time-sequence pattern storage network has learns (acquires) a certain time-sequence pattern. The number (types) of time-sequence patterns learnt in the entire time-sequence pattern storage network matches the number of nodes of the time-sequence pattern storage network, so in the event that the number of nodes which the time-sequence pattern storage network has is 100, this means that 100 types of time-sequence patterns are learnt. These time-sequence patterns enable the recognition unit 3 (FIG. 9) to perform recognition processing for recognizing time-sequence data (data to be processed), and the generating unit 6 (FIG. 9) to perform generating processing for generating time-sequence data.

Figure 15:
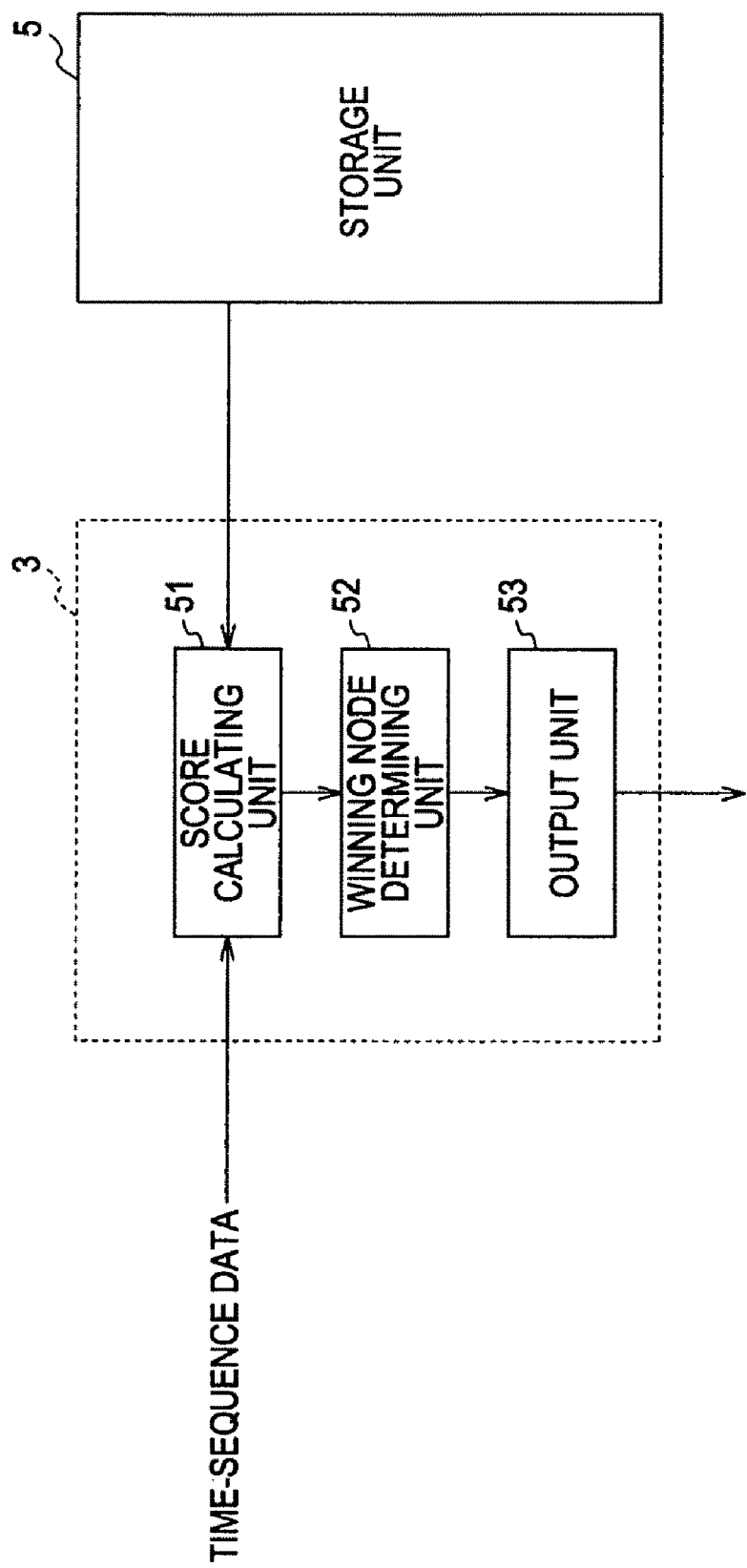
FIG. 15 is a block diagram illustrating a configuration example of a recognizing unit 3.

Next, FIG. 15 illustrates a configuration example of the recognizing unit 3 shown in FIG. 9.

As described with FIG. 9, the recognizing unit 3 is supplied with a single set of time-sequence data from the features extracting unit 2, and this time-sequence data is supplied to the score calculating unit 51.

As with the score calculating unit 41 of the learning processing unit 32 (FIG. 11), the score calculating unit 51 obtains, from each node making up the time-sequence pattern storage network stored in the storage unit 5, the score indicating the degree to which that score matches the time-sequence data, more particularly the observation value thereof, from the features extracting unit 2, and supplies this to a winning node determining unit 52.

As with the winning node determining unit 42 of the learning processing unit 32 (FIG. 11), the winning node determining unit 52 obtains the node in the time-sequence pattern storage network stored in the storage unit 5 which most closely matching the time-sequence data from the features extracting unit 2, and determines that node to be the winning node.

That is to say, of the nodes making up the time-sequence pattern storage network stored in the storage unit 5, the winning node determining unit 52 determines the node which has the highest score from the score calculating unit 51 to be the winning node. The winning node determining unit 52 then supplies a node label, serving as information representing the winning node, to an output unit 53.

The output input 53 outputs the node label representing the winning node from the winning node determining unit 52 as recognition results of the data to be processed that has been input to the signal input unit 1, corresponding to the time-sequence data of the feature quantity from the features extracting unit 2, and consequently to the feature quantity thereof.

Note that one of the score calculating unit 51 of the recognizing unit 3 and the score calculating unit 41 of the learning processing unit 32 (FIG. 11) can double as the other. This also holds true for the winning node determining unit 52 of the recognizing unit 3 and the winning node determining unit 42 of the learning processing unit 32 (FIG. 11).

Figure 16:
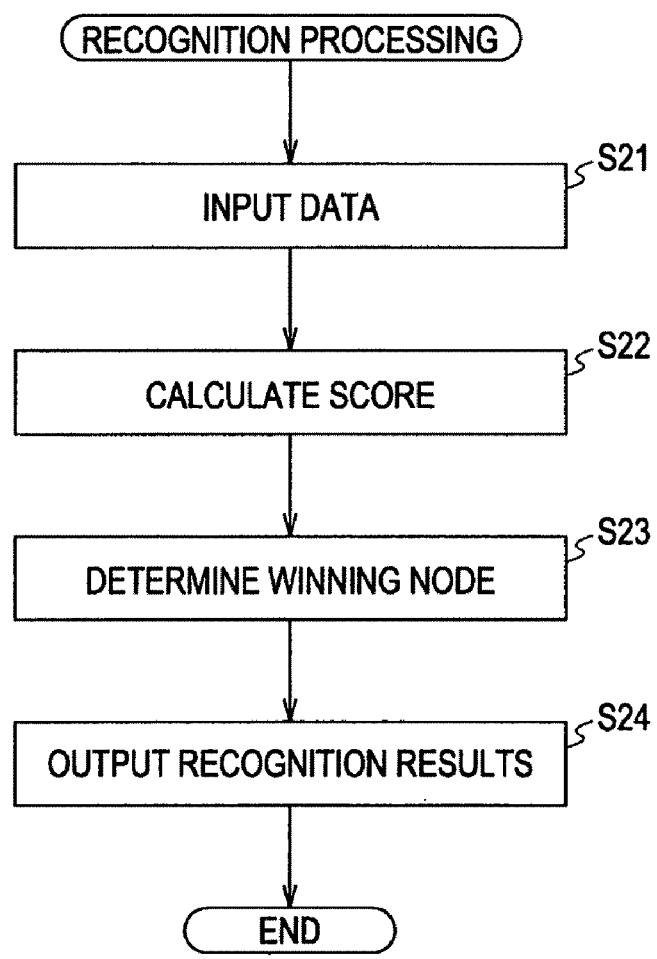
FIG. 16 is a flowchart for describing recognition processing.

Next, recognition processing performed for recognition of the time-sequence data, which is performed at the data processing device shown in FIG. 9, will be described with reference to the flowchart in FIG. 16.

In step S21, upon a single set of data to be processed, i.e., audio data (time-sequence data) of a single audio section for example, being input to the signal input unit 1, the signal input unit 1 supplies the data to be processed to the features extracting unit 2. The features extracting unit 2 extracts feature quantity from the data to be processed, and supplies time-sequence data of the feature quantity to the recognizing unit 3.

In step S22, at the recognizing unit 3 (FIG. 15) the score calculating unit 51 obtains the score which represents the degree to which each node making up the time-sequence pattern storage network stored in the storage unit 5 matches the time-sequence data from the features extracting unit 2, and supplies this to the winning node determining unit 52.

In step S23, the winning node determining unit 52 obtains the node of the nodes making up the time-sequence pattern storage network which has the highest score from the score calculating unit 51, and determines that node to be the winning node. The winning node determining unit 52 then supplies a node label serving as information representing the winning node to the output unit 53.

The output unit 53 outputs the node label from the winning node determining unit 52 as the recognition (perception) results of the time-sequence data from the features extracting unit 2 (data to be processed which has been input to the signal input unit 1), and ends the processing.

Note that the node label (the node label of the winning node) which the output unit 53 outputs can be supplied to the generating unit 6 as control data.

According to recognition processing using a time-sequence pattern storage network such as described above, recognition results of a fineness corresponding to the number of the nodes in the time-sequence pattern storage network can be obtained.

That is to say, let us say that learning of the time-sequence pattern storage network is being performed using audio data obtained from voices of three categories, "A", "B", and "C", for example.

In the event that the audio data of the three categories, "A", "B", and "C" used for learning with the time-sequence pattern storage network include speech by a great number of speakers, there will be a wide variety of audio data for the same category "A" audio data for example, depending on speech speed, intonation, age of the speaker, gender, and so forth.

With supervised teaching, learning using the that the audio data of the categories, "A", "B", and "C" is performed separately, i.e., learning with the audio data of the category "A" is performed alone, learning with the audio data of the category "B" is performed alone, and learning with the audio data of the category "C" is performed alone, so there can be no variations due to difference in speech speed and the like in the learning results for each category.

On the other hand, with learning with a time-sequence pattern storage network, the audio data of the categories, "A", "B", and "C" is performed with no distinction (classification) thereof. Further, as described above, with a time-sequence pattern storage network, time-sequence patterns of a number equal to the number of nodes of the time-sequence pattern storage network are learnt.

Accordingly, with a time-sequence pattern storage network, if the number of nodes thereof is greater than three, there may be cases wherein, though multiple nodes learn the same audio data of the category "A", one node learns one variation (or the time-sequence pattern thereof) of the audio data of the category "A", while another node learns another variation thereof.

Thus, in the event that multiple nodes learn various variations of the audio data of the category "A", upon the audio data of the category "A" being input as data to be processed, the node which most closely matches the data to be processed is determined as the winning node from the multiple nodes which have learnt the audio data of the category "A", and the node label of that winning node is output as the recognition results.

That is to say, with the recognition processing using a time-sequence pattern storage network, determination is not made based on which category audio data of the categories "A", "B", and "C" the data to be processed is, but rather which of the time-sequence patterns, of a number equivalent to the number of nodes, acquired by the time-sequence pattern storage network by learning, matches most closely (is similar).

That is to say, with learning with a time-sequence pattern storage network, time-sequence patterns are acquired at a fineness corresponding to the number of nodes of the time-sequence pattern storage network, and with recognition using a time-sequence pattern storage network, time-sequence data is classified at a fineness corresponding opt the number of nodes of the time-sequence pattern storage network.

Note that suitably applying true labels of the categories "A", "B", and "C" to each of the nodes of a time-sequence pattern storage network which has performed sufficient learning enables recognition results regarding to which category audio data of the categories "A", "B", and "C" the time-sequence data (the data to be processed) is to be obtained, in the recognition processing using the time-sequence pattern storage network.

Figure 17:
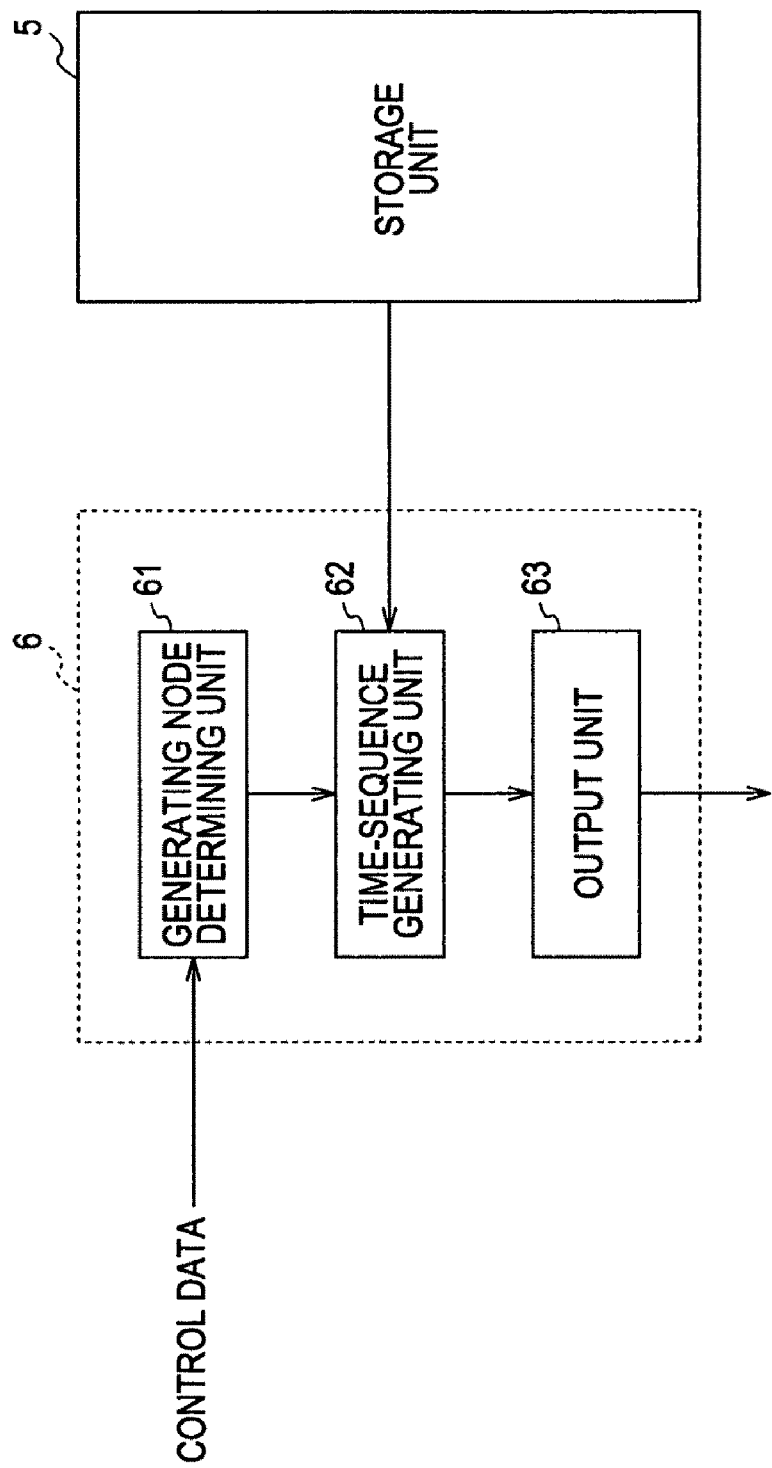
FIG. 17 is a block diagram illustrating a configuration example of a generating unit 6.

Next, FIG. 17 illustrates a configuration example of the generating unit 6 shown in FIG. 9.

AS described with FIG. 9, control data is supplied to the generating unit 6. The control data supplied to the generating unit 6 represents one of the time-sequence patterns stored in the time-sequence pattern storage network stored in the storage unit 5, and consequently represents one of the nodes making up the time-sequence pattern storage network, in the form of a node label for example.

The control data supplied to the generating unit 6 is supplied to a generating node determining unit 61. The generating node determining unit 61 determines the node of the time-sequence pattern storage network stored in the storage unit 5 which the control data supplied to itself indicates, to be the node to be used for generating the time-sequence data (hereinafter referred to as "generating node"), and supplies the determination results thereof to the time-sequence generating unit 62.

That is to say, the generating node determining unit 61 determines the node which the node label serving as control data that has been supplied to itself to be the generating node, and supplies the determination results to the time-sequence generating unit 62.

Following the determination results from the generating node determining unit 61, the time-sequence generating unit 62 generates time-sequence data based on the time-sequence pattern model 21 (FIG. 7) which the generating node has, and supplies this to an output unit 63.

Now, in the event that the time-sequence pattern model 21 is an HMM for example, the time-sequence generating unit 62 generates time-sequence data wherein the output probability representing the likelihood that the time-sequence data in the HMM serving as the time-sequence pattern model 21 of the generating node is greatest. Note that there is a method regarding generating time-sequence data using an HMM, wherein time-sequence data can be generated which changes smoothly, by using dynamic feature quantity. The time-sequence generating unit 62 can generate time-sequence data by this method. Such a generating method of time-sequence pattern is described in, for example, K. Tokuda, T. Yoshimura, T Masuko, T. Kobayashi, T. Kitamura, "Speech Parameter Generation Algorithms for HMM-Based Speech Synthesis", Proc. of ICASSP 2000, vol. 3, pp. 1315-1318, June 2000.

Also, another example of generating time-sequence data using an HMM that has been proposed is a method for repeating time-sequence data generation based on probabilistic trial using HMM parameters, which is then averaged, thereby generating time-sequence data from an HMM. Details thereof are described in, for example, T. Inamura, H. Tanie, Y. Nakamura, "Key-Frame Extraction of Time-Sequence Data Using a Continuous Distribution Type Hidden Markov Model", Proc. on JSME Conference on Robotics and Mechatronics 2003, 2P1-3F-C6, 2003.

The output unit 63 converts the time-sequence data from the time-sequence generating unit 62 into time-sequence data equivalent to the data to be processed, and outputs. That is to say, the time-sequence data generated at the time-sequence generating unit 62 is the time-sequence data of the feature quantity used for learning of the time-sequence pattern model 21 which the node has, and the output unit 63 converts the time-sequence data of that feature quantity into the data to be processed (or more particularly, into data equivalent to the data to be processed) and outputs.

Specifically, if we say that the data to be processed is audio data for example, and the features extracting unit 2 extracts a Mel frequency cepstrum coefficient from the audio data as the feature quantity, the Mel cepstrum time-sequence data is learnt by the time-sequence pattern model 21, so the time-sequence data generated by the time-sequence generating unit 62 based on the time-sequence pattern model 21 (FIG. 7) of the node is Mel cepstrum time-sequence data. The output unit 63 converts the Mel cepstrum (more particularly, the time-sequence data thereof) generated at the time-sequence generating unit 62 into audio data which is time-sequence data equivalent to the data to be processed.

As for a method for converting Mel cepstrum time-sequence data into audio data (audio of the time region), there is a method for filtering the Mel cepstrum time-sequence data with a synthesis filter called an MLSA filter (Mel Log Spectrum Approximation filter). Details of the MLSA filter are described in, for example, H. Imai, K. Sumida, C. Furuichi, "Mel Log Spectrum Approximation (MLSA) Filter for Audio Synthesis", Journal (A) of The Institute of Electronics, Information and Communication Engineers J66-A, 2, pp. 122-129, 1983, and K. Tokuda, T. Kobayashi, H. Saito, T. Fukada, H. Imai, "Spectral Estimation of Audio with Mel Cepstrum as a Parameter", Journal (A) of The Institute of Electronics, Information and Communication Engineers J74-A, 8, pp. 1240-1248, 1991.

Figure 18:
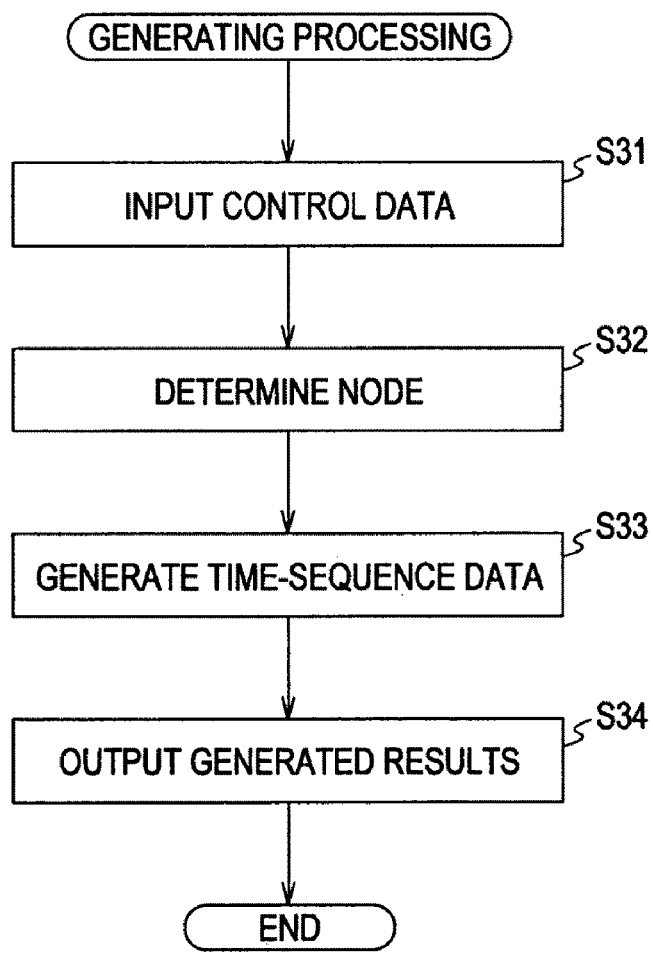
FIG. 18 is a flowchart for describing generating processing.

Next, the generating processing for generating the time-sequence data (data to be processed), which is performed at the data processing device shown in FIG. 9, will be described with reference to the flowchart in FIG. 18.

In step S31, the control data is input to the generating unit 6 (FIG. 17). The control data is supplied to the generating node determining unit 61. The generating node determining unit 61 determines the node of the nodes making up the time-sequence pattern storage network stored in the storage unit 5 which is represented by the node label serving as the control data to be the generating node, and supplies the determination results thereof to the time-sequence generating unit 62.

In step S33, the time-sequence generating unit 62 follows the determination results from the generating node determining unit 61 to generate time-sequence data based on the time-sequence pattern model 21 (more particularly, the parameters thereof) of the generating node, out of the nodes making up the time-sequence pattern storage network stored in the storage unit 5, and supplies this to the output unit 63. In step S34 the output unit 63 converts the time-sequence data from the time-sequence generating unit 62 into time-sequence data equivalent to the data to be processed, and outputs.

With generating processing using a time-sequence pattern storage network such as described above, time-sequence data of time-sequence patterns corresponding to the number of nodes of the time-sequence pattern storage network can be generated.

As described above, a time-sequence pattern storage network configured of multiple nodes each having a time-sequence pattern model 21 is updated in a self-organizing meaner, based on time-sequence data, so unsupervised learning of time-sequence data of which the length is not constant, not to mention time-sequence data of which the length is constant, i.e., what may be called autonomous learning of time-sequence data, can be performed easily, i.e., in a practical manner.

That is to say, each node of the time-sequence pattern storage network has a time-sequence pattern model 21, so in the learning of the time-sequence pattern storage network, updating of a node, i.e., updating of the time-sequence pattern model 21 of the node, does not affect updating of other nodes. Accordingly, even if there is one more node making up the time-sequence pattern storage network, only the extra amount of calculations required for learning with the time-sequence pattern storage network is only that necessary for updating that one node, so even in the event that the magnitude of the time-sequence pattern storage network is made to be great, i.e., a great number of nodes make up the time-sequence pattern storage network, the amount of calculations necessary for learning of the time-sequence pattern storage network does not drastically increase. Accordingly, self-organizing learning can be easily performed even with a large-scale time-sequence pattern storage network.

Further, with learning with such a time-sequence pattern storage network, time-sequence patterns representing stochastic properties of the time-sequence data are stored in the nodes, so the time-sequence patterns can be used to easily recognize and generate time-sequence data.

Note that learning processing, recognition processing and generating processing, can be performed with regard to, for example, audio data, image data, motor driving signals (motor data), and any other time-sequence data. Specifically, an application may be made of the data processing device shown in FIG. 9 to an autonomous system such as that of an autonomous robot, wherein signals output by sensors equivalent to the vision, hearing, touch, and so forth, of the robot, signals controlling the motors driving portions of the robot corresponding to arms and legs, signals provided to a device for generating synthesized sound or LEDs corresponding to the eyes, and so forth, can be handled as the time-sequence data which is the object of learning processing, recognition processing, and generating processing.

Also, with the present embodiment, description has been made regarding an arrangement wherein an HMM, which is a type of state transition probability model, is employed as the time-sequence pattern model 21 (FIG. 7) of a node, but other state transition probability models may be used for the time-sequence pattern model 21.

An example of another state transition probability model which can be used as the time-sequence pattern model 21 is a Bayesian network.

With a Bayesian network, dependency between variables are represented with a graph structure, and modeling is performed by assigning conditioned probabilities to the nodes, wherein time-sequence data can be modeled by constructing a state transition probability model following the time axis in particular.

Determination of the graph structure of a Bayesian network is performed by selecting a model taking into consideration, for example, the likelihood of learning data and the complexity of the graph structure. Estimation of conditioned probability uses, for example, maximum likelihood estimation or EM (Expectation Maximization) algorithms or the like. Details of Bayesian networks are described in, for example, Y. Motomura, "Information Representation for Uncertainty Modeling: Bayesian Networks", 2001, Bayesian Network Tutorial.

In addition to state transition probability models such as HMMs and Bayesian Networks as described above, models approximating functions (hereafter referred to "function approximation models" as appropriate) can be employed as the time-sequence pattern model 21 (FIG. 7).

A function approximation model is a model which uses a function f( ) to represent a time-sequence pattern with a differential equation $\{x(t)\}'=f(x(t))$, difference equation $x(t+1)=f(x(t))$, and so forth, wherein the function f( ) characterizes the time-sequence pattern. Note that t represents the point-in-time, i.e., the sampling point, and x(t) represents the sampled value of the time-sequence data at the point-in-time t, or the time-sequence data observed up to point-in-time t (starting from 0). Further, $\{x(t)\}'$ represents the first derivation as to the time t of the time-sequence data x(t).

Calling a function f( ) showing (corresponding to) a given time-sequence pattern from the learning data (time-sequence data) time-sequence pattern function approximation, there is, as a method of time-sequence pattern function approximation, a method wherein the function f( ) is expressed using a polynomial or the like, for example, and the coefficient of the polynomial thereof is determined from the learning data, or a method wherein the function f( ) is expressed with a neural network and the parameters of the neural network thereof is determined from the learning data.

With a time-sequence pattern function approximation of the function f( ) expressed with a polynomial, the determination (assumption) of the coefficient of such polynomial can be performed by the method of steepest descent or the like, for example. Also, with a time-sequence pattern function approximation of the function f( ) expressed with a neural network, the determination of the parameters of such neural network can be performed by a back propagation method, for example. With the back propagation method, input and output data is provided to a neural network, and learning of the parameters of the neural network is performed so as to satisfy the relation of such input and output data.

For example, in a case of employing a functional approximation model wherein the time-sequence pattern model 21 is represented with a difference equation $x(t+1)=f(x(t))$ using a function f( ), the weight (intermediate layer) between the input layer x(t) and the output layer x(t+1) is the parameter of the neural network, with this parameter being learnt using the learning data (time-sequence data). Learning of parameters of a neural network is performed by first providing an appropriate initial value, and then performing back propagation. Note that a recurrent neural network, for example, and be employed for the neural network.

In the same way as with the above case of employing an HMM as the time-sequence pattern model 21, there is the need to determine a winning node with learning with time-sequence pattern storage networks configured of nodes having time-sequence pattern models 21 wherein the function f( ) is expressed by a neural network, as well. There is the need for score calculation regarding new time-sequence data for each node of the time-sequence pattern storage network in order to determine the winning node.

This score may be, for example, error between the observation values (actual values) of the new time-sequence data, and the logical value of the new time-sequence data is obtained from the time-sequence pattern model 21 wherein the function f( ) is expressed by a neural network (e.g., the square sum of difference). In this case, the node with the smallest score value is determined to be the winning node which is the node most closely matching the new time-sequence data.

After determining the winning node, the updating weight of each node is determined, and subsequently, the parameters of each node of the neural network can be updated with the same procedures as those employed with the above-described time-sequence pattern model 21 using an HMM.

Note that in the event that the score is likelihood for example, the greater the score is, the better, and in the event that the score is error or distance for example, the smaller the score is, the better.

Next, description will be made regarding a forward model and inverse model to which a time-sequence pattern storage network such as described above is applied.

Figure 19:
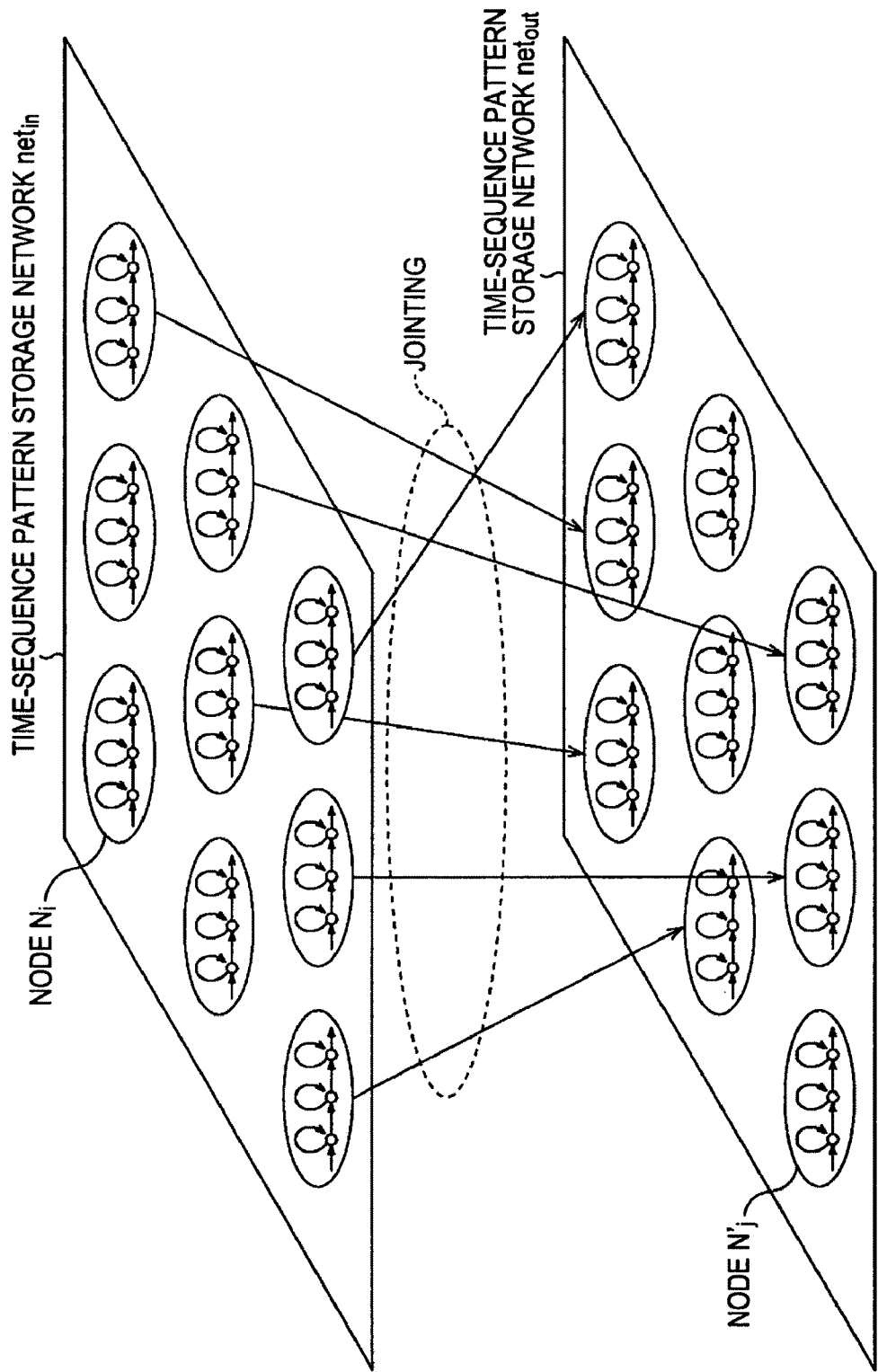
FIG. 19 is a diagram illustrating a configuration example of an input/output relation model.

FIG. 19 schematically illustrates a configuration example of an input/output relation model serving as a forward model or inverse model to which a time-sequence pattern storage network has been applied.

In FIG. 19, the input/output relation model has two time-sequence pattern storage networks, a time-sequence pattern storage network $net_{in}$ and a time-sequence pattern storage network $net_{out}$. Further, the input/output relation model in FIG. 19 is a jointed model wherein the nodes $N_i$ (wherein i=1, 2, and so on up to the total number of nodes) of the time-sequence pattern storage network $net_{in}$ and the nodes $N'_j$ (wherein j=1, 2, and so on up to the total number of nodes) of the time-sequence pattern storage network $net_{out}$ are jointed.

In FIG. 19, the arrows between the nodes $N_i$ of the time-sequence pattern storage network $net_{in}$ and the nodes $N'_j$ of the time-sequence pattern storage network $net_{out}$ represents the jointing of the nodes $N_i$ and $N'_j$.

Note that the time-sequence pattern storage networks $net_{in}$ and $net_{out}$ may have an equal number of nodes and links (including cases without links), or have different numbers of nodes and links. Also, the time-sequence pattern model 21 (FIG. 7) of the nodes $N_i$ of the time-sequence pattern storage network $net_{in}$ and the time-sequence pattern model 21 of the nodes node $N'_j$ of the time-sequence pattern storage network $net_{out}$ may be the same time-sequence pattern models, or may be different time-sequence pattern models.

Figure 20:
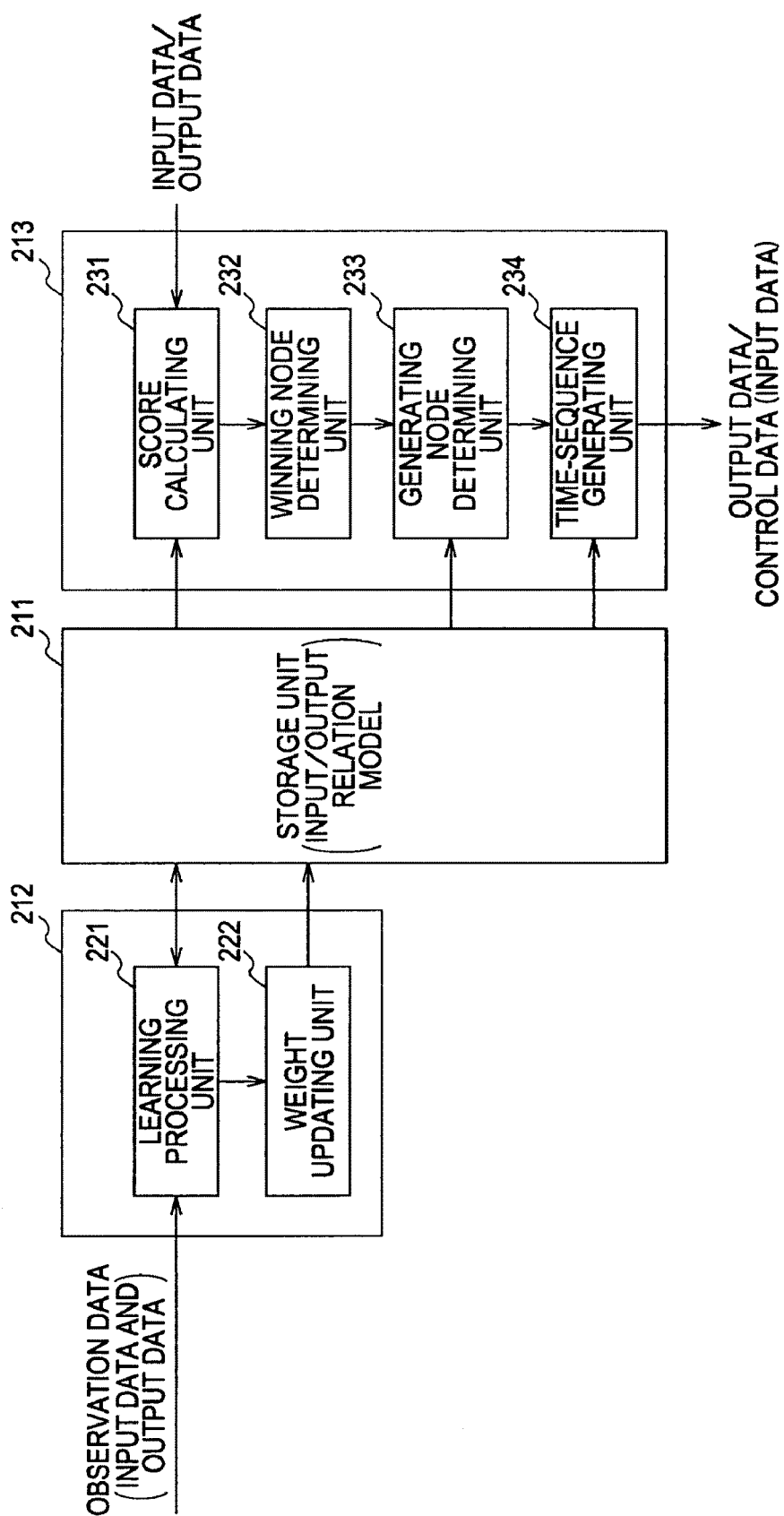
FIG. 20 is a block diagram illustrating a configuration example of a data processing device which performs processing using an input/output relation model.

Next, FIG. 20 illustrates a configuration example of a data processing device which performs various types of processing, using an input/output relation model.

With the data processing device shown in FIG. 20, the object of control is modeled into a forward model or inverse model with the input/output relation model shown in FIG. 19, and further, output data obtained from the object of control, and control data (input data) to be provided to the object of the control, are estimated using the input/output relation model serving as a forward model or inverse model.

In FIG. 20, the data processing device is configured of a storage unit 211, learning unit 212, and recognition generating unit 213.

The storage unit 211 stores the input/output relation model shown in FIG. 19 for example, and so forth.

Supplied to the learning unit 212 is teaching data, which is a set of input data (more particularly, the observation values thereof) to be provided to the object of control which is to be modeled, and output data (more particularly, the observation values thereof) to be obtained from the object of control as to the input data. Here, the teaching data is a set of input data which is time-sequence data of a certain section (time-sequence data spanning a certain time span) and output data which is other time-sequence data of the section, obtained from the object of control with regard to the time-sequence data of that section.

The learning unit 212 performs learning of the input/output relation model serving as the forward model or inverse model of the object of control, using the teaching data supplied thereto.

The learning unit 212 is configured from a learning processing unit 221 and weight updating unit 222.

The learning processing unit 221 is configured in the same way as the learning processing unit 32 shown in FIG. 11, and updates the time-sequence pattern storage network $net_{in}$ of the input/output relation model (FIG. 19) stored in the storage unit 211 in a self-organizing manner, in the same way as with the data processing device shown in FIG. 9, based on the input data portion of the teaching data supplied to the learning unit 212. Also, the learning processing unit 221 updates the time-sequence pattern storage network $net_{out}$ of the input/output relation model (FIG. 19) stored in the storage unit 221 in a self-organizing manner, in the same way as with the data processing device shown in FIG. 9, based on the output data portion of the teaching data (the output data portion of the teaching data, which forms a set with the input data) supplied to the learning unit 212.

Further, the learning processing unit 221 supplies to the weight updating unit 222 a label set, made up of a set of the node label of the node $N_i$ of the time-sequence pattern storage network $net_{in}$ (hereinafter referred to as "input label" where appropriate) which has become the winning node at the time of updating the time-sequence pattern storage network $net_{in}$, and the node label of the node $N'_j$ of the time-sequence pattern storage network $net_{out}$ (hereinafter referred to as "output label" where appropriate) which has become the winning node at the time of updating the time-sequence pattern storage network $net_{out}$.

The weight updating unit 222 updates the jointing relation between the nodes $N_i$ of the time-sequence pattern storage network $net_{out}$ and the nodes $N'_j$ of the time-sequence pattern storage network $net_{out}$ in the input/output relation model (FIG. 19) stored in the storage unit 211, based on the label set supplied from the learning processing unit 221.

Now, the label set supplied from the learning processing unit 221 to the weight updating unit 222 is a set of input label and output label, and the input label is the node label of the node $N_i$ of the time-sequence pattern storage network $net_{in}$ which has become the winning node at the time of updating the time-sequence pattern storage network $net_{in}$ based on the input data potion of the teaching data, and accordingly is the node label of the node $N_i$ which most closely matches the input data.

In the same way, the output label is the node label of the node $N'_j$ of the time-sequence pattern storage network $net_{out}$ which has become the winning node at the time of updating the time-sequence pattern storage network $net_{out}$ based on the output data potion of the teaching data, and accordingly is the node label of the node $N'_j$ which most closely matches the output data.

At the weight updating unit 222, the jointing relation between the node $N_i$, which, of the nodes of the time-sequence pattern storage network $net_{in}$, most closely matches the input data of the teaching data, and the nodes of the time-sequence pattern storage network $net_{out}$, is updated, and the jointing relation between the winning node $N'_j$, which, of the nodes of the time-sequence pattern storage network $net_{out}$, most closely matches the output data of the teaching data, and the nodes of the time-sequence pattern storage network $net_{in}$, is updated.

Now, the greater the degree of jointing is between the nodes of the time-sequence pattern storage network $net_{in}$ and the nodes of the time-sequence pattern storage network $net_{out}$ in the input/output relation model, a greater value of weight is used to represent the relation, so updating of the jointing relation between nodes means updating of the weight. Deltas of the method for updating the jointing relation among the nodes by the weight updating unit 222 will be described later.

Supplied to the recognition generating unit 213 is input data for estimating the output data obtained from the object of control, or output data for estimating the input data (control data) which is to be provided to the object of control such that the output data obtained from the object of control is a target value.

In the event that input data is supplied, the recognition generating unit 213 determines a winning node $N_i$ which most closely matches that input data in the time-sequence pattern storage network $net_{in}$ of the input/output relation model stored in the storage unit 211, and determines the node of the time-sequence pattern storage network $net_{out}$ which has the strongest weight with the winning node $N_i$ to be the generating node $N'_j$ for generating the time-sequence data serving as the estimation value of output data as to that input data. Further, the recognition generating unit 213 generates and outputs output data (more particularly, estimation values thereof), based on the time-sequence pattern model 21 (FIG. 7) which the generating node $N'_j$ has.

Also, in the event that output data is supplied, the recognition generating unit 213 determines a winning node $N'_j$ which most closely matches that output data in the time-sequence pattern storage network $net_{out}$ of the input/output relation model stored in the storage unit 211, and determines the node of the time-sequence pattern storage network $net_{in}$ which has the strongest weight with the winning node $N'_j$ to be the generating node $N_i$ for generating the time-sequence data serving as the estimation value of control data (input data) provided to the object of control at the time of that output data being obtained. Further, the recognition generating unit 213 generates and outputs control data (more particularly, estimation values thereof), based on the time-sequence pattern model 21 (FIG. 7) which the generating node $N_i$ has.

The recognition generating unit 213 is configured of a score calculating unit 231, winning node determining unit 232, generating node determining unit 233, and time-sequence generating unit 234.

The score calculating unit 231, winning node determining unit 232, generating node determining unit 233, and time-sequence generating unit 234 are arranged to be able to recognize whether the data supplied to the recognition generating unit 213 is input data or output data. That is to say, information is supplied to the recognition generating unit 213 separately from the data supplied thereto, or along with the data supplied thereto, indicating whether the data is input data or output data. Thus, the score calculating unit 231, winning node determining unit 232, generating node determining unit 233, and time-sequence generating unit 234 can recognize whether the data supplied to the recognition generating unit 213 is input data or output data.

The score calculating unit 231 calculates the score, which is the degree of matching of the nodes $N_i$ of the time-sequence pattern storage network $net_{in}$ or the nodes $N'_j$ of the time-sequence pattern storage network $net_{out}$ of the input/output relation model stored in the storage unit 211, as to the data supplied to the recognition generating unit 213, in the same way as with the case of the score calculating unit 51 of the recognizing unit 3 shown in FIG. 15, and supplies the winning node to the winning node determining unit 232.

That is to say, in the event that the data input to the winning node determining unit 232 is input data, the score calculating unit 231 calculates the score of the nodes $N_i$ of the time-sequence pattern storage network $net_{in}$ making up the input/output relation model stored in the storage unit 211, as to the input data, and supplies to the winning node determining unit 232. Also, in the event that the data input to the winning node determining unit 232 is output data, the score calculating unit 231 calculates the score of the nodes $N'_j$ of the time-sequence pattern storage network $net_{out}$ making up the input/output relation model stored in the storage unit 211, as to the output data, and supplies to the winning node determining unit 232.

The winning node determining unit 232 determines the node with the highest score supplied from the score calculating unit 231 to be the winning node, in the same way as with the winning node determining unit 52 of the recognizing unit 3 shown in FIG. 15, and supplies a node label representing the winning node to the generating node determining unit 233.

Accordingly, in the event that the data supplied to the recognition generating unit 213 is input data, the winning node determining unit 232 determines the node of the time-sequence pattern storage network $net_{in}$ making up the input/output relation model stored in the storage unit 211 which has the highest score as to the input data as supplied from the score calculating unit 231 to be the winning node $N_i$, and an input label representing the winning node $N_i$ is supplied to the generating node determining unit 233. Also, in the event that the data supplied to the recognition generating unit 213 is output data, the winning node determining unit 232 determines the node of the time-sequence pattern storage network $net_{out}$ making up the input/output relation model stored in the storage unit 211 which has the highest score as to the output data as supplied from the score calculating unit 231 to be the winning node $N'_j$, and an output label representing the winning node $N'_j$ is supplied to the generating node determining unit 233.

It should be understood that here, the highest (largest) score is the best score.

Upon an input label being supplied from the winning node determining unit 232, i.e., in the event that the data supplied from the recognition generating unit 213 is input data, the generating node determining unit 233 determines that of the nodes of the time-sequence pattern storage network $net_{out}$ making up the input/output relation model stored in the storage unit 211, the node $N'_j$, which has the strongest weight as to the node $N_i$ represented by the input label from the winning node determining unit 232, is to be the generating node, and supplies the output label representing the generating node $N'_j$ to the time-sequence generating unit 234. Also, upon an output label being supplied from the winning node determining unit 232, i.e., in the event that the data supplied from the recognition generating unit 213 is output data, the generating node determining unit 233 determines that of the nodes of the of the time-sequence pattern storage network net$_{in}$ making up the input/output relation model stored in the storage unit 211, the node N$_i$, which has the strongest weight as to the node N'$_j$ represented by the output label from the winning node determining unit 232, is to be the generating node, and supplies the input label representing the node N$_i$ to the time-sequence generating unit 234.

Upon an output label being supplied from the generating node determining unit 233, i.e., in the event that the data supplied to the recognition generating unit 213 is input data, the time-sequence generating unit 234 generates time-sequence data to serve as an estimation value of output data as to the input data supplied to the recognition generating unit 213, in the same way as with the time-sequence generating unit 62 of the generating unit 6 shown in FIG. 17 for example, based on, out of the nodes of the of the time-sequence pattern storage network net$_{out}$ making up the input/output relation model stored in the storage unit 211, the time-sequence pattern model 21 (FIG. 7) of the node N'$_j$ represented by the output label from the generating node determining unit 233.

Also, upon an input label being supplied from the generating node determining unit 233, i.e., in the event that the data supplied to the recognition generating unit 213 is output data, the time-sequence generating unit 234 generates time-sequence data to serve as an estimation value of control data (input data) as to the output data supplied to the recognition generating unit 213, in the same way as with the time-sequence generating unit 62 of the generating unit 6 shown in FIG. 17 for example, based on, out of the nodes of the of the time-sequence pattern storage network net$_{in}$ making up the input/output relation model stored in the storage unit 211, the time-sequence pattern model 21 of the node N$_i$ represented by the input label from the generating node determining unit 233.

Next, modeling of the object of control by the input/output relation model that is performed at the data processing device shown in FIG. 20, i.e., learning of the input/output relation model, will be described with reference to the flowchart in FIG. 21.

In step S101, upon teaching data, which is a set of input data and output data, being input to the data processing device shown in FIG. 20, the teaching data is supplied to the learning processing unit 221 of the learning unit 212.

In step S102, the learning processing unit 221 updates, in a self-organizing manner, the time-sequence pattern storage network net$_{in}$ making up the input/output relation model (FIG. 19) stored in the storage unit 211, based on the input data portion of the teaching data, and the flow proceeds to step S103. In step S103, the learning processing unit 221 updates, in a self-organizing manner, the time-sequence pattern storage network net$_{out}$ making up the input/output relation model stored in the storage unit 211, based on the output data portion of the teaching data.

The learning processing unit 221 then supplies to the weight updating unit 222 a label set, which is a set of the input label of the node N$_i$ of the time-sequence pattern storage network net$_{in}$ which has become the winning node at the time of updating the time-sequence pattern storage network net$_{in}$, and the output label of the node N$_j$ of the time-sequence pattern storage network net$_{out}$ which has become the winning node at the time of updating the time-sequence pattern storage network net$_{out}$.

In step S104, based on the label set supplied from the learning processing unit 221, the weight updating unit 222 updates the weight between the nodes of the time-sequence pattern storage network net$_{in}$ and the nodes of the time-sequence pattern storage network net$_{out}$ making up the input/output relation model (FIG. 19) stored in the storage unit 211, returns to step S101, stands by for input of the next teaching data, and subsequently the same processing is repeated.

Due to a great number of teaching data sets being input and the processing of steps S101 through S104 being repeated, the input/output relation model stored in the storage unit 211 is transformed into a forward model corresponding to the object of control, and also is transformed into an inverse model.

Figure 21:
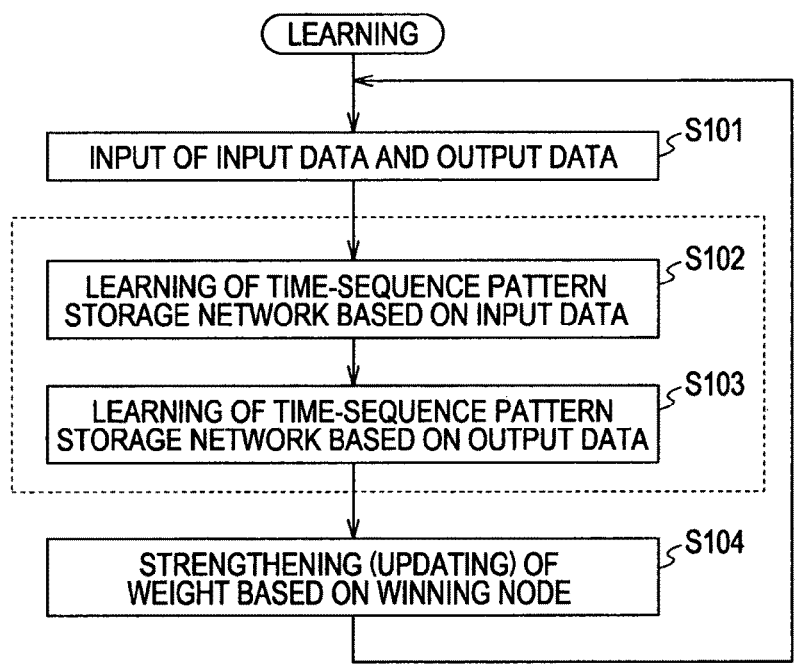
FIG. 21 is a flowchart for describing learning with an input/output relation model.

Note that the processing of steps S102 and S103 may be performed in parallel, or may be performed in reverse to the order shown in FIG. 21.

Next, updating of the weight (jointing relation between the nodes) which the weight updating unit 222 (FIG. 20) performs in step S104 in FIG. 21 will be described with reference to FIG. 22.

Note that in the following description, a time-sequence pattern storage network to which input data is provided, i.e., a time-sequence pattern storage network which is configured of multiple nodes having time-sequence pattern models 21 representing time-sequence patterns and whereby learning is performed using input data (e.g., the time-sequence pattern storage network net$_{in}$), will be referred to as an "input network", and a time-sequence pattern storage network to which output data is provided, i.e., a time-sequence pattern storage network which is configured of multiple nodes having time-sequence pattern models 21 representing time-sequence patterns and whereby learning is performed using output data (e.g., the time-sequence pattern storage network net$_{out}$) will be referred to as an "output network", as appropriate.

Further, where appropriate, nodes of an input network may be referred to as "input nodes", and nodes of an output network as "output nodes".

Also, in the following description, a case will be described wherein the input/output relation model is used as a forward model to which input data is provided so as to estimate output data, and accordingly description of a case wherein the input/output relation model is used as an inverse model to which output data (target value) is provided so as to estimate input data (control data) will be omitted as appropriate.

FIG. 22 shows an input/output relation model wherein the input node of the input network net$_{in}$ and the output node of the output network net$_{out}$ are jointed, as shown in FIG. 19.

Figure 22B:
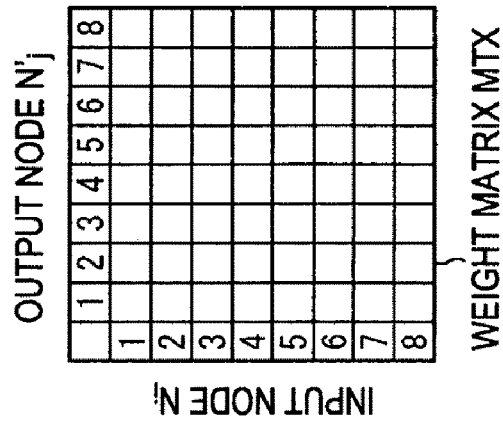
FIGS. 22A and 22B are diagrams illustrating a weight matrix.
Figure 22A:
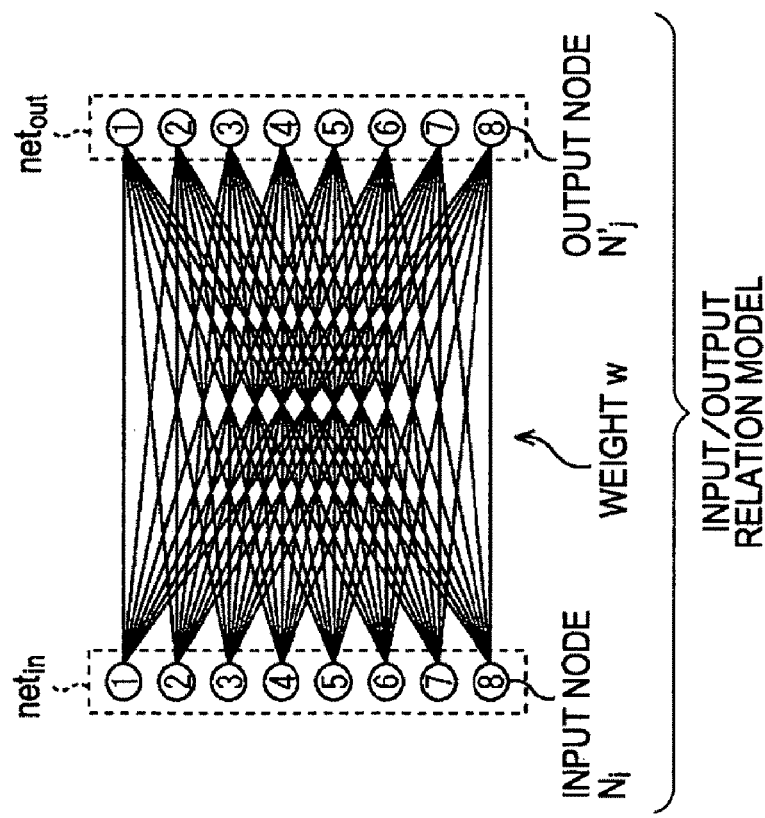

In other words, in FIG. 22A, the input/output relation model has an input network net$_{in}$ and an output network net$_{out}$, with each of the nodes of the input network net$_{in}$ and each of the nodes of the output network net$_{out}$ being jointed. Note that in FIG. 22, both the input network net$_{in}$ and the input network net$_{out}$ are configured of eight nodes.

In FIG. 22A, each input node of the input network net$_{in}$ is jointed with all of the output nodes of the output network net$_{out}$ (meaning that each output node of the output network net$_{out}$ is jointed with all of the input nodes of the input network net$_{in}$), and a weight w exists for all combinations of the input nodes of the input network net$_{in}$ and the output nodes of the output network net$_{out}$.

Now, if we regard two time-sequence pattern storage networks with nodes jointed, and form a weight matrix MTX wherein the nodes of one of the time-sequence pattern storage networks are made to correspond to the rows thereof and the nodes of the other time-sequence pattern storage network are made to correspond to the columns thereof, with a weight w of the i'th node of one time-sequence pattern storage network and the j'th node of the other time-sequence pattern storage network being situated at the element of row i and column j, the weight updating unit 222 (FIG. 20) updates the weights w which are the elements of the weight matrix MTX.

FIG. 22B illustrates a weigh matrix MTX regarding the input/output relation model in FIG. 22A.

With the weigh matrix MTX in FIG. 22B, the input nodes correspond to the rows and the output nodes correspond to the columns, with the weight w of the i'th input node and j'th output node being situated at the element of row i and column j. The weight updating unit 222 (FIG. 20) updates the weights w which are the elements of the weight matrix MTX.

That is to say, upon the power being turned on at first or the like, for example, the weight updating unit 222 initializes the all weights w in the weigh matrix MTX to an initial value of 0, for example. Each time a set of teaching data, i.e., input data and output data are input to the data processing device in FIG. 20, whereby the label set of the input label representing the winning node of the input network $net_{in}$ and the label set of the output label representing the winning node of the output network $net_{out}$ being provided from the learning processing unit 221, the weight updating unit 222 then updates the weights, centering on the jointing of the winning nodes, as if it were.

Specifically, the weight updating unit 222 updates the weight w of the weigh matrix MTX according to Expression (4), for example.

$$w=(1-\beta)w+\beta\Delta w \quad (4)$$

Here, $\beta$ is a learning rate representing the degree of updating of the weight w, and is within a range of 0 to 1. The smaller the learning rate $\beta$ is, the less the weight w changes, and in the event that the learning rate $\beta$ is 0, the weight w does not change. On the other hand, The greater the learning rate $\beta$ is, the more the weight w changes, and in the event that the learning rate $\beta$ is 1, the weight w is updated to the updating reference value $\Delta w$.

Note that the updating reference value $\Delta w$ is obtained from Expression (5).

$$\Delta w = \frac{1}{d+1} \quad (5)$$

Here, d represents the inter-pattern distance as to the winning node as with the case in Expression (3), so that d=0 holds for the winning node. Accordingly, with the winning node the reference value $\Delta w$ is 1, and the greater the inter-pattern distance d as to the winning node is, the closer the reference value $\Delta w$ is to 0.

Now, expressing the input node which the input label supplied to the weight updating unit 222 from the learning processing unit 221 (FIG. 20) represents, i.e., the winning node in the input network $net_{in}$ as input node $N_i$, and expressing the output node which the input label supplied to the weight updating unit 222 from the learning processing unit 221 (FIG. 20) represents, i.e., the winning node in the output network $net_{out}$ as output node $N'_j$, the weight updating unit 222 (FIG. 20) updates the weight w of the weigh matrix MTX as follows, in accordance with Expression (4) (and Expression (5)).

That is to say, the weight updating unit 222 obtains the reference value $\Delta w$ for each output node of the output network $net_{out}$ according to Expression (5), using the inter-pattern distance d as to the output node $N'_j$ which is the winning node in the output network $net_{out}$, and further uses the reference value $\Delta w$ to update the weight w with the i'th input node $N_i$ which is the winning node in the input network $net_{in}$, in accordance with Expression (4).

Accordingly, the weight w of the i'th row (each column) of the weight matrix MTX corresponding to the input node $N_i$ which is the winning node in the input network $net_{in}$.

Also, the weight updating unit 222 obtains the reference value $\Delta w$ for each input node of the input network $net_{in}$ according to Expression (5), using the inter-pattern distance d as to the input node $N_i$ which is the winning node in the input network $net_{in}$, and further uses the reference value $\Delta w$ to update the weight w with the j'th output node $N'_j$ which is the winning node in the output network $net_{out}$, in accordance with Expression (4).

Accordingly, the weight w of the j'th column (each row) of the weight matrix MTX corresponding to the output node $N'_j$ which is the winning node in the output network $net_{out}$.

Thus, the weight of the winning node $N_i$ of the input network $net_{in}$ and the winning node $N'_j$ of the output network $net_{out}$ is updated so as to maximize the degree of jointing.

Note that the updating of the weight w of the input node $N_i$ which is the winning node of the input network $net_{in}$ and the output node $N'_j$ which is the winning node of the output network $net_{out}$ is performed regarding only one of updating of the weight w of the nodes of the output network $net_{out}$ as to the input node $N_i$ which is the winning node, or updating of the weight w of the winning nodes of the input network $net_{in}$ as to the output node $N'_j$ which is the winning node.

Such updating of weight w (weight matrix MTX) is performed each time a set of input data and output data serving as teaching data is input to the data processing device shown in FIG. 20.

Further, learning based on input data of the input network $net_{in}$ learning based on output data of the output network $net_{out}$ of the input/output relation model is performed each time a set of input data and output data serving as teaching data is input to the data processing device shown in FIG. 20.

As learning of the input network $net_{in}$ and the output network $net_{out}$ progresses, the time-sequence pattern models 21 of the input nodes come to manifest a certain time-sequence pattern, and the time-sequence pattern models 21 of the output nodes also come to manifest another certain time-sequence pattern.

Consequently, In the event that there is some sort of relationship between the input data having a certain time-sequence pattern and the output data having another certain time-sequence pattern, and such a set of input data and output data (i.e., teaching data) is provided, the input node of the input network $net_{in}$ having a time-sequence pattern model 21 manifesting the certain time-sequence pattern becomes the winning node, and also the output node of the output network $net_{out}$ having a time-sequence pattern model 21 manifesting the other certain time-sequence pattern becomes the winning node.

Further, as described above, the weight of the input nodes of the input network $net_{in}$ as to the winning node of the output network $net_{out}$ is updated, focused around the winning node of the input network $net_{in}$, and the weight of the output nodes of the output network $net_{out}$ as to the winning node of the input network $net_{in}$ is updated, focused around the winning node of the output network $net_{out}$.

That is to say, the weight between the input nodes of the input network $net_{in}$ and the winning node of the output network $net_{out}$ is updated such that the weight between the input nodes closer in inter-pattern distance d as to the winning node of the input network $net_{in}$ is greater (i.e., the weight relation is stronger). Also, the weight between the output nodes of the output network $net_{out}$ and the winning node of the input network $net_{in}$ is updated such that the weight between the nodes closer in inter-pattern distance d as to the winning node of the output network $net_{out}$ is stronger.

Conversely, the weight between the input nodes of the input network $net_{in}$ and the winning node of the output network net$_{out}$ is updated such that the weight between the nodes farther in inter-pattern distance d as to the winning node of the input network net$_{in}$ is smaller (i.e., the weight relation is weaker). Also, the weight between the output nodes of the output network net$_{out}$ and the winning node of the input network net$_{in}$ is updated such that the weight between the output nodes farther in inter-pattern distance d as to the winning node of the output network net$_{out}$ is weaker.

As a great number of sets of teaching data is provided and learning of the input network net$_{in}$ and the output network net$_{out}$ progresses, and further, as the updating of the weight progresses, according to this weight an input/output relation model serving as a forward model or an inverse model, correlating the input data, more particularly the time-sequence pattern thereof, with the output data, more particularly the time-sequence pattern thereof, is obtained.

According to an input/output relation model serving as a forward model, in the event that certain input data is provided, a winning node most closely matching that input data can be determined in the input network net$_{in}$, and the output node of the output network net$_{out}$ which has the greatest weight as to that winning node can be determined. Further, generating time-sequence data based on the output node, or more particularly the time-sequence pattern model 21 thereof, enables output data as to the provided input data to be estimated.

Also, according to an input/output relation model serving as an inverse model, in the event that certain output data is provided (target value), a winning node most closely matching that output data can be determined in the output network net$_{out}$, and the input node of the input network net$_{in}$ which has the greatest weight as to that winning node can be determined. Further, generating time-sequence data based on the input node, or more particularly the time-sequence pattern model 21 thereof, enables control data (input data) as to the provided output data to be estimated.

Note that regarding the input/output relation model wherein the node of the input network net$_{in}$ and the node of the output network net$_{out}$ are jointed, a weight matrix MTX is stored in the storage unit 211 (FIG. 20) as a portion of the input/output relation model.

Figure 23:
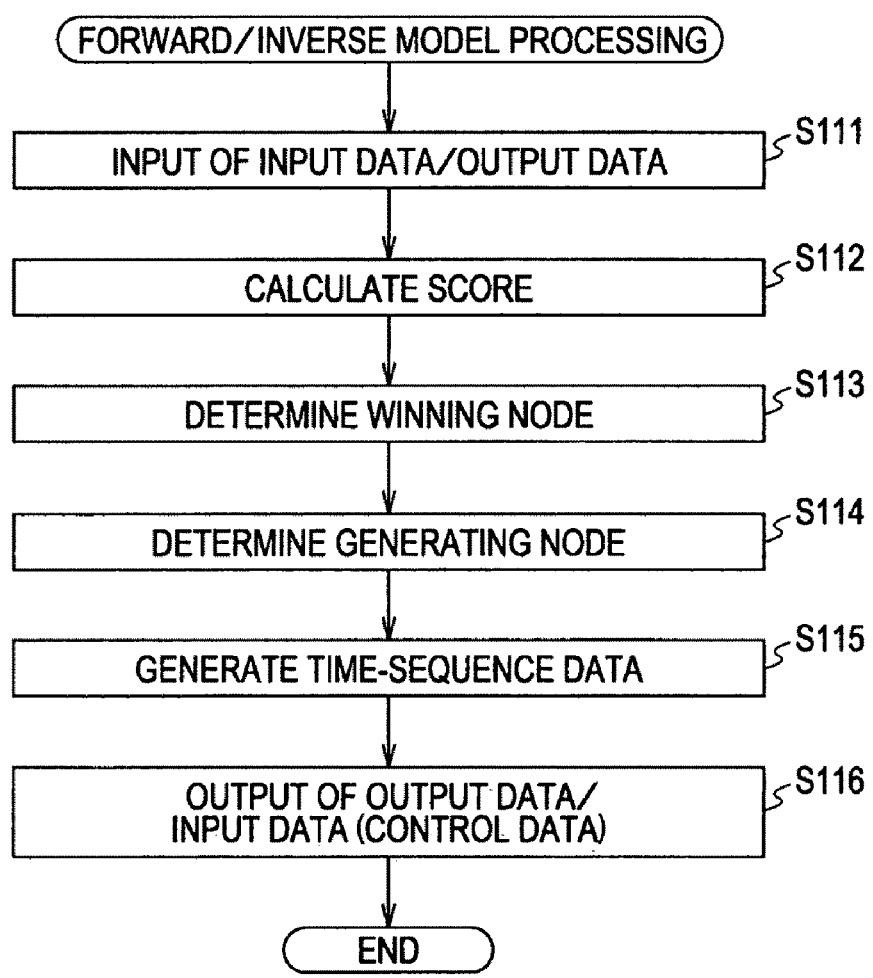
FIG. 23 is a flowchart for describing processing for estimating output data or control data using an input/output relation model.

Next, the processing for estimating output data as to input data, or control data (input data) as to output data, using an input/output relation model serving as a forward model or inverse model, will be described with reference to the flowchart in FIG. 23.

First, in a case of estimating output data as to input data with the data processing device shown in FIG. 20, in step S111, the input data is input to the data processing device shown in FIG. 20.

The input data input to the data processing device is provided to the score calculating unit 231 of the recognition generating unit 213.

In step S112, the score calculating unit 231 calculates the score of each of the nodes N$_i$ of the time-sequence pattern storage network net$_{in}$ making up the input/output relation model stored in the storage unit 211, and supplies the scores to the winning node determining unit 232.

In step S113, the winning node determining unit 232 determines the node of the time-sequence pattern storage network net$_{in}$ making up the input/output relation model stored in the storage unit 211 regarding which the highest score is provided from the score calculating unit 231 to be the winning node N$_i$, and supplies an input label representing the winning node N$_i$ to the generating node determining unit 233.

In step S114, the generating node determining unit 233 determines the node N'$_j$ of the time-sequence pattern storage network net$_{out}$ making up the input/output relation model stored in the storage unit 211 which has the greatest weight as to the node N$_i$ represented by the input label from the winning node determining unit 232 to be the generating node, and supplies an output label representing the generating node N'$_j$ to the time-sequence generating unit 234.

In step S115, the time-sequence generating unit 234 generates time-sequence data serving as an estimation value of the output data as to the input data supplied to the recognition generating unit 213, based on the time-sequence pattern model 21 (FIG. 7) of the node N'$_j$, represented by the output label from the generating node determining unit 233, of the nodes of the time-sequence pattern storage network net$_{out}$ making up the input/output relation model stored in the storage unit 211, proceeds to step S116, and outputs the time-sequence data.

Next, in a case of estimating control data (input data) as to output data with the data processing device shown in FIG. 20, in step S111, the output data is input to the data processing device shown in FIG. 20.

The output data input to the data processing device is provided to the score calculating unit 231 of the recognition generating unit 213.

In step S112, the score calculating unit 231 calculates the score of each of the nodes N'$_j$ of the time-sequence pattern storage network net$_{out}$ making up the input/output relation model stored in the storage unit 211, and supplies the scores to the winning node determining unit 232.

In step S113, the winning node determining unit 232 determines the node of the time-sequence pattern storage network net$_{out}$ making up the input/output relation model stored in the storage unit 211 regarding which the highest score is provided from the score calculating unit 231 to be the winning node N'$_j$, and supplies an output label representing the winning node N'$_j$ to the generating node determining unit 233.

In step S114, the generating node determining unit 233 determines the node N$_i$ of the time-sequence pattern storage network net$_{in}$ making up the input/output relation model stored in the storage unit 211 which has the greatest weight as to the node N'$_j$ represented by the output label from the winning node determining unit 232 to be the generating node, and supplies an input label representing the generating node N'$_j$ to the time-sequence generating unit 234.

In step S115, the time-sequence generating unit 234 generates time-sequence data serving as an estimation value of the control data (input data) as to the output data supplied to the recognition generating unit 213, based on the time-sequence pattern model 21 of the node N$_i$, represented by the input label from the generating node determining unit 233, of the nodes of the time-sequence pattern storage network net$_{in}$ making up the input/output relation model stored in the storage unit 211, proceeds to step S116, and outputs the time-sequence data.

As described above, an input/output relation model can be learned using a set of input data and output data, the object of control can be modeled as a forward model or inverse model, and the object of control can be represented with high precision, and output data and control data (input data) can be estimated with high precision.

Incidentally, as described above, the data processing device shown in FIG. 20 supplies to the learning unit 212, as teaching data, a set of input data which is time-sequence data of a certain section (time-sequence data spanning a certain time span) that is provided to the object of control, and output data which is other time-sequence data observed from the object of control as to the time-sequence data of that section, and at the learning unit 212, this learning data is used to perform learning of the input/output relation model serving as a forward model of inverse model of the object of control.

Accordingly, in the event that learning is performed of an input/output relation model regarding a robot as the object of control for example, and a time-sequence of sensor data detected with a microphone serving as a sensor detecting a voice calling to the robot (audio data) being employed as input data to be provided to the robot, and a time-sequence of motor data provided to a motor for performing an action of moving an arm so as to cause the robot to wave being employed, self-organizing learning is performed at the learning unit 212 (FIG. 20) such that one or more nodes of the input network net$_{in}$ of the input/output relation model, or more particularly the time-sequence pattern 21 thereof, expresses the time-sequence pattern of the input data which is sensor data corresponding to a voice calling to the robot, and self-organizing learning is performed such that one or more nodes of the output network net$_{out}$ of the input/output relation model, or more particularly the time-sequence pattern 21 thereof, expresses the time-sequence pattern of the output data which is motor data corresponding to the action of waving.

Further, at the learning unit 212, the weight w between the nodes of the input network net$_{in}$ of the input/output relation model and the winning node of the output network net$_{out}$ is updated such that the weight is greater for nodes closer in inter-pattern distance d as to the winning node of the input network net$_{in}$, and the weight between the nodes of the output network net$_{out}$ and the winning node of the input network net$_{in}$ is updated such that the weight is greater for output nodes closer in inter-pattern distance d as to the winning node of the output network net$_{out}$.

Consequently, the weight between the one or more nodes of the input network net$_{in}$ having a time-sequence pattern model 21 expressing the time-sequence pattern of input data which is sensor data corresponding to the voice calling the to the robot, and the one or more nodes of the output network net$_{out}$ having a time-sequence pattern model 21 expressing the time-sequence pattern which is motor data corresponding to the action of waving, is strengthened.

Subsequently, upon sensor data corresponding to the voice calling to the robot being provided to the recognition generating unit 213 (FIG. 20) as input data, at the input/output relation model, a node of the nodes of the input network net$_{in}$ which expresses the time-sequence pattern of sensor data corresponding to the voice calling to the robot becomes the winning node as to that input data. Then, at the recognition generating unit 213, a node of the output network net$_{out}$, i.e., in this case, a certain node of the nodes of the output network net$_{out}$ which expresses the time-sequence pattern of the motor data corresponding to the action of waving, is determined to be the generating node, and the generating node is used to generate output data, i.e., in this case, the motor data corresponding to the action of waving, which is then output.

According to the data processing device in FIG. 20, in a case of calling the robot, and providing a movement of waving in response to the voice, learning such as described above is performed, and consequently, the robot comes to perform perceptive actions in response to having been called.

However, with the data processing device shown in FIG. 20, it is difficult to cause a robot to perform tasks that are completed by recognition and action in a relatively short period of time, i.e., that require real-time operations.

That is to say, in the event that a robot is to perform a task of rolling a ball in front of itself to the left and right, the robot must repeatedly perform perception of comprehending (recognizing) the state of the ball, and action of appropriately moving the arm in response to the state of the ball, within a certain short period of time. Now, calling this predetermined time which is a repeated unit a frame, the set of the sensor data, wherein the state of the ball detected with the sensor at a given frame on the time axis, and the motor data, corresponding to the movement of the arm which must be made during that frame, is taken as teaching data and is provided to the data processing device in FIG. 20, whereby even if the weight between the input node expressing the time-sequence pattern of the sensor data within the teaching data (node of the input network net$_{in}$) and the output node expressing the time-sequence pattern of the motor data within the teaching data (node of the output network net$_{out}$) is stronger, the robot cannot perform the task of rolling the ball in front thereof to the left or right.

The reason is that, at the point in time that the sensor data of a certain frame is provided, the motions of the arm according to the motor data for that frame must already be underway.

Accordingly, in order for the robot to be able to perform the task of rolling a ball in front of itself to the left and right, learning of the input/output relation model must be performed such that, focusing on of a certain frame as a frame of interest, the weight is strengthened between an input node which expresses the time-sequence pattern of, out of the sensor data detecting the state of the ball with a sensor, the sensor data of the frame of interest (hereinafter may be referred to as "node corresponding to sensor data" as appropriate), and an output node which expresses the time-sequence pattern of, out of the motor data corresponding to the motions of the arm rolling the ball to the left and right, the motor data of a frame delayed from the point-in-time of the frame of interest by a predetermined amount of time (hereinafter may be referred to as "node corresponding to motor data" as appropriate).

That is to say, learning of the input/output relation model needs to be performed for the motor data of the next frame to be generated as to the sensor data of the frame of interest.

Also, the next action to be taken by the robot cannot be determined only by the state of the ball serving as the current external state. That is to say, even if the current state of the ball is in a specified state, depending on the action (state) currently being taken by the robot, the next action to be taken may differ.

Accordingly, it is desirable to consider not only the sensor data of the frame of interest but also the motor data, to perform learning of an input/output relation model so that the motor data of the next frame is generated.

Figure 24:
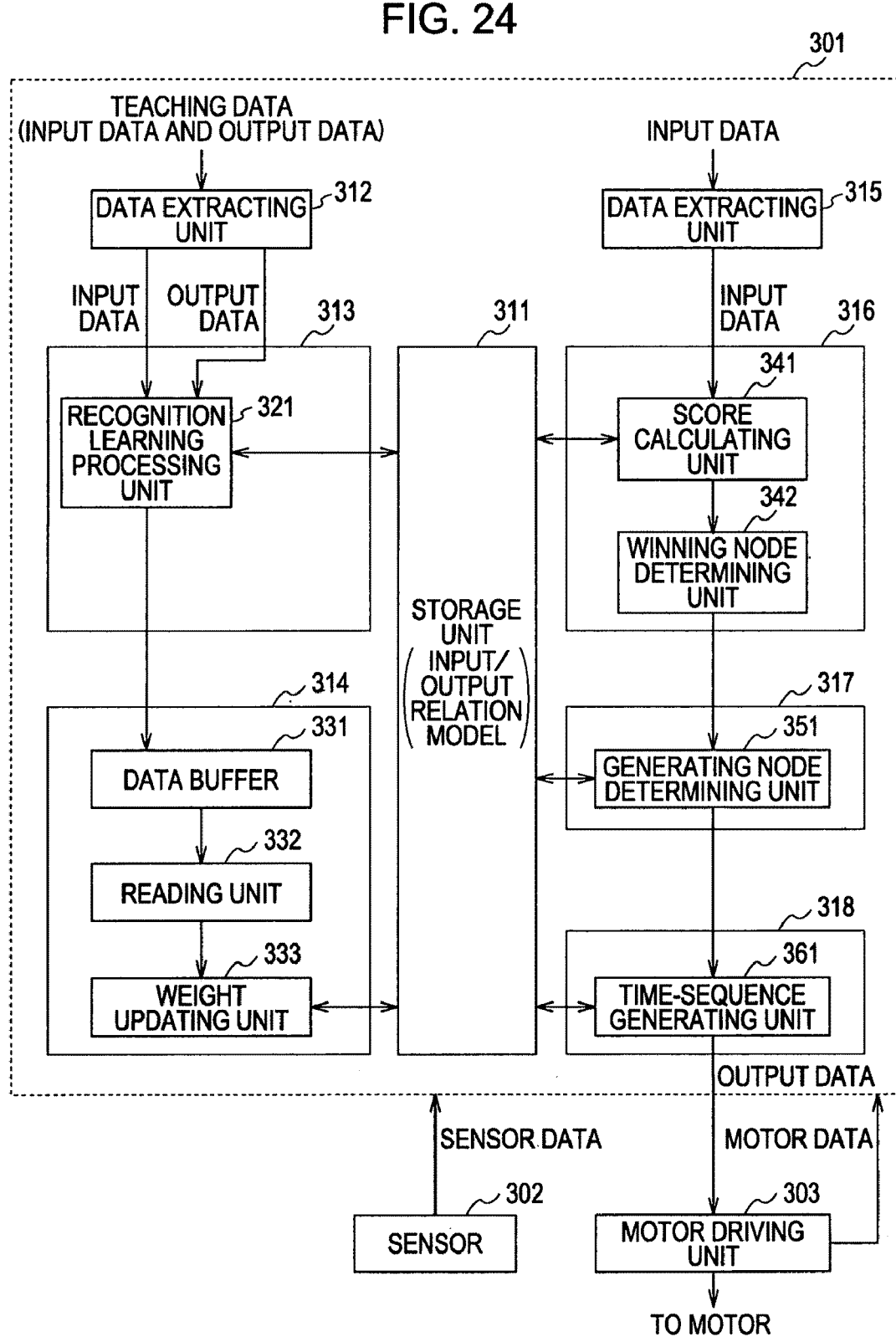
FIG. 24 is a block diagram illustrating a first configuration example of a robot with application to the input/output relation model.

FIG. 24 illustrates a configuration example of a robot which can perform tasks regarding which real time operations are required.

As shown in FIG. 24, the robot is configured of a data processing device 301, sensor 302, motor driving unit 303, and so forth.

The data processing device 301 uses time-sequence sensor data supplied from the sensor 302 and time-sequence motor data supplied from the motor driving unit 303 to perform self-organizing learning of the input/output relation model. Further, the data processing device 301 generates time-sequence sensor data and motor data as to the time-sequence sensor data supplied from the sensor 302 and the motor data supplied from the motor driving unit 303, which is supplied to the motor driving unit 303.

The sensor 302 is a camera, microphone, etc., which detects an external state, and supplies time-sequence sensor data representing that external state to the data processing device 301.

The motor driving unit 303 drives an unshown motor, for moving a robot arm or the like, for example, in response to motor data supplied from the data processing device 301. Also, in the event that the robot arm or the like for example is moved due to external force being applied thereto, the motor driving unit 303 generates motor data which is the same as motor data that should be provided to the motor driving unit 303 to cause such action, and supplies this motor data to the data processing unit 301. Further, as described above, the motor driving unit 303 drives the motor in response to motor data supplied from the data processing unit 301, and also supplies (returns) the motor data to the data processing device 301 as necessary.

As shown in FIG. 24, the data processing unit 301 is configured of a storage unit 311, data extracting unit 312, learning processing unit 313, picture learning unit 314, data extracting unit 315, recognizing unit 316, picture unit 317, and generating unit 318.

The storage unit 311 stores an input/output relation model.

Now, FIG. 25 illustrates an input/output relation model $M_{1112}$ stored in the storage unit 311.

In the same way as the input/output relation models shown in FIGS. 19 and 22, the input/output relation model $M_{1112}$ has an input network $net_{11}$ (input SOM) which is a time-sequence pattern storage network configured of multiple nodes each having time-sequence pattern models expressing a time-sequence pattern which is a pattern of time-sequence data, and an output network $net_{12}$ (output SOM).

The input/output relation model $M_{1112}$ has the nodes of the input network $net_{11}$ and the nodes of the output network $net_{12}$ jointed by weighting.

Retuning to FIG. 24, the data extracting unit 312 has supplied thereto sensor data which the sensor 302 outputs at each point-in-time, and motor data output at the same point-in-time by the motor driving unit 303.

The data extracting unit 312 takes the time-sequence of the vector having as components thereof the sensor data from the sensor 302 and the motor data from the motor driving unit 303, as the input data and output data, wherein the input data for each frame is extracted sequentially from the time-sequence of the input data, and also the output data for each frame is extracted sequentially from the time-sequence of the output data, and the input data and output data of these frames are supplied to the learning processing unit 313.

Figure 26:
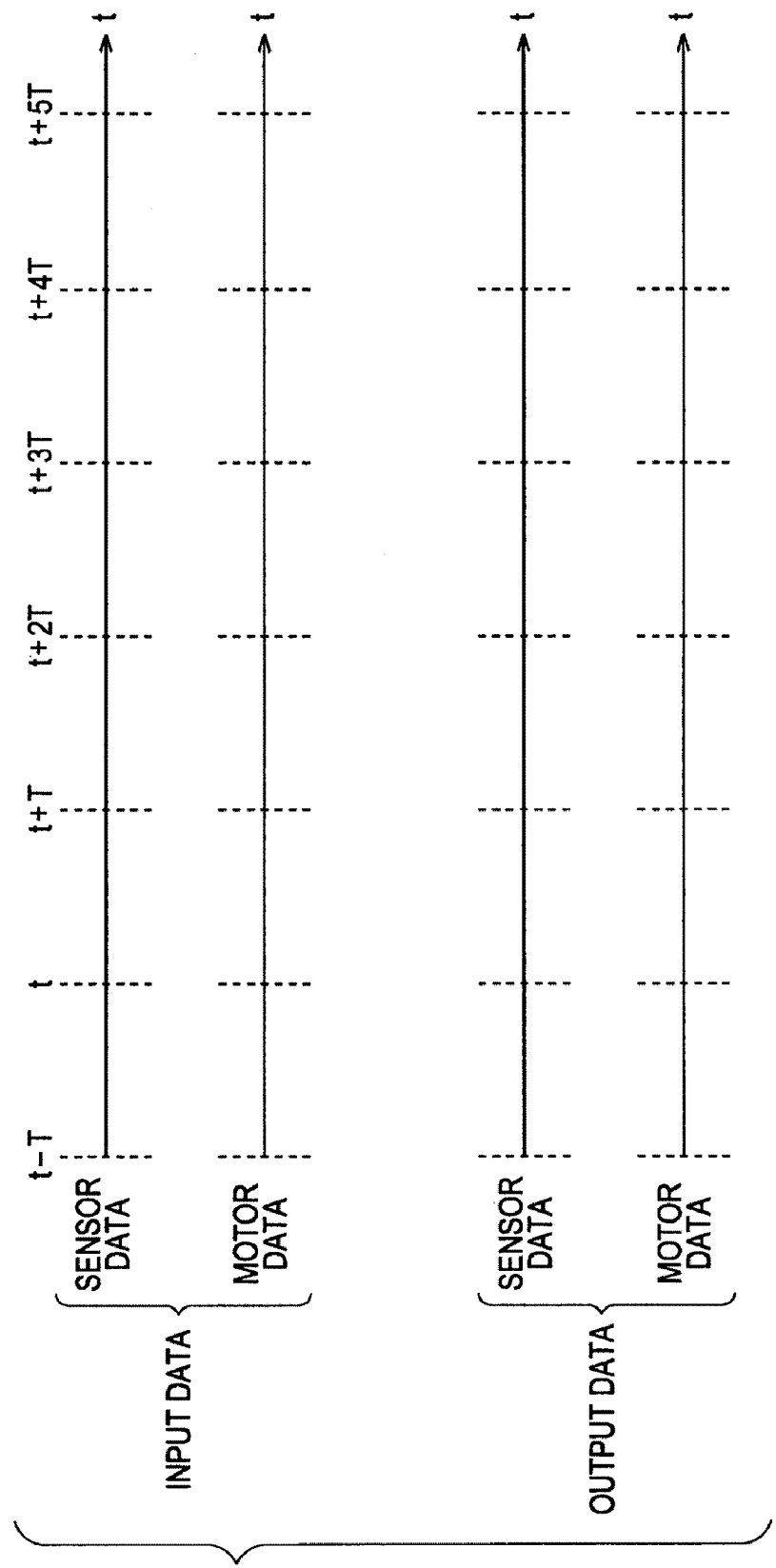
FIG. 26 is a diagram for describing processing of a data extracting unit 312.

That is to say, FIG. 26 illustrates the input data and output data handled by the data extracting unit 312 in FIG. 24.

As described above, the input data and output data handled by the data extracting unit 312 each are a time-sequence of a vector wherein the sensor data and motor data are components thereof, and are the same time-sequence data.

As described with FIG. 24, the data extracting unit 312 is supplied with sensor data output by the sensor 302 at each point-in-time, and motor data which the motor driving unit 303 outputs at the same point-in-time.

For example, if we say that the length (duration in time) of a frame is T, the data extracting unit 312 extracts input data in increments of frames, which is the time-sequence of input data sectioned into time T increments as shown in FIG. 26, and supplies this to the learning processing unit 313 as input data of the sensor data and motor data.

Also, the data extracting unit 312 extracts output data in increments of frames, which is the time-sequence of output data sectioned into duration T increments as shown in FIG. 26, and supplies this to the learning processing unit 313 as output data of the sensor data and motor data.

Figure 27:
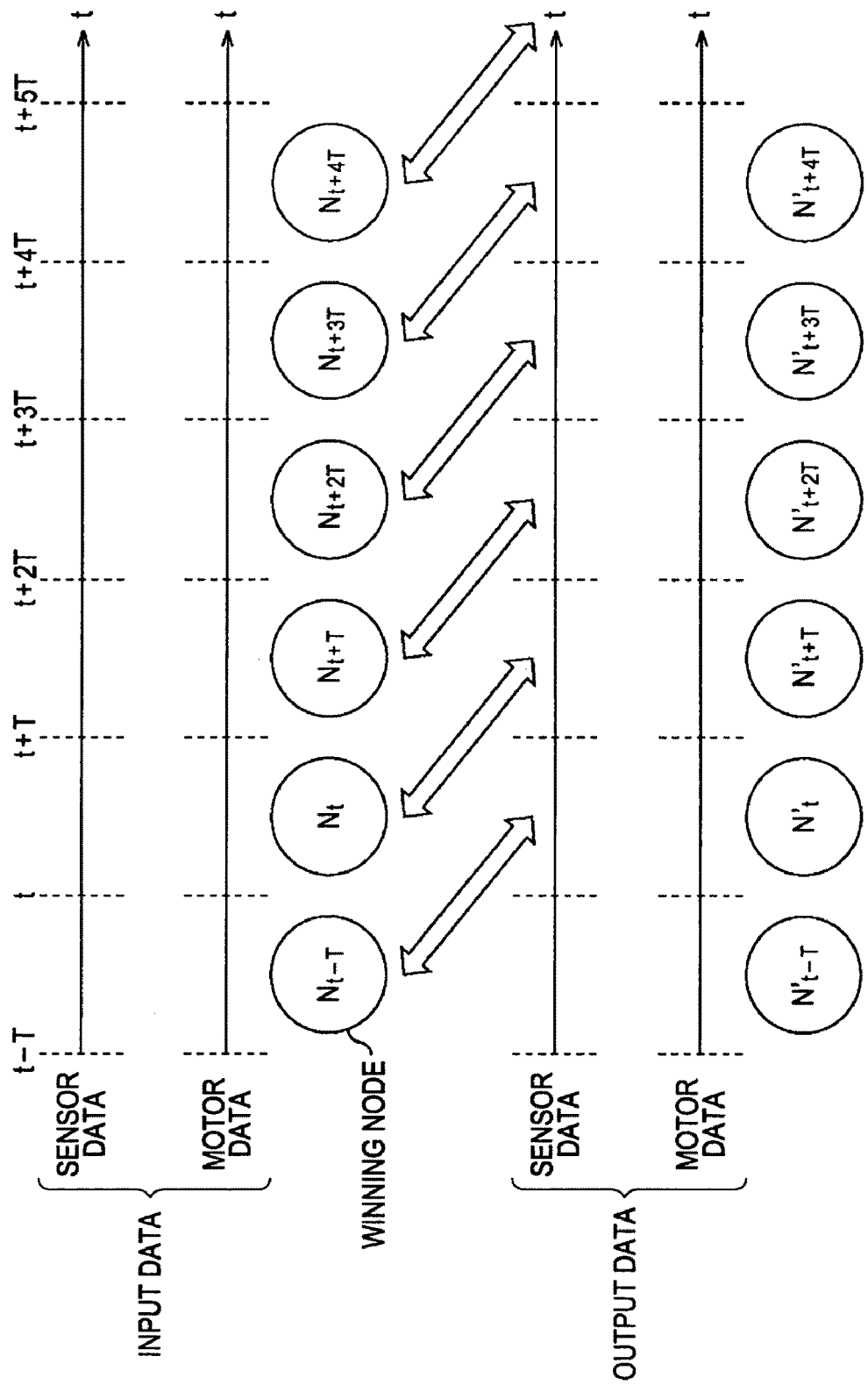
FIG. 27 is a diagram for describing processing of a reading unit 332.

Also, the data extracting unit 312 extracts output data in increments of frames, which is the time-sequence of output data sectioned into duration T increments as shown in FIG. 27, and supplies this to the learning processing unit 313 as output data of the motor data. If the time from the vector of point-in-time t (sample value) of the time-sequence vector wherein sensor data and motor data are components thereof to the vector (immediately preceding) point-in-time t+t is expressed as IO[t, t+t], the input data and output data of the frame at point-in-time t can each be expressed as IO[t, t+T−1].

Note that in FIG. 26, the input data and the output data are deemed to be completely the same time-sequence data, but the input data and the output data can be a time-sequence data wherein a portion thereof is the same. The is to say, for example, an arrangement may be made wherein the input data is the time-sequence of a vector wherein sensor data and motor data are components thereof, and output data is the time-sequence of a vector wherein motor data (further, time-sequence data other than sensor data) are components thereof.

Also, with FIG. 26, the input data for each frame is obtained by simply sectioning the input data (similarly with the output data) in time T increments, but other than this, for example, extracting the input data can be performed for each frame with a portion overlapped, by extracting the input data of a length of time T, while shifting the frames by an amount less than time T.

Returning to FIG. 24 again, the learning processing unit 313 is configured of a recognition learning processing unit 321, and uses both the input data and output data supplied in increments of frames from the data extracting unit 312 to perform self-organizing learning of the input network $net_{11}$ and output network $net_{12}$, of the input/output relation model $M_{1112}$ (FIG. 25) stored in the storage unit 311.

That is to say, the recognition learning processing unit 321 updates, in a self-organizing manner, the input network $net_{11}$ of the input/output relation model $M_{1112}$ (FIG. 25) stored in the storage unit 311, based on the input data supplied in increments of frames from the data extracting unit 312, in the same way as with the learning processing unit 221 shown in FIG. 20.

Specifically, the recognition learning processing unit 321 obtains a score as to the frame of input data in increments of frames from the data extracting unit 312 for each node in the input network $net_{11}$ of the input/output relation model $M_{1112}$, and from the nodes of the input network $net_{11}$ determines a node with the best score to be the winning node (hereafter, may be referred to as input winning node, as applicable). Further, the recognition learning processing unit 321 updates the input network $net_{11}$ in a self-organizing manner, based on the input winning node as to the frame of input data from the data extracting unit 312.

Also, the recognition learning processing unit 321 supplies an input label, which is a node label representing the input winning node determined in time-sequence as to the frame of input data, to the picture learning unit 314 in time-sequence.

Further, the recognition learning processing unit 321 updates the output network $net_{12}$ of the input/output relation model $M_{1112}$ (FIG. 25) stored in the storage unit 311 in a self-organizing manner, based on the output data for each frame supplied from the data extracting unit 312.

Specifically, the recognition learning processing unit 321 obtains a score as to the frame of output data in increments of frames from the data extracting unit 312 for each node in the output network $net_{12}$ of the input/output relation model $M_{1112}$, and from the nodes of the output network $net_{12}$ determines a node with the best score to be the winning node (hereafter, may be referred to as output winning node, as applicable). Further, the recognition learning processing unit 321 updates the output network net$_{12}$ in a self-organizing manner, based on the output winning node as to the frame of output data from the data extracting unit 312.

Also, the recognition learning processing unit 321 supplies an output label, which is a node label representing the output winning node determined in time-sequence as to the output data in increments of frames, to the picture learning unit 314 in time-sequence.

The picture learning unit 314 is configured of a data buffer 331, reading unit 332, and weight updating unit 333, and updates the weight between the input winning node of the input network net$_{11}$ as to the frame of input data in the input/output relation model M$_{1112}$ stored in the storage unit 331, and the nodes to the output network net$_{12}$, and also updates the weight of the output winning node of the output network net$_{12}$ as to the frame of output data delayed from the point-in-time of the frame of input data by a predetermined amount of time, and the nodes of the input network net$_{11}$.

That is to say, the data buffer 331 temporarily stores the time-sequence input label supplied from the recognition learning processing unit 321, and the time-sequence output label supplied from the recognition learning processing unit 321.

The reading unit 332 sequentially reads out and correlates input labels representing the input winning node corresponding to the input data of the frame of interest, of the input labels stored in the data buffer 331, as the frame of interest, with output labels representing the output winning node corresponding to the output data of a frame delayed from the point-in-time of the frame of interest by a predetermined amount of time, of the input labels stored in the data buffer 331, and supplies the weight updating unit 333 with a label set which is a set of the correlated input label and output label.

The weight updating unit 333 updates the jointing relation between the node of the input network net$_{11}$ and the node of the output network net$_{12}$ in the input/output relation model M$_{1112}$ (FIG. 25) stored in the storage unit 311, by Hebb's learning rule or the like, based on the label set supplied from the reading unit 332 as with the case of the weight updating unit 222 shown in FIG. 20, described in FIG. 22.

That is to say, the weight updating unit 333 updates the weight between the input nodes of the input network net$_{11}$ and the output winning node of the output network net$_{12}$ which the output label of the label set represents, around the input winning node of the input network net$_{11}$ which the input label of the label set represents, and also updates the weight between the output nodes of the output network net$_{12}$ and the output winning node of the input network net$_{11}$ around the winning node of the output network net$_{12}$.

Time sequence of a vector having as components thereof the sensor data output by the sensor 302 at each point-in-time and the motor data output by the motor driving unit 302 at the same point-in-time is supplied as input data to the data extracting unit 315. The data extracting unit 315 extracts the input data for each frame sequentially from the time-sequence of the input data, similar to the data extracting unit 312, and supplies this to the recognition unit 316.

The recognition unit 316 is configured of a score calculating unit 341 and winning node determining unit 342.

Also, as shown in FIG. 24, the picture unit 317 is configured of a generating node determining unit 351. further, the generating unit 318 is configured of a time-sequence generating unit 361.

The score calculating unit 341, winning node determining unit 342, generating node determining unit 351, and time-sequence generating unit 361 each perform processing the same as that of the score calculating unit 231, winning node determining unit 232, generating node determining unit 233, and time-sequence generating unit 234 shown in FIG. 20.

Note that the time-sequence generating unit 361 generates (an estimation value) of the output data, similar to the time-sequence generating unit 234 in FIG. 20, with this output data being a vector wherein the sensor data and motor data are components thereof, and the motor data thereof is supplied to the motor driving unit 303 from the time-sequence generating unit 361.

Next, the processing performed by the reading unit 332 in FIG. 24 will be described with reference to FIG. 27.

As described above, the reading unit 332 sequentially takes a frame of the input data as the frame of interest, and correlates an input label representing, of the input labels stored in the data buffer 331, the input winning node as to the input data of the frame of interest, and an output label representing, of the output labels stored in the data buffer 331, the output winning node as to the output data of a frame delayed by a certain amount of time from the point-in-time of the frame of interest.

That is to say, as output data of a frame delayed by a fixed amount of time from the point-in-time of the frame of interest, for example if the time T which is the same as the frame is used, the reading unit 332 correlates the input label indicating the input winning node N$_t$ as to the input data (IO[t, t+T−1]) of the frame at point-in-time t, and the output label showing the output winning node N′$_{t+T}$ as to the output data (IO[t+T, t+2T−1]) of the frame at point-in-time t+T which is delayed by the amount of time T from the point-in-time t of the frame of interest.

Note that here, the input data and the output data are the same time-sequence data (time-sequence of a vector wherein the sensor data and motor data are components thereof).

Next, learning processing which the robot shown in FIG. 24 performs, i.e., learning processing of the input/output relation model M$_{1112}$, will be described with reference to the flowchart in FIG. 28.

For example, in the event of causing a robot to perform a task of rolling a ball in front of itself to the left and right, the operator (the user training the robot to learn a task) places the ball in front of the robot, holds the arm of the robot, and moves the arm such that the ball is rolled to the left and right.

In this case, the sensor 302 detects the state of the ball rolling to the left and right, and time-sequence sensor data representing that state is supplied to the data extracting unit 312 of the data processing device 301.

Also, at the motor driving unit 303, motor data corresponding to the movement of the arm which the operator is moving is generated, and supplied to the data extracting unit 312 of the data processing device 301.

In step S301, the data extracting unit 312 takes the time-sequence of a vector wherein the sensor data from the sensor 302 and the motor data from the motor driving unit 303 are components thereof (hereafter called sensor motor data, as appropriate) to serve as input data, and from the time-sequence of the input data, extracts the input data for each frame and supplies this to the recognition learning processing unit 321 of the learning processing unit 313, and also takes the sensor motor data to serve as output data, and extracts the output data for each frame from the time-sequence of the output data thereof, and supplies this to the recognition learning processing unit 321 of the learning processing unit 313, and the flow advances to step S302.

In step S302, the recognition learning processing unit 321 of the learning processing unit 313 uses the input data and output data for each frame from the data extracting unit 312 to perform learning in a self-organizing manner of the input network $net_{11}$ and output network $net_{12}$ included in the input/output relation model $M_{1112}$ (FIG. 25) stored in the storage unit 311.

That is to say, in step S302, the processing of steps $S302_1$ and $S302_2$ is performed.

In step $S302_1$, the recognition learning processing unit 321 obtains a score regarding input data in increments of frames from the data extracting unit 312, regarding each node of the input network $net_{11}$ in the input/output relation model $M_{1112}$ stored in the storage unit 311, and of the nodes of the input network $net_{11}$, determines the node with the best score to be the input winning node. Further, the recognition learning unit 321 updates the input network $net_{11}$ in a self-organizing manner based on the input winning node as to the input data in increments of frames from the data extracting unit 312, and supplies an input label representing the input winning node to the picture learning unit 314.

In step $S302_2$, the recognition learning processing unit 321 obtains a score regarding output data in increments of frames from the data extracting unit 312, regarding each node of the output network $net_{12}$ in the input/output relation model $M_{1112}$ stored in the storage unit 311, and of the nodes of the output network $net_2$, determines the node with the best score to be the output winning node. Further, the recognition learning processing unit 321 updates the output network $net_{12}$ in a self-organizing manner based on the output winning node as to the output data in increments of frames from the data extracting unit 312, and supplies an output label representing the output winning node to the picture learning unit 314.

Following the processing in step S302, the flow proceeds to step S303, and the picture learning unit 314 takes a frame of the input data frames which has not yet been taken as a frame of interest, as the frame of interest, and correlates the input label representing the input winning node as to the input data of the frame of interest, from the recognition learning processing unit 321, and the output label representing the output winning node as to the output data of a frame delayed from the frame of interest by the amount of time T, from the recognition learning processing unit 321.

That is to say, in step S303, at the data buffer 331 of the picture learning unit 314, an input label indicating the input winner as to the input data, and an output label indicating the output winner as to the output data, supplied from the recognition learning processing unit 321 in increments of frames, are temporarily stored.

Further, in step S303, the reading unit 332 of the picture learning unit 314 reads out and correlates, the input label representing the input winning node as to the input data of the frame of interest from the input labels stored in the data buffer 331, and the output label representing the output winning node as to the output data of a frame delayed from the point-of-time of the frame of interest by an amount of time T from the output labels stored in the data buffer 331, and supplies the label se to the correlated input label and output label to the weight updating unit 333.

The flow then proceeds from step S303 to step S304, and the weight updating unit 333 of the picture learning unit 314 updates the jointing relation between the nodes of the input network $net_{11}$ and the nodes of the output network $net_{12}$ in the input/output relation model $M_{1112}$ (FIG. 25) based on the label set supplied from the reading unit 332.

That is to say, the weight updating unit 333 updates the input nodes of the input network $net_{11}$ of the input/output relation model $M_{1112}$ stored in the storage unit 311 and the output winning node of the output network $net_{12}$ thereof which the output label of the label set represents, around the input winning node of the input network $net_{11}$ which the input label of the label set represents, and also updates the output nodes of the output network $net_{12}$ and the input winning node of the input network $net_{11}$, around the output winning node of the output network $net_{12}$.

According to the learning processing of the input/output relation model $M_{1112}$ as above, the jointing relation between the input network $net_{11}$ and output network $net_{12}$ of the input/output relation model $M_{1112}$ (FIG. 25) is updated as follows.

That is to say, the input winning node is the winning node as to the input data of the frame of interest, and the output node is a winning node as to the output data of the frame which is T amount of time delayed from the frame of interest, and therefore from the updating of the weight of the weight updating unit 333, with the input/output relation model $M_{1112}$ stored in the storage unit 311, the weight of the input winning node of the input network $net_{11}$ as to the input data of the frame of interest and the output winning node of the output network $net_{12}$ as to the output data of the frame delayed by time T from the frame of interest are updated so as to be stronger.

Figure 28:
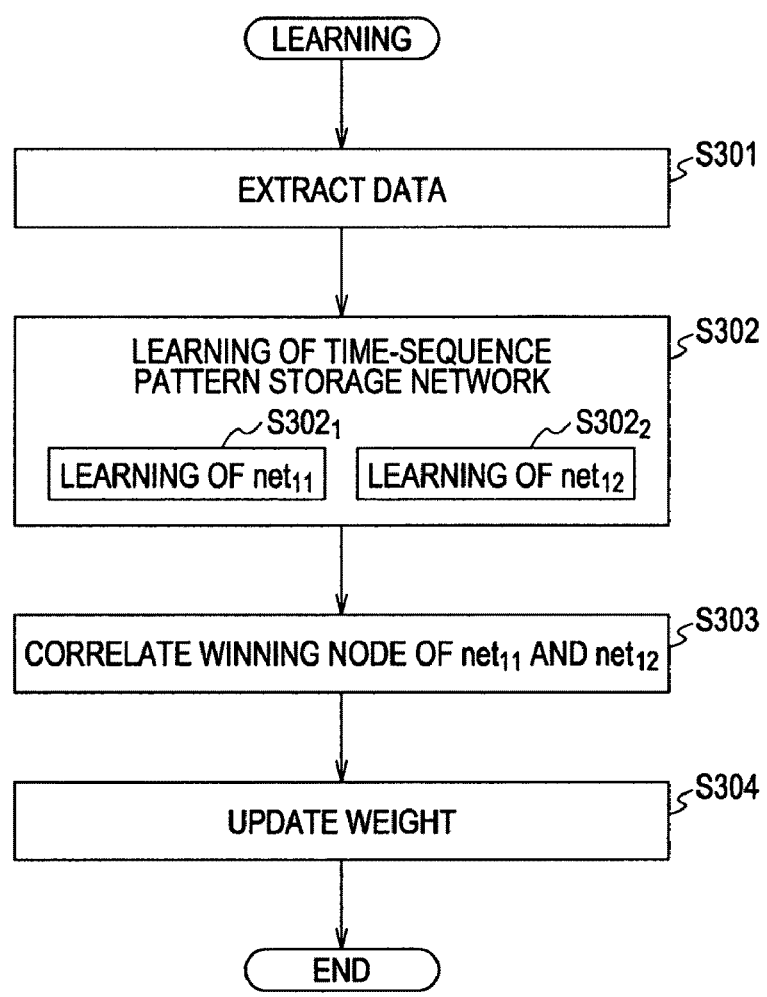
FIG. 28 is a flowchart for describing learning of the input/output relation model $M_{1112}$.

Note that the learning processing shown in FIG. 28 may be performed with the leading frame through the end frame being sequentially taken as the frame of interest and the processing of steps S302 through S304 being repeated, or may be performed with the leading frame through the end frame being sequentially taken as the frame of interest and the processing of step S302 being repeatedly performed, following which the leading frame through the end frame are once more sequentially taken as the frame of interest and the processing of steps S303 and S304 is repeatedly performed.

Next, description will be made regarding processing of perceptive actions of the robot shown in FIG. 24, i.e., the generating processing (recognition generating processing) of time-sequence data using the input/output relation model $M_{1112}$, with reference to the flowchart in FIG. 29.

In a case wherein a robot has learned to perform the task of rolling a ball placed in front of it to the left and right, as described with reference to FIG. 28 for example, upon a ball being placed before the robot (and rolled if necessary), the state of the ball is detected at the sensor 302, and time-sequence sensor data representing that state is supplied to the data extracting unit 315 of the data processing device 301.

Further, motor data is also supplied to the data extracting unit 315 of the data processing device 301 from the motor driving unit 303.

In step S321, the data extracting unit 315 takes the sensor motor data, which is the time-sequence of a vector having as the components thereof the sensor data from the sensor 302 and the motor data from the motor driving unit 303, as input data, and extracts the input data for each frame from the time-sequence of the input data thereof and supplies this to the recognition unit 316, and the flow advances to step S322.

In step S322, at the recognizing unit 316, the score calculating unit 341 sequentially takes input data in increments of frames from the data extracting unit 315 as input data of a frame of interest, calculates the score of each node of the input network $net_{11}$ making up the input/output relation model $M_{1112}$ stored in the storage unit 311 as to the input data of the frame of interest, and supplies this to the winning node determining unit 342.

Further, in step S322, the winning node determining unit 342 determines the node of the input network $net_{11}$ making up the input/output relation model $M_{1112}$ stored in the storage unit 311 which has the best score from the score calculating unit 341 to be the input winning node, supplies an input label representing the input winning node to the picture unit 317, and the flow proceeds to step S323.

In step S323, the generating node determining unit 351 of the picture unit 317 determines the node of the output network $net_{12}$ making up the input/output relation model $M_{1112}$ stored in the storage unit 311 which has the greatest weight as to the node represented by the input label from the winning node determining unit 342 (input winning node) to be the generating node, and supplies an output label representing the generating node to the generating unit 318, and the flow proceeds to step S324.

In step S324, the time-sequence generating unit 361 of the generating unit 318 generates and outputs time-sequence data of a frame length, for example, to serve as output data (more particularly, estimation values thereof) as to the input data of the frame of interest, based on the time-sequence pattern model 21 (FIG. 7) of the node of the output network $net_{12}$ making up the input/output relation model $M_{1112}$ stored in the storage unit 311 which is represented by the output label from the generating node determining unit 351.

The time-sequence data serving as this output data is sensor motor data, and the motor data of this sensor motor data is supplied to the motor driving unit 303 from the time-sequence generating unit 361, then by the motor driving unit 303 driving the motor according to the motor data from the time-sequence generating unit 361, the robot arm is moved.

Subsequently, the processing of steps S322 through S324 is performed regarding the input data in increments of frames that is supplied from the data extracting unit 315 to the recognizing unit 316.

As described above, with the robot in FIG. 24, updating is performed so as to strengthen the weight of the input winning node as to the input data in increments of frames of the input network $net_{11}$ and the output winning node as to the output data in increments of frames which is delayed by just a fixed amount of time from the point-in-time of the input data in increments of frames of the output network $net_{12}$, and therefore, for example, the robot can be caused to learn a task requiring real-time such as rolling a ball to the left and right which is in front of the robot, and so such tasks can be performed.

That is to say, according to the learning processing of FIG. 28 as described above, with the input/output relation model $M_{1112}$ stored in the storage unit 311, the weight of the input winning node of the input network $net_{11}$ as to the input data of the frame of interest and the output winning node of the output network $net_{12}$ as to the output data of the frame delayed by just a fixed amount of time from the frame of interested are updated so as to be stronger.

Figure 29:
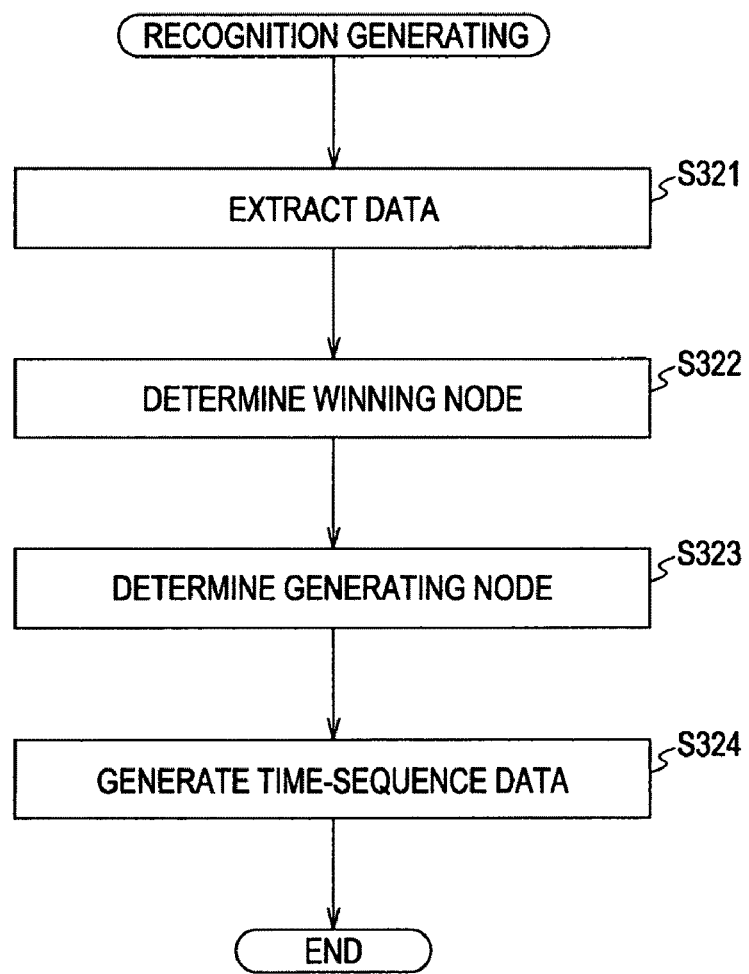
FIG. 29 is a flowchart for describing recognition generating processing of generating time-sequence data, using the input/output relation model $M_{1112}$.

Accordingly, with the recognition generating processing in FIG. 29, when input data of a given frame F is provided to the input/output relation model $M_{1112}$, with the input/output relation model $M_{1112}$, out of the nodes in the input network $net_1$, the node corresponding to the output data of a frame delayed from the frame F by a predetermined amount of time is determined to e the generating node, as being the node with the strongest weight as to the input winning node, based on that wining node, time-sequence data equivalent to the output data of the frame delayed by the frame F by a predetermined amount of time is generated.

In other words, with the robot in FIG. 24, learning is performed so that, regarding the sensor motor data serving as input data for each frame, i.e., the external state and the state of the robot itself, sensor data corresponding to the sensor motor data serving as output data of the frame delayed by a fixed time from the input data for each frame, i.e., the motor data corresponding to the actions to be taken thereafter and the sensor data corresponding to the external state which is likely to be detected thereafter, can be obtained, and therefore the robot learns tasks requiring real-time operations such as a task for rolling a ball to the right or left which is directly in front of the robot, and thus the robot is able to perform such tasks.

Here, the weight updating by the weight updating unit 333 of the robot in FIG. 24, i.e., updating the weight of the input winning node as to the sensor motor data serving as input data for each frame of the input network $net_{11}$, and the output winning node as to the sensor motor data serving as the output data for each frame delayed by just a predetermined amount of time from the point-in-time of the sensor motor data for each frame of the output network $net_{12}$, so as to be strengthened, is to perform learning of an input/output relation model $M_{1112}$ so as to correspond the sensor motor data for each frame and the sensor motor data for each frame which is delayed by just a fixed amount of time from the sensor motor data for each frame unit.

Then at the time of perceptive actions, when the sensor motor data for each frame is applied to the input/output relation model $M_{1112}$ which has been subjected to learning, with the input/output relation model $M_{1112}$, the node corresponding to (the estimation value of) the sensor motor data for each frame delayed by a fixed amount of time from the point-in-time of the sensor motor data for each frame unit, is obtained as a generating node, and it can thus be said that sensor motor data corresponding to the generating node is predicted from the sensor motor data of a given frame F, i.e., the sensor motor data of a future frame a fixed amount of time from the point-in-time of the frame F is predicted.

As described above, with the robot in FIG. 24, learning of the input/output relation model $M_{1112}$ so as to correlate the sensor motor data serving as input data in increments of frames and the sensor motor data serving as output data in increments of frames which are delayed by a fixed amount of time from the point-in-time from the input data in increments of frames.

Therefore, at the time of perceptive action (generating output data) of the robot, as sensor motor data which is input data, as long as the sensor motor data (known sensor motor data) in a time-sequence pattern matching the time-sequence pattern expressed by one of the nodes in the input network $net_{11}$ of the input/output relation model $M_{1112}$ (FIG. 25) is being input, the sensor motor data which is output data appropriate for the sensor motor data is generated, and consequently, the robot can perform the learned task again.

Further, with the robot in FIG. 24, sensor motor data serving as a vector wherein sensor data and motor data are components thereof is used for both input data and output data, and the sensor motor data serving as output data for each frame which is delayed by a fixed amount of time from the point-in-time of the input data for each frame, as to the sensor motor data serving as input data for each frame, i.e., (the estimation value of) so-called future sensor motor data is generated.

Accordingly, with the robot in FIG. 24, based on the sensor motor data serving as the input data for each frame, the current external state and the current action state of the robot itself are both considered, and so generating of sensor motor data serving as the output data for the frame delayed by a fixed amount of time from the point-in-time of the input data for each frame, i.e. predicting of the future external state at a fixed time, and determining of the future actions can be performed, thus enabling performing tasks with high reliability.

Specifically, for example, with a task to roll a ball to the left and right, in a situation wherein the action to perform is difficult to determine with only the state of the ball, i.e. only the sensor data (for example, with the task of rolling a ball to the left and right, when the ball is in a specified state, a situation of mixing a case of moving the arm from left to right, and a case of moving the arm from right to left), in a situation wherein noise is mixed in to the sensor data (for example, with the task of rolling a ball to the left and right, a situation wherein the sensor 302 detects not only the state of the ball which is to be detected, but also detects the state of the robot arm and outputs this sensor data), if the motor data delayed a fixed amount of time is generated based on only the sensor data, the actions of the robot can become unstable.

Conversely, in the situation of generating sensor motor data delayed by just a fixed amount of time, based on both the sensor data and the motor data, the sensor motor data delayed by just a fixed amount of time includes consideration not only of the current external state but also the current action state of the robot itself, and so stable actions can be taken.

Note that in the above-described example, output data of a frame delayed from the point-in-time of the frame of interest by an amount of time T which is the same as the duration of a frame, is employed as the output data of a frame delayed from the point-in-time of the frame of interest by a predetermined amount of time, that is to say, the amount of time T has been employed as the time difference between the frame of interest of the input data and the frame of the output data corresponding to the frame of interest (hereinafter referred to as "input/output time difference" as appropriate), but the input/output time difference is by no way restricted to the time T, and other examples of input/output time difference which may be employed include, but are not restricted to, 2T, 3T, 0.5T, and so forth.

Also, for the input/output time difference, the time having considered time $\Delta$ required for processing to determine the winning nodes as to the input data for each frame, i.e. the time T+$\Delta$, for example, can be used.

As above, according to the input/output relation model $M_{1112}$, having an input network $net_{11}$, and output network $net_{12}$, the (time-sequence pattern for the) input data for each frame is learnt with the input network $net_{11}$, and the output data for each frame is learnt with the output network $net_{12}$, and further, the correlation between the input data for each frame and the output data for a frame in the future by an amount equivalent to the input/output time difference can be learnt in a form called weight between the nodes of the input network $net_{11}$ and nodes of the output network $net_{12}$, and therefore, based on (the input data corresponding to) the current state of the robot, perceptive action called (generating (an estimation value of) the output data corresponding to) performing the next appropriate action can be taken.

That is to say, with the perceptive action using the input/output relation model $M_{1112}$, as described in FIG. 29, the node with the best score as to the input data out of the nodes in the input network $net_{11}$ is to be determined as the winning node (step S322). Further, the node with the strongest weight with the winning node out of the nodes of the output network $net_{12}$ is determined as the generating node (step S323). Then using the generating node, the (estimation value of the) output data in the future by an amount equivalent to the input/output time difference from the point-in-time of the input data is generated.

Figure 30:
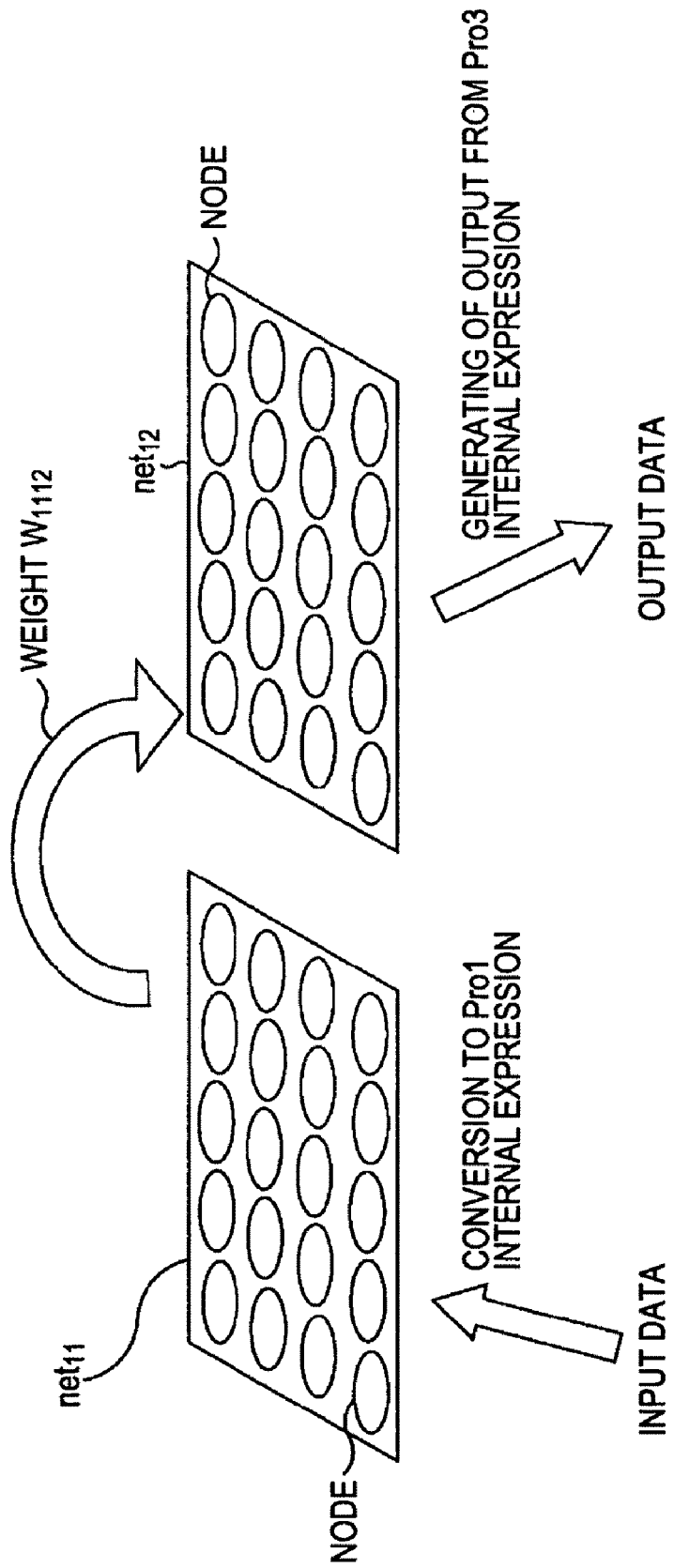
FIG. 30 is a diagram for describing the perceptive action processes Pro1, Pro2, and Pro3 using the input/output relation model $M_{1112}$.

Accordingly, as described in FIG. 30, the perceptive action using the input/output relation model $M_{1112}$ can be divided into 3 processes, which are a process Pro1 for converting the input data into an internal expression, a process Pro2 for predicting the internal expression of the future output data from the internal expression of the input data, and a process Pro3 for generating (the estimation value of) the output data from the predicted internal expression.

That is to say, with the input/output relation model $M_{1112}$, at the input network $net_{11}$, the input data is abstracted to the node with the best score (the winning node) as to the input data thereof, and the node label (input label) showing this node is expressed with an internal expression.

Here, with the output network $net_{12}$ as well, similarly, the output data is abstracted to the node with the best score as to the output data thereof, and the node label showing this node is expressed with an internal expression.

Determining the winning node as to the input data from the nodes in the input network $net_{11}$ is equivalent to the process Pro1 which converts the input data to an internal expression.

Also, following determining of the winning node, the node of the output network $net_{12}$ wherein the weight between the winning node thereof is the strongest is determined to be the generating node used for generating output data in the future by an amount equivalent to the input/output time difference, this determining of the generating node being equivalent to the process Pro2 for predicting the internal expression of future output data.

Further, following determining of the generating node, generating output data using the generating node thereof is equivalent to the process Pro3 for generating output data from the predicted internal expression.

Incidentally, with the perceptive action of the robot in FIG. 24, in the process Pro1 for converting input data to an internal expression, scores are calculated as to the input data for each frame for all of the nodes in input network $net_{11}$, and the node with the best score thereof is determined to be the winning node as to the input data for each frame.

Accordingly, the burden of processing for score calculation increases as the number of nodes for configuring the input network $net_{11}$ increases.

Figure 31:
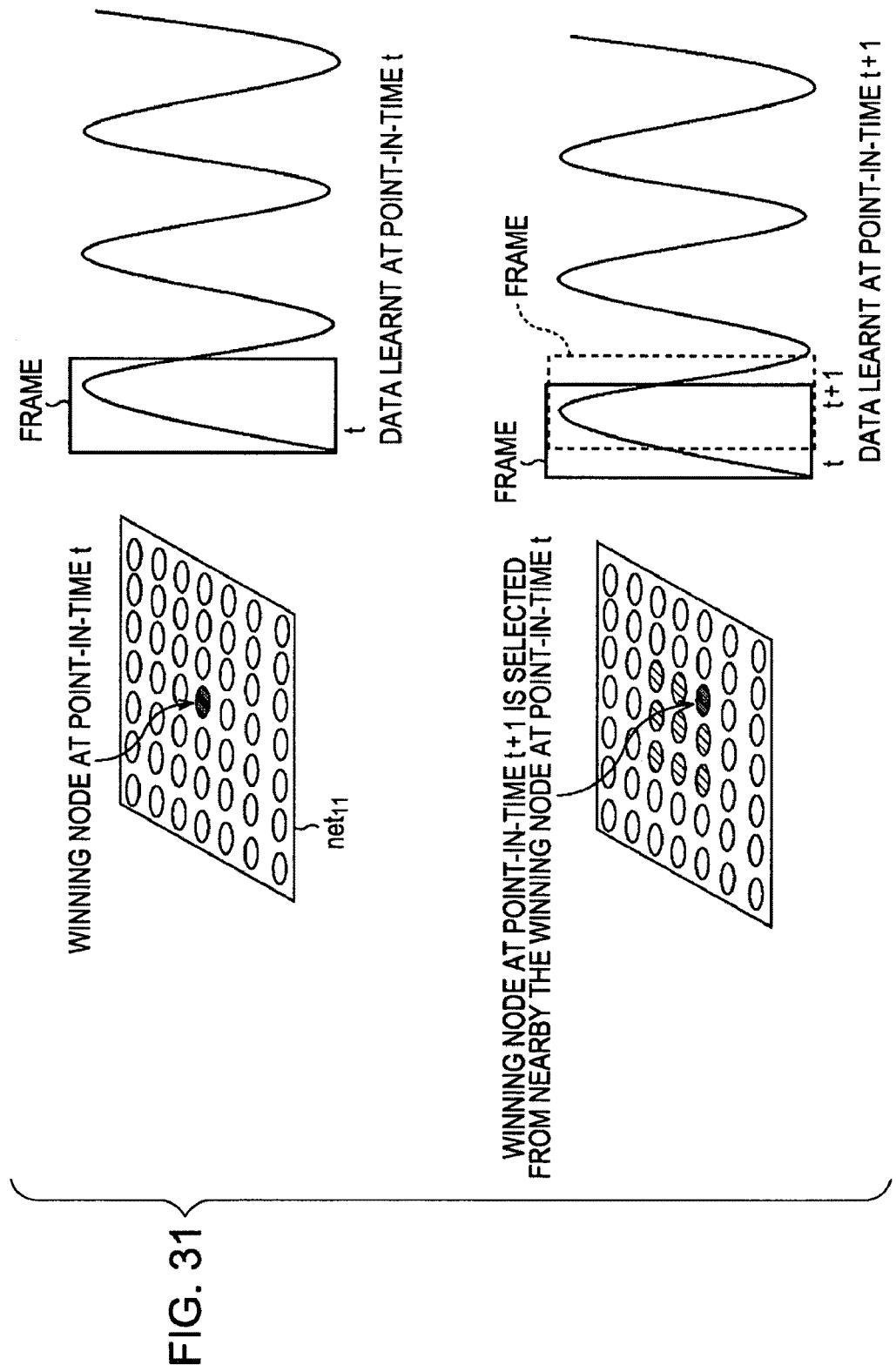
FIG. 31 is a diagram for describing that score calculations are performed only for distance-restricted nodes.

Thus, for example, as shown in FIG. 31, following determining of the winning node as to the input data of the frame at time t, determining the winning node Nt+1 as to the input data of the frame at point-in-time t+1 of the next frame, for example, can be performed only for nodes wherein the distance between the winning node $N_t$ as to the input data of the frame at point-in-time t immediately preceding the input data of the frame time t+1 is within a predetermined distance (hereinafter referred to as "distance-restricted nodes", as appropriate).

In this case, the score calculation as to the input data of the frame at point-in-time t+1 only needs to be performed for the distance-restricted node near the winning nodes $N_t$ as to the input data of the point-in-time t, not for all of the nodes in the input network $net_{11}$, and therefore the burden of processing the score calculations can be reduced.

Note that for the distance between two nodes, for example, as described above, the number of links configuring the shortest path between the two nodes can be used.

Also, when the predetermined distance is made small, the number of nodes to have scores calculated are lessened, but the freedom of the node to serve as the winning node is lost. Conversely, when the predetermined distance is great, the restrictions on the node to serve as the winning node is relaxed, but the number of nodes to be subjected to score calculation is great.

Thus, the predetermined distance can be set (determined) based on the number of nodes (total number) of the time-sequence pattern network. Also, the predetermined distance can be set according to the user operation.

As described above, FIG. 32 illustrates a configuration example of a robot wherein determining of the winning node is performed only on the distance-restricted nodes.

Note that portions which correspond to parts of the robot shown in FIG. 24 are denoted with the same reference numerals, and description thereof will be omitted in the following. That is to say, the robot in FIG. 32 is configured similarly to the robot in FIG. 24, other than being provided with a recognition learning processing unit 1321, score calculating unit 1341, and winning node determining unit 1342 instead of the recognition learning processing unit 321, score calculating unit 341, and winning node determining unit 342, respectively.

As with the recognition learning processing unit 321 in FIG. 24, the recognition learning processing unit 1321 updates the input network $net_{11}$ and output network $net_{12}$ of the input/output relation model $M_{1112}$ (FIG. 25) stored in the storage unit 311, in a self-organizing manner, based on the input data and output data for each frame which is supplied from the data extracting unit 312, but the determining of the winning node performed at this time is performed only on the distance-restricted nodes.

That is to say, the recognition learning processing unit 1321 obtains scores as to the input data of the current frame from the data extracting unit 312 regarding the distance-restricted nodes wherein the distance from the winning node as to the input data of the previous frame is within a predetermined distance, out of the nodes in the input network $net_{11}$ of the input/output relation model $M_{1112}$, and determines the node with the best score out of the distance-restricted nodes of the input network $net_{11}$ as the winning node (input winning node), and based on the input winning node, updates the input network $net_{11}$ in a self-organizing manner and supplies an input label, serving as a node label indicating the input winning node, to the picture learning unit 314.

Further, the recognition learning processing unit 1321 obtains scores as to the output data of the current frame from the data extracting unit 312 regarding the distance-restricted nodes wherein the distance from the winning node as to the output data of the previous frame is within a predetermined distance, out of the nodes in the output network $net_{11}$ of the input/output relation model $M_{1112}$, and determines the node with the best score out of the distance-restricted nodes of the output network $net_{11}$ as the winning node (output winning node), and based on the output winning node, updates the output network $net_{12}$ in a self-organizing manner and supplies an output label, serving as a node label showing the output winning node, to the picture learning unit 314.

The score calculating unit 1341 takes the input data of the current frame from the data extracting unit 315 to serve as the input data of the frame of interest, calculates the score as to the frame of interest of the distance restricted nodes wherein the distance from the winning node as to the input data of the previous frame, out of the nodes in the input network $net_{11}$ configuring the input/output relation model $M_{1112}$ stored in the storage unit 311, is within a predetermined distance, and supplies this to the winning node determining unit 1342.

The winning node determining unit 1342 determines the node, wherein the score from the score calculating unit 1341 is the best, out of the distance-restricted nodes of the input network $net_{11}$ configuring the input/output relation model $M_{1112}$ stored in the storage unit 311, to be the input winning node, and the input label showing the input winning node is supplied to the copying unit 317.

Next, learning processing which the robot shown in FIG. 32 performs, i.e., learning processing of the input/output relation model $M_{1112}$, will be described with reference to the flowchart in FIG. 33.

For example, in the event of causing a robot to perform a task of rolling a ball in front of itself to the left and right, the operator (the user training the robot to learn a task) places the ball in front of the robot, holds the arm of the robot, and moves the arm such that the ball is rolled to the left and right.

In this case, the sensor 302 detects the state of the ball rolling to the left and right, and time-sequence sensor data representing that state is supplied to the data extracting unit 312 of the data processing device 301.

Also, at the motor driving unit 303, motor data corresponding to the movement of the arm which the operator is moving is generated, and supplied to the data extracting unit 312 of the data processing device 301.

In step S341, the data extracting unit 312 extracts sensor motor data which is time-sequence of a vector wherein the sensor data from the sensor 302 and the motor data from the motor driving unit 303 are components thereof, as input data and output data, extracting the input data for each frame from the time-sequence of the input data, and extracting the output data for each frame from the time-sequence of the output data, and supplies the input data and output data for each of the frames to the recognition learning processing unit 1321 of the learning processing unit 313, and the flow advances to step S342.

In step S342, the learning processing unit 313 uses the input data and output data in increments of frames from the data extracting unit 312 to perform self-organizing learning of the input network $net_{11}$ and output network $net_{12}$ of the input/output relation model $M_{1112}$ (FIG. 25) stored in the storage unit 311.

That is to say, in step S342, the processing of steps $S342_1$ and $S342_2$ is performed.

In step $S342_1$, the recognition learning processing unit 1321 obtains a score regarding input data in increments of frames from the data extracting unit 312, regarding the distance-restricted nodes of the input network $net_{11}$ in the input/output relation model $M_{1112}$ stored in the storage unit 311, and of the distance-restricted nodes of the input network $net_{11}$, determines the node with the best score to be the input winning node. Further, the recognition learning unit 1321 updates the input network $net_{11}$ in a self-organizing manner based on the input winning node as to the input data in increments of frames from the data extracting unit 312, and supplies an input label representing the input winning node to the picture learning unit 314.

In step $S342_2$, the generating learning processing unit 322 obtains a score regarding output data in increments of frames from the data extracting unit 1312, regarding the distance-restricted nodes of the output network $net_{12}$ in the input/output relation model $M_{1112}$ stored in the storage unit 311, and of the distance-restricted nodes of the output network $net_{12}$, determines the node with the best score to be the output winning node. Further, the recognition learning unit 1321 updates the output network $net_{12}$ in a self-organizing manner based on the output winning node as to the output data in increments of frames from the data extracting unit 312, and supplies an output label representing the output winning node to the picture learning unit 314.

Following the processing in step S342, the flow advances to steps S343 and S344 in that order, and processing the same as with the steps S303 and S304 in FIG. 28 is performed respectively.

That is to say, the picture learning unit 314 correlates a frame which is not yet a frame of interest of the frames in the input data to serve as a frame of interest, with an input label representing the input winning node as to the input data for the frame of interest and the output label representing the output winning node as to the output data for a frame delayed by just the input/output time difference from the frame of interest from the learning processing unit 313.

Specifically, in step S343, with the data buffer 331 of the picture learning unit 314, an input label representing the input winning node as to the input data in increments of frames and an output label representing the output winning node as to the output data in increments of frames, from the learning processing unit 313, and are temporarily stored.

Further, in step S343, the reading unit 332 of the picture learning unit 314 reads out and correlates, the input label representing the input winning node as to the input data of the frame of interest from the input labels stored in the data buffer 331, and the output label representing the output winning node as to the output data of a frame delayed from the point-of-time of the frame of interest by an amount of input/output difference from the output labels stored in the data buffer 331, and supplies the label se to the correlated input label and output label to the weight updating unit 333.

The flow then proceeds from step S343 to step S344, and the weight updating unit 333 of the picture learning unit 314 updates the jointing relation between the nodes of the input network $net_{11}$ and the nodes of the output network $net_{12}$ in the input/output relation model $M_{1112}$ (FIG. 25) based on the label set supplied from the reading unit 332.

That is to say, the weight updating unit 333 updates the input nodes of the input network $net_{11}$ of the input/output relation model $M_{1112}$ stored in the storage unit 311 and the output winning node of the output network $net_{12}$ thereof which the output label of the label set represents, around the input winning node of the input network $net_{11}$ which the input label of the label set represents, and also updates the output nodes of the output network $net_2$ and the input winning node of the input network $net_{11}$, around the output winning node of the output network $net_{12}$.

According to the learning processing of the input/output relation model $M_{1112}$ as described above, similar to the learning processing described in FIG. 28, updating is performed at the input/output relation model $M_{1112}$ stored in the storage unit 311 such that the weight between the input winning node of the input network $net_{11}$ as to the input data of the frame of interest, and the output winning node of the output network $net_{12}$ as to the output data of a frame delayed from the frame of interest by the input/output time difference, becomes stronger.

Next, the processing for self-organizing learning of a time-sequence pattern storage network (input network $net_{11}$ and output network $net_{12}$ included in the input/output relation model $M_{1112}$ (FIG. 25)), performed in step S324 in FIG. 33, will be described with reference to the flowchart in FIG. 34.

Figure 33:
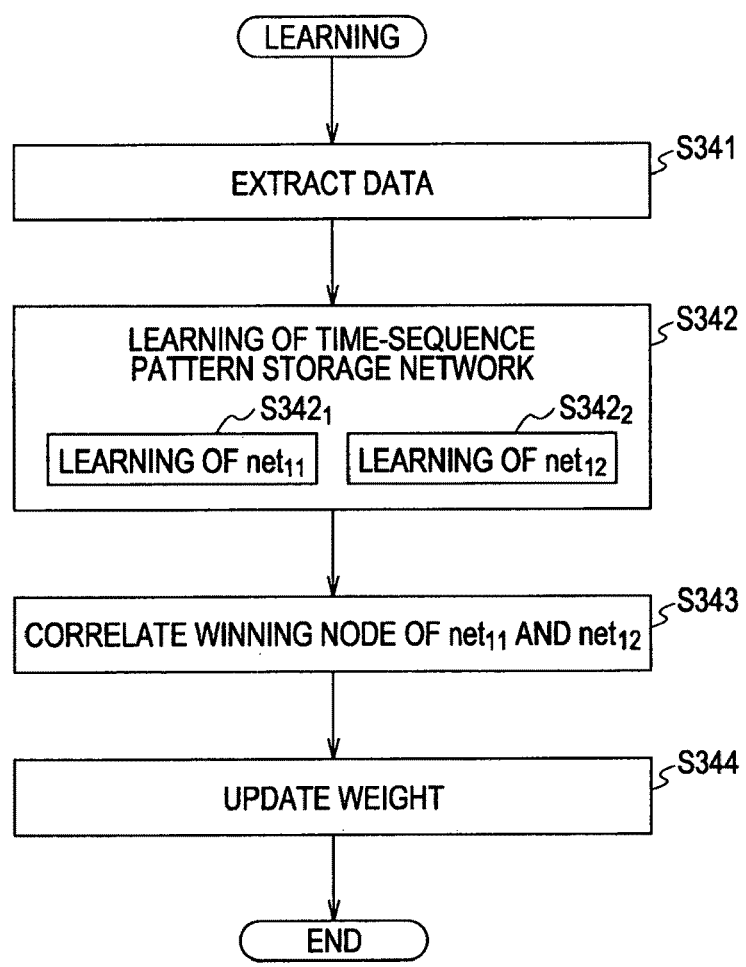
FIG. 33 is a flowchart for describing learning with an input/output relation model $M_{1112}$.
Figure 34:
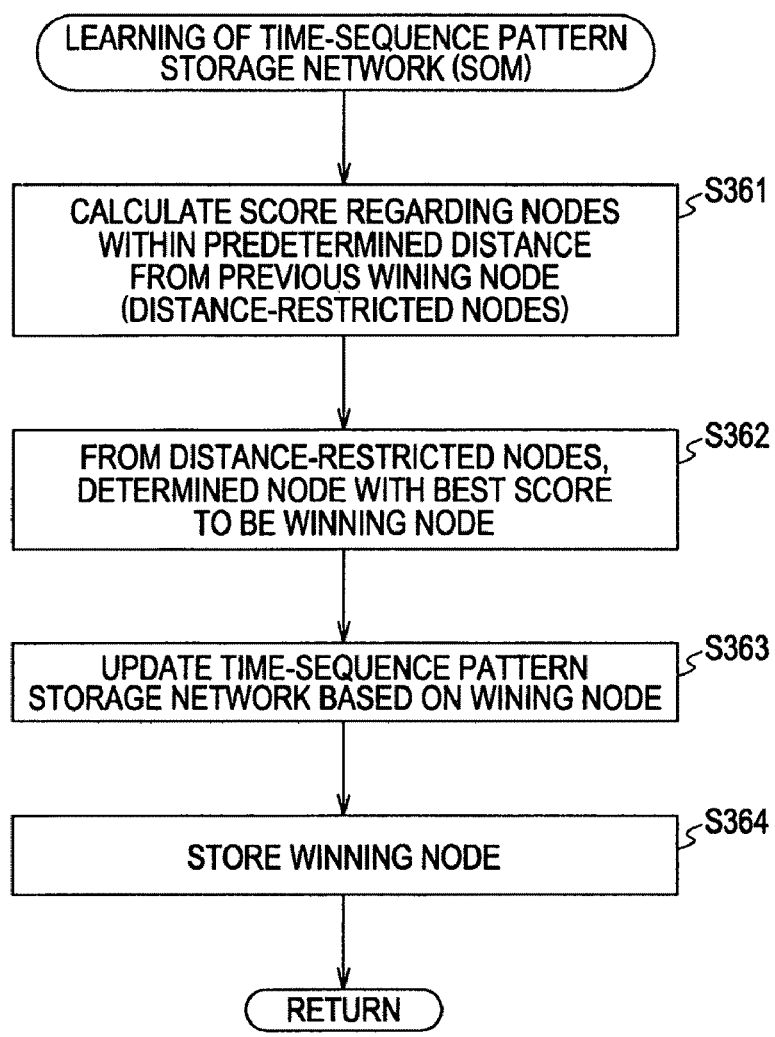
FIG. 34 is a flowchart for describing learning with a time-sequence pattern storage network.

In step S324 in FIG. 33, as shown in FIG. 34, first in step S361, the recognition learning processing unit 1321 finds a node serving as a distance-restricted node wherein, of the nodes in the input network $net_{11}$ of the input/output relation model $M_{1112}$, the distance from the winning node as to the input data of the previous frame is within a predetermined distance, and a score as to the input data of the current frame is obtained from the data extracting unit 312 from this distance-restricted node, and the flow advances to step S362.

In step S362, the recognition learning processing unit 1321 determines the node with the best score found in step S361 from the distance-restricted nodes in the input network $net_{11}$ as the winning node, and the flow advances to step S363. In step S363, the recognition learning processing unit 1321 updates the input network $net_{11}$ in a self-organizing manner, based on the winning node determined in step S362, and supplies the node label (input label) expressing the winning node to a picture learning unit 314, and the flow advances to step S364.

In step S364, the recognition learning processing unit 1321 stores the node label of the winning node determined in step S362, and ends the learning processing of the input network $net_{11}$ using the input data of the current frame.

Note that the node label stored in step S364 is used to recognize the winning node as to the input data of the previous frame, when finding the distance restriction node with the processing in the next step S361, i.e., the learning processing of the input network $net_{11}$ using the input data of the next frame.

Also, the processing according to the flowchart in FIG. 34 is also performed as learning processing of the output network $net_{12}$ using the output data of the current frame.

Next, description will be made regarding processing of perceptive actions of the robot shown in FIG. 32, i.e., the generating processing (recognition generating processing) of time-sequence data using the input/output relation model $M_{1112}$, with reference to the flowchart in FIG. 35.

In a case wherein a robot has learned to perform the task of rolling a ball placed in front of it to the left and right, as described with reference to FIG. 33 for example, upon a ball being placed before the robot (and rolled if necessary), the state of the ball is detected at the sensor 302, and time-sequence sensor data representing that state is supplied to the data extracting unit 315 of the data processing device 301.

Further, motor data is also supplied from the motor driving unit 303 to the data extracting unit 315 of the data processing device 301.

In step S381, the data extracting unit 315 takes the sensor motor data which is time-sequence of a vector having as components thereof the sensor data from the sensor 302 and the motor data for the motor driving unit 303, as input data, extracts input data in increments of frames from the time-sequence of the input data, supplies this to the recognizing unit 316, and proceeds to step S382.

In step S382, at the recognizing unit 316, the score calculating unit 1341 sequentially takes input data in increments of frames from the data extracting unit 315 as input data of a frame of interest, calculates the score of the distance-restricted nodes of the input network $net_{11}$ making up the input/output relation model $M_{1112}$ stored in the storage unit 311 as to the input data of the frame of interest, and supplies this to the winning node determining unit 1341.

Further, in step S382, the winning node determining unit 1342 determines the node of the distance-restricted nodes of the input network $net_{11}$ making up the input/output relation model $M_{1112}$ stored in the storage unit 311 which has the best score from the score calculating unit 1341 to be the winning node, supplies an input label representing the winning node to the picture unit 317, and the flow proceeds to step S383.

In step S383, the generating node determining unit 351 of the picture unit 317 determines the node of the output network $net_{12}$ making up the input/output relation model $M_{1112}$ stored in the storage unit 311 which has the greatest weight as to the node represented by the input label from the winning node determining unit 1342 (winning node) to be the generating node, and supplies an output label representing the generating node to the generating unit 318, and the flow proceeds to step S384.

In step S384, the time-sequence generating unit 361 of the generating unit 318 generates and outputs time-sequence data of a frame length, for example, to serve as output data (more particularly, estimation values thereof) as to the input data of the frame of interest, based on the time-sequence pattern model 21 (FIG. 7) of the node of the output network $net_{12}$ making up the input/output relation model $M_{1112}$ stored in the storage unit 311 which is represented by the output label from the generating node determining unit 351.

The time-sequence data serving as output data is sensor motor data, and the motor data of this sensor motor data is supplied to the motor driving unit 303 from the time-sequence generating unit 361, and the motor driving unit 303 drives the motor according to the motor data from the time-sequence generating unit 361, whereby the robot arm moves.

Subsequently, the processing of steps S382 through S384 is performed regarding the input data in increments of frames that is supplied from the data extracting unit 315 to the recognizing unit 316.

Next, the determining processing of the winning node performed in step S382 in FIG. 35 will be further described with reference to the flowchart in FIG. 36.

Figure 35:
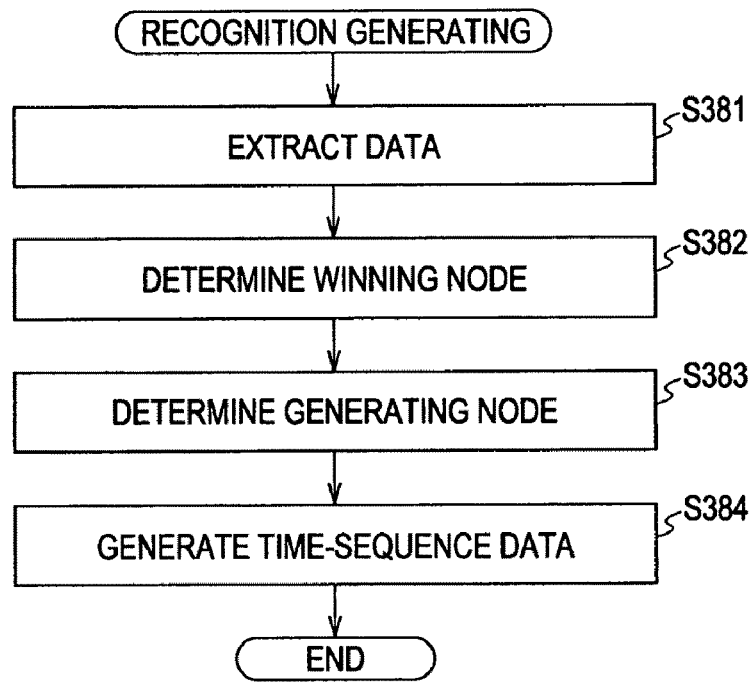
FIG. 35 is a flowchart for describing recognition generating processing of generating time-sequence data, using the input/output relation model $M_{1112}$.
Figure 36:
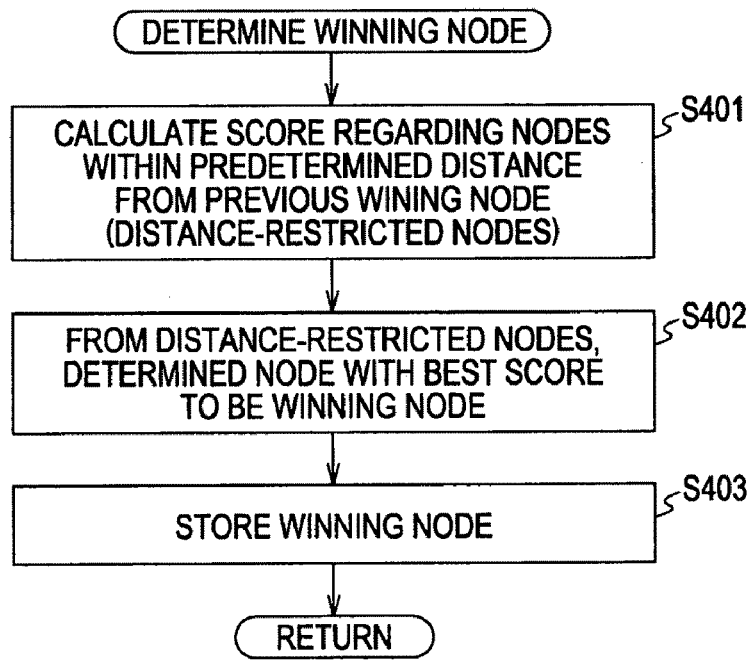
FIG. 36 is a flowchart describing the processing for determining a winning node.

In step S382 in FIG. 35, as shown in FIG. 36, first in step S401, a score calculating unit 1341 finds a node serving as a distance-restricted node wherein, of the nodes in the input network $net_{11}$ of the input/output relation model $M_{1112}$, the distance from the winning node as to the input data of the previous frame (the frame immediately preceding the frame of interest) is within a predetermined distance. Further, the score calculating unit 1341 obtains a score as to the input data of the current frame (the frame of interest) from the data extracting unit 315 from this distance-restricted node, supplies this to a winning node determining unit 1341, and the flow advances to step S402.

In step S402, the winning node determining unit 1342 determines the node with the best score supplied from the score calculating unit 1341 from the distance-restricted nodes in the input network $net_{11}$ as the winning node, supplies the node label (input label) indicating the winning node to the picture unit 317 and score calculating unit 317, and the flow advances to step S403.

In step S403, the score calculating unit 1341 stores the node label of the winning node determined in step S362 and supplied from the winning node determining unit 1341, and ends the predetermined processing of the winning node.

Note that the node label stored in step S403 is used to recognize the winning node as to the input data of the previous frame, when finding the distance restriction node with the determining processing of the winning node as to the input data of the next frame.

As described above, according to the learning processing in FIG. 33, with the input/output relation model $M_{1112}$ stored in the storage unit 311, the weight of the input winning node of the input network $net_{11}$ as to the input data of the frame of interest, and the output winning node of the network $net_{12}$ as to the output data of the frame delayed by a fixed amount of time from the frame of interest, is updated so as to be stronger.

Accordingly, with the recognition generating processing in FIG. 35, when input data of a given frame F is provided to the input/output relation model $M_{1112}$, with the input/output relation model $M_{1112}$, out of the nodes in the input network $net_{11}$, the node corresponding to the input data of frame F becomes the input winning node, and of the nodes in the output network $net_{12}$, the node corresponding to the input data of a frame delayed from the frame F by a predetermined amount of time becomes the output winning node, whereby time-sequence data equivalent to output data of a frame delayed from the frame F by a predetermined amount of time is generated.

That is to say, even with the robot in FIG. 32, as with the robot in FIG. 24, learning is performed so that, regarding the sensor motor data serving as input data for each frame, i.e., the external state and the state of the robot itself, sensor data corresponding to the sensor motor data serving as output data of the frame delayed by just a fixed time from the input data for each frame, i.e., the motor data corresponding to the actions to be taken thereafter and the external state which is likely to be detected thereafter, can be obtained, and therefore the robot learns tasks requiring real-time operation such as a task for rolling a ball to the right or left which is directly in front of the robot, and thus is able to perform such tasks.

Further, with the robot in FIG. 32, with the recognition learning processing unit 1321 or the score calculating unit 1341, score calculations are performed only for the distance restriction nodes, and therefore the burden of score calculating processing can be reduced.

Note that the score calculation only for distance restriction nodes, as described above, can also be applied to the data processing device in FIG. 9 or the data processing device in FIG. 20. Further, the score calculations performed for the distance restriction nodes can be applied not only to a time-sequence pattern storage network, but also to score calculation of a SOM having nodes wherein weight vectors of the same dimensions as the vectors serving as the input data (with weight vectors assigned to nodes), rather than the time-sequence pattern model 21.

Next, with a recognition action of the robot in FIG. 24 as described above, with a process Pro2 which estimates an internal expression of future output data from the internal expression of input data, the node of the output network $net_{12}$ wherein the weight of the winning node of the input network $net_{11}$ as to the input data of a given frame F is strongest is determined to serve as the generating node used for generating output data of a future frame by the difference in input/output time from the point-in-time of the frame F.

Accordingly, with the robot in FIG. 24, the estimation variation of the internal expression of future output data, i.e., the number of nodes which can become generating nodes is limited to the number of nodes configuring the output network $net_{12}$, at the most. Consequently, to focus on the process Pro2, the time-sequence data serving as output data generated using the input/output relation model $M_{1112}$, and thus the variation in actions taken by the robot can be limited to the number of nodes configuring the output network $net_{12}$.

Figure 37:
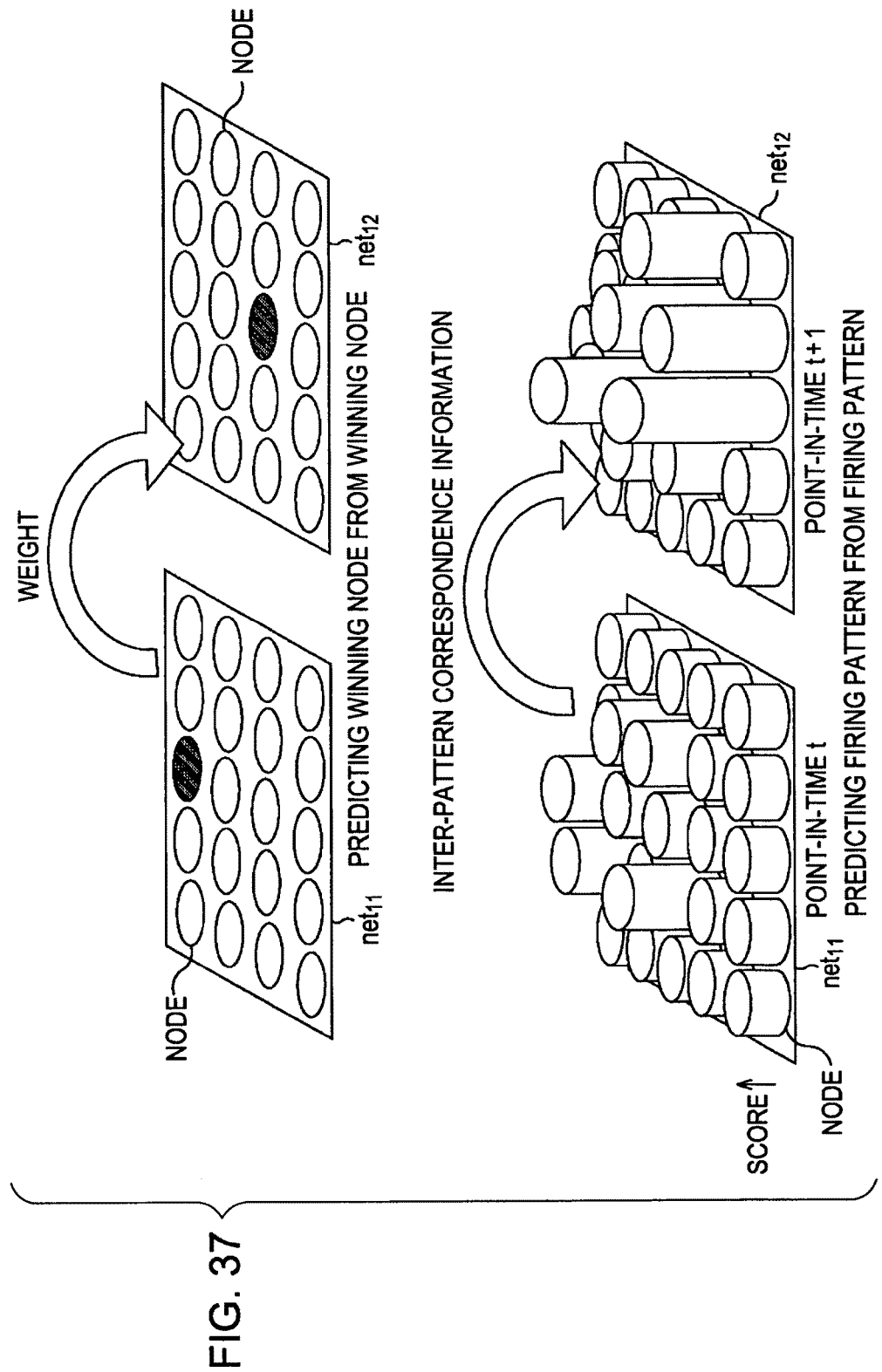
FIG. 37 is a diagram for describing the process Pro2 for predicting an output firing pattern from an input firing pattern.

Thus, as the internal expression of the input data, rather than node labels, a firing pattern is used which is a distribution of node scores of the input network $net_{11}$ as to the input data, and similarly a firing pattern is used which is a distribution of node scores of the output network $net_{12}$ as to the output data, as the internal expression of the output data, and with the process Pro2, as shown in FIG. 37, the firing pattern of the future frame output data can be predicted for by an amount equivalent to input/output time difference from the point-in-time of a given frame F, by the firing pattern of the input data of the frame F.

Here, the upper portion of FIG. 37 illustrates the process Pro2 for estimating node labels of an output data node (generating node) of a future frame by an amount equivalent to input/output time difference from the point-in-time of frame F, from the node label of the winning node in the input network $net_{11}$ as to the input data in the frame F, with the node label as an internal expression.

Also, the lower portion of FIG. 37 illustrates the process Pro2 for estimating a firing pattern serving as the distribution of node scores of the output network $net_{12}$ as to the output data of the future frames by an amount equivalent to input/output time difference from the point-in-time of frame F, from the firing pattern serving as node score distribution of the input network $net_{11}$ as to the input data of frame F, with the firing pattern as an internal expression.

With the process Pro2 of the upper portion of FIG. 37, the node of the output network $net_{12}$ wherein the weight of the winning node, based on the weight of the winning node from the winning nodes of the input network $net_{11}$ as to the input data of frame F, is strongest, is determined to be the generating node used for generating the output data of the future frame by an amount equivalent to input/output time difference from the point-in-time of the frame F. That is to say, from the node label of the winning node of the input network $net_{11}$ as to the input data of the frame F, based on the weight, the node label of the output data node (generating node) of the future frame by an amount equivalent to input/output time difference from the point-in-time of the frame F is predicted.

Accordingly, with the process Pro2 of the upper portion of FIG. 37, if there are M nodes of the output network $net_{12}$, there can only be M estimation results, at most.

On the other hand, with the process Pro2 of the upper portion of FIG. 37, a firing pattern serving as the scoring distribution pattern of the nodes in the output network $net_{12}$, as to the future frame output data by an amount equivalent to input/output time difference from the point-in-time of the frame F, is predicted from the firing pattern serving as the scoring distribution pattern of the nodes in the input network $net_{11}$ as to the input data of the frame F.

Now, if we say that there are M nodes of the output network $net_{12}$, and the score is shown with K bits, then there are only $(2^k)^M$ firing patterns serving as a distribution of the scores of the nodes in the output network $net_{12}$. Accordingly, with the process Pro2 of the lower portion of FIG. 37, there are only $(2^k)^M$ estimation results, at most.

Incidentally, if the firing pattern serving as the distribution of the scores of the nodes in the input network $net_{11}$ is called an input firing pattern, and the firing pattern serving as the distribution of the scores of the nodes in the output network $net_{12}$ is called an output firing pattern, in order to estimate the output firing pattern from the input firing pattern, the input firing pattern and output firing pattern need to be correlated (a picture from the input firing pattern to the output firing pattern is obtained).

Now, calling the information correlating the input firing pattern and the output firing pattern "inter-pattern correspondence information", the inter-pattern correspondence information can be obtained (learned) with a function approximation method such as SVR (Support Vector Regression) or the like, for example, or with another method.

Now, with SVR, an output scalar value serving as a one-dimensional value is output with an input vector serving as a multiple n-dimensional value as an argument, whereby the real-valued function $f(\ ):R^n \to R$ shown in the following expression can be estimated.

$$y = f(z) = \sum_{j=1}^{J} \theta_j K(s_j, z) + b \quad (6)$$

In this expression (6), y expresses an output scalar value, and $z \in R^n$ expresses the input vector. Also, K(,) expresses a kernel function, and b is the scalar amount called a bias item. Further, J expresses a support vector number, and $S_j \in R^n$ expresses the j'th support vector out of J support vectors.

With the SVR learning, when the output scalar value $y_d$ and set of input vector $z_d$ (d=1, 2, ..., D) serving as a learning sample of a given number D, and the kernel function K(,) are provided, the parameters $s_j$, $\theta_j$, b which regulate the function $f(\ )$ to appropriately perform copying from the input vector $z_d$ to the output scalar value $y_d$ are obtained. Note that regarding the support vector number J, the value of the learning sample number D or lower is obtained with the SVR learning process.

SVR learning is often performed in batch learning, but a method wherein online learning is performed has also been proposed. As a method of performing SVR learning with online learning, for example, there is a method called AOSVR (Accurate Online SVR).

In the case of performing the correlating between the input firing pattern and the output firing pattern with SVR, the inter-pattern correspondence information becomes the parameters $s_j$, θj, b which regulate the function $f(\ )$ in the above expression (6).

With the inter-pattern correspondence information learning with SVR, the function $f(\ )$ in the expression (6) is prepared with a number equivalent to the number of nodes in the output network $net_{12}$. Now, if we say that there are M nodes of the output network $net_{12}$, and the function $f(\ )$ corresponding to the mth (m=1, 2, ... M) node thereof, then the inter-pattern correspondence information serving as the parameters $S_j$, $\theta_j$, b which regulate the function $f_m(\ )$ takes the score of the mth node of the output network $net_{12}$ as the output scalar value y serving as the learning sample, and also obtains the vector corresponding to the input firing pattern, i.e., the vector wherein the score for each node of the input network $net_{11}$ is a component thereof, as the input vector z serving as the learning sample.

Note that SVR is explained in "Support Vector Machines", Kyoritsu Publishing, pp. 149-159, for example.

Next, with the recognition action of the robot in FIG. 24, in the process Pro3 generating the output data from an internal expression predicted with the process Pro2, one of the nodes of the nodes in the output network $net_{12}$ serves as the generating node, and the output data is generated using this generating node.

Accordingly, with the robot in FIG. 24, by focusing on the process Pro3, the (predicted value of the) output data generated with the data processing device 301, and thus the variation in actions taken by the robot can be limited to the number of nodes configuring the output network $net_{12}$.

Figure 38:
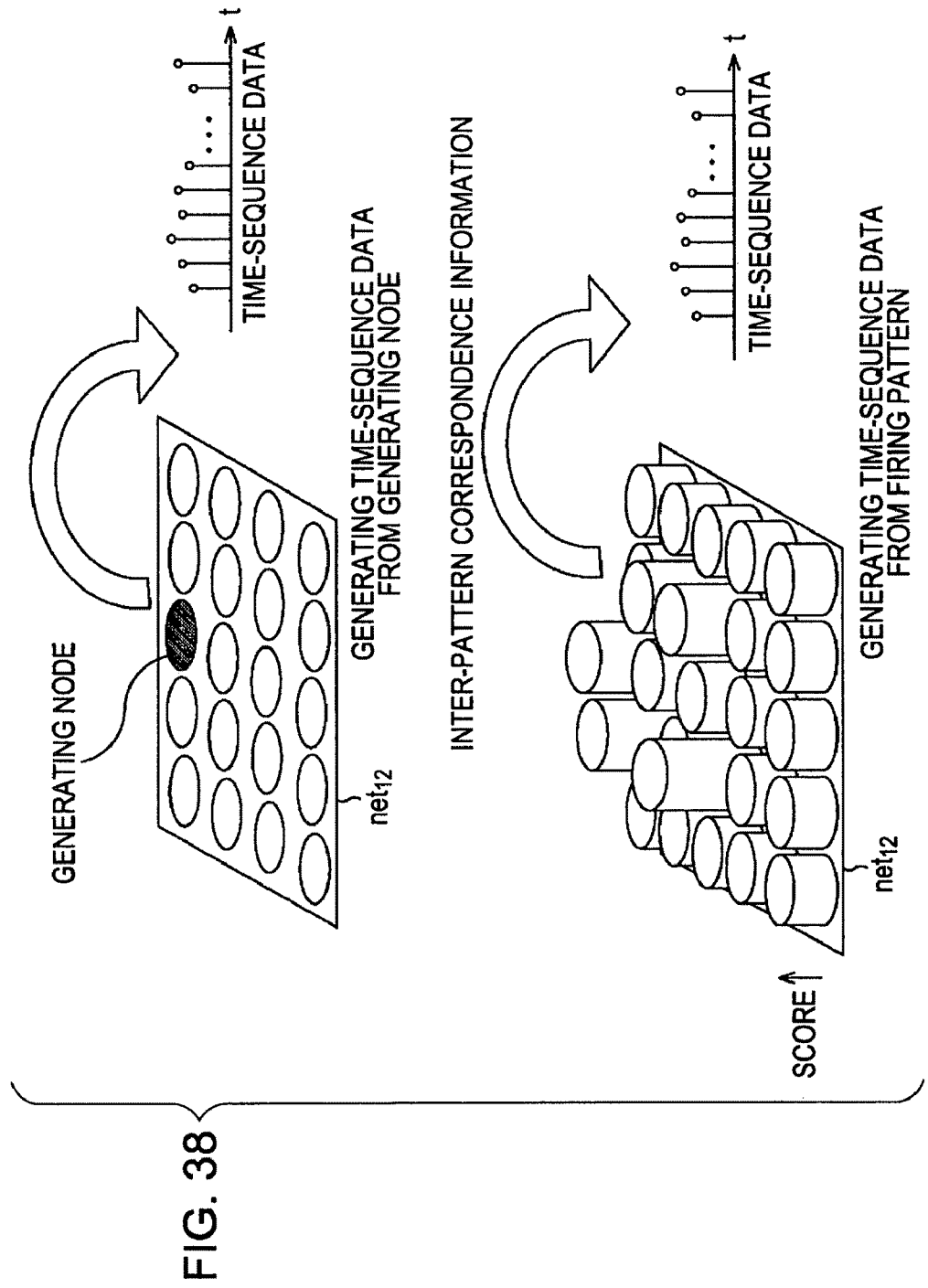
FIG. 38 is a diagram for describing the process Pro3 for generating output data from the output firing pattern predicted in the process Pro2.

On the other hand, as described with FIG. 37, the input firing pattern is used as an internal expression of the input data, and also the output firing pattern is used as an internal expression of the output data, wherein with the process Pro2, in the case of predicting the firing pattern (output firing pattern) of the output data of a future frame by an amount equivalent to input/output time difference from the point-in-time of the frame F, with the process Pro3 which generates the output data from the internal expression predicted in the process Pro2, as shown in FIG. 38, the output data must be generated not from the node set as the generated node in the output network $net_{12}$, but from the output firing pattern predicted with the process Pro2.

Here in the upper portion of FIG. 38, the node label serves as an internal expression, and the node of the output network $net_{12}$ wherein the weight of the winning node of the input network $net_{11}$ as to the input data of the frame F is the strongest serves as the generating node, and the process Pro3 which generates the output data from this generating node is shown.

Also, in the lower portion of FIG. 38, the firing pattern serves as an internal expression, and the process Pro3 which generates the output data from the output firing pattern is shown.

In the process Pro3 in the upper portion of FIG. 38, the time-sequence data (prototype time-sequence data) of a time-sequence pattern expressed by a time-sequence pattern model 21 of a generating node (FIG. 7) is generated as the output data.

Accordingly, in the process Pro3 in the upper portion of FIG. 38, if we say there are M nodes of the output network $net_{12}$, there are only M time-sequence data generated as (estimation values of) output data, at most.

On the other hand, in the process Pro3 in the upper portion of FIG. 38, time-sequence data serving as output data is generated from the output firing pattern.

Now, if we say that there are M nodes of the output network $net_{12}$, and the score is shown with K bits, there are only $(2^k)^M$ firing patterns serving as a distribution of the scores of the nodes in the output network $net_{12}$. Accordingly, with the process Pro3 of the lower portion of FIG. 38, as many as $(2^k)^M$ time-sequence data sets can be generated as the output data.

Incidentally, in order to generate the time-sequence data serving as output data from the output firing pattern, the output firing pattern and the time-sequence data serving as output data need to be correlated (a picture from the output firing pattern to the output time-sequence data serving as output data is obtained).

Now, if we say that the information correlating the output firing pattern and the time-sequence data serving as the output data is called the inter-time-sequence correspondence information, then the inter-time-sequence correspondence information can be obtained (learned) with a function approximation method such as SVR or with another method, similar to the above-described inter-pattern correspondence information.

In the case that the correlating of the output firing pattern and the time-sequence data serving as output data is performed with SVR, the inter-time-sequence correspondence information becomes the parameters $s_j$, $\theta_j$, b which regulate the function f( ) in the above expression (6).

With the inter-time-sequence correspondence information learning with SVR, there are prepared function f( ) in the expression (6) of a number equivalent to the number of sample points of the time-sequence data serving as the output data which is generated from the output firing pattern. Now, if we say that the number of sample points of the time-sequence data serving as output data generated from the output firing pattern is equal to time T of the frame, and the function f( ) corresponding to the time-sequence data (sample values) of the i'th sample point (i=1, 2, . . . , T) from the top is expressed as $f_i$( ), the inter-time-sequence correspondence information serving as the parameters $s_j$, $\theta_j$, b which regulate the function $f_i$( ) takes the sample value of the i'th sample point as an output scalar value y serving as a learning sample, and also obtains the vector corresponding to the output firing pattern, i.e., the vector wherein the score for each node of the output network $net_{12}$ is a component thereof, as the input vector z serving as the learning sample.

As described above, FIG. 39 illustrates a configuration example of a robot which uses a firing pattern serving as the internal expression of the input data and output data, and predicts the output firing pattern from the input firing pattern in the process Pro2, as well as generates output data from the output firing pattern in the process Pro3.

Note that portions in this diagram corresponding to the robot in FIG. 24 are denoted with the same reference numerals, and accordingly, description thereof will be omitted.

Figure 39:
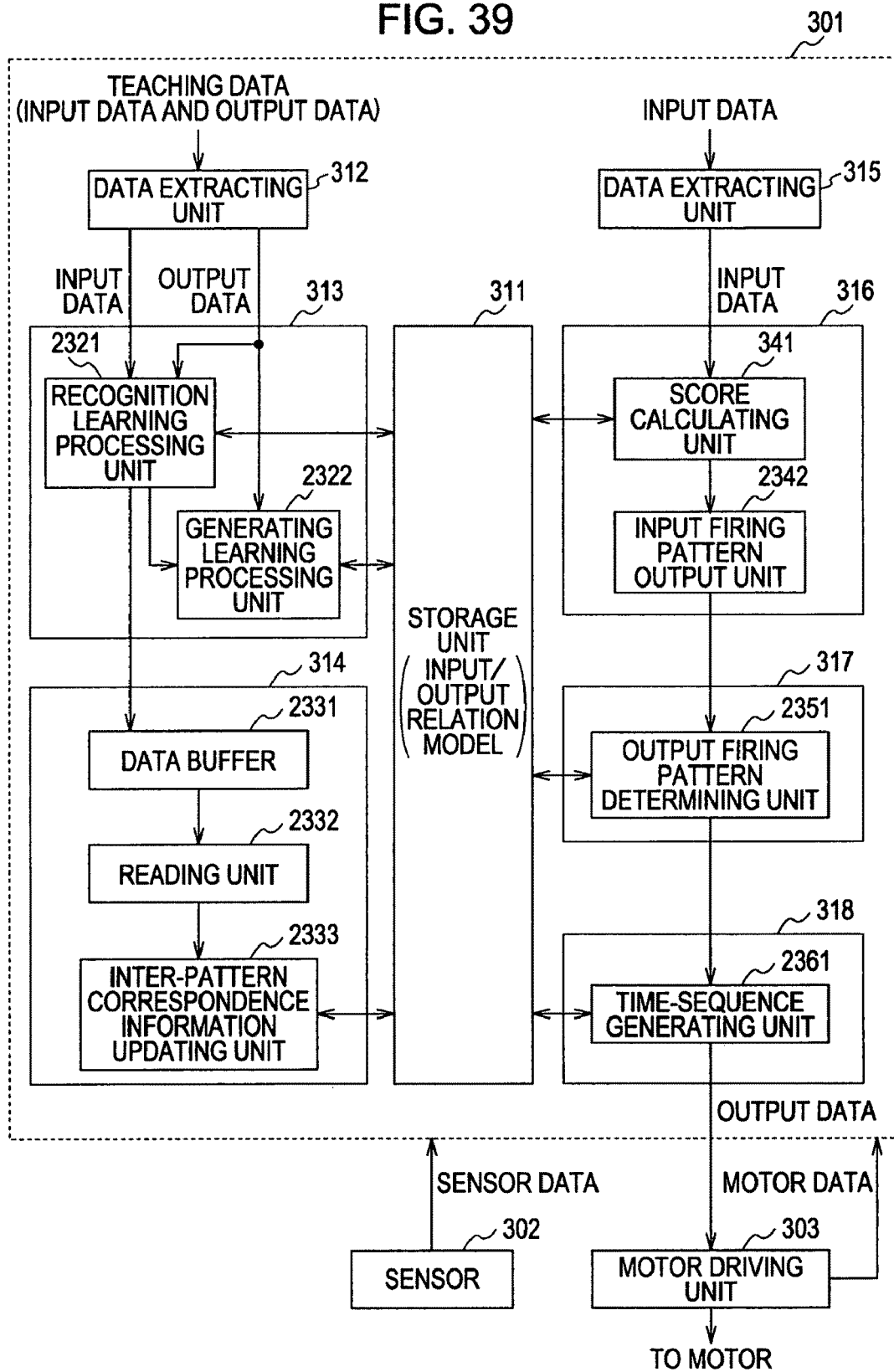
FIG. 39 is a block diagram for illustrating a third configuration example of a robot with application to the input/output relation model.

In FIG. 39, the learning processing unit 313 has provided therewithin a recognized learning processing unit 2321 and a generating learning processing unit 2322, instead of the recognized learning processing unit 321 in FIG. 24.

The input data and output data for each frame is supplied to the recognized learning processing unit 2321 from the data extracting unit 312.

As with the recognized learning processing unit 321 in FIG. 24, the recognized learning processing unit 2321 obtains a score as to the input data for each frame from the data extracting unit 312, regarding each node of the input network $net_{11}$ of the input/output relation model $M_{1112}$ which is stored in the storage unit 311, and the node with the best score from the nodes of the input network $net_{11}$ is determined to be the winning node (input winning node). Then the recognized learning processing unit 2321 updates the input network $net_{11}$ in a self-organizing manner, based on the input winning node as to the input data of the frame from the data extracting unit 312.

Also, the recognized learning processing unit 2321 supplies the (information showing the) input firing pattern serving as the distribution of the scores as to the input data for each frame of the input network $net_{11}$, to the data buffer 2331 of the picture learning unit 314 in a time-sequence manner.

Further, the recognized learning processing unit 2321 obtains the scores as to the output data for each frame, of each of the nodes of the output network $net_{12}$ in the input/output relation model $M_{1112}$ which is stored in the storage unit 311, from the data extracting unit 312, and the node with the best score from the nodes of the output network $net_{12}$ is determined to be the winning node (output winning node). Then the recognized learning processing unit 2321 updates the output network $net_{12}$ in a self-organizing manner, based on the output winning node as to the output data of the frame from the data extracting unit 312.

Also, the recognized learning processing unit 2321 supplies the (information showing the) output firing pattern serving as the distribution of the scores as to the output data for each frame of the output network $net_{12}$ to the generating learning processing unit 2322 and the data buffer 2331 of the picture learning unit 314 in a time-sequence manner.

The output firing pattern as to the output data for each frame is supplied from the recognition learning processing unit 2321 to the generating learning processing unit 2322, as well as the output data for each frame is also arranged to be supplied from the data extracting unit 312.

The generating learning processing unit 2322 learns the inter-time-sequence correspondence information which correlates the output data for each frame and the output firing pattern as to the output data for each frame, with the above-described SVR, for example, based on the output data for each frame from the data extracting unit 312 and the output firing pattern of the output data for each frame which is supplied from the recognized learning processing unit 2321, and stores this in the storage unit 311 as a portion of the input/output relation model $M_{1112}$.

The inter-time-sequence correspondence information learned in the generating learning processing unit 2322 may be information which correlates all of T sample values of the time T of the output data for a given frame F, and the output firing pattern as to this frame F, or the inter-time-sequence correspondence information may be information which correlates the sample values of a portion of the frame F output data, and the output firing pattern as to this frame F. With the time-sequence generating unit 2361 to be described later, the time-sequence data serving as estimation values of the output data formed from sample values only for the number of sample values correlated to the output firing pattern is generated as to the input data for one frame.

The picture learning unit 314 has a data buffer 2331, reading unit 2332, and inter-pattern correspondence information updating unit 2333 instead of the data buffer 331, reading unit 332, and weight updating unit 333 in FIG. 24 provided thereto.

The data buffer 2331 temporarily stores the input firing pattern and output firing pattern supplied from the recognized learning processing unit 2321 in a time-sequence manner.

The reading unit 2332 reads and correlates the input firing pattern as to the input data of the frame of interest within the input firing pattern stored in the data buffer 2331 wherein the input data frames are stored in order as frames of interest, and the output firing pattern as to the output data of (future) frames which are delayed by an amount equivalent to input/output time difference from the point-in-time of the frame of interest within the output firing pattern stored in the data buffer 2331, and supplies the pattern set which is a set of the correlated input firing pattern and output firing pattern to the inter-pattern correspondence information updating unit 2333.

The inter-pattern correspondence information updating unit 2333 learns the inter-pattern correspondence information which correlates the input firing pattern and output firing pattern, based on the input firing pattern of the pattern set from the reading unit 2332 and the output firing pattern from the same pattern set, with the above-described SVR, for example, and stores this in the storage unit 311 instead of the weight of the input/output relation model $M_{1112}$.

An input firing pattern output unit 2342, instead of the winning node determining unit 342 in FIG. 24, is provided on the recognition unit 316.

The scores for each node within the input network $net_{11}$ as to the input data for each frame is arranged to be supplied from the score calculating unit 341 to the input firing pattern output unit 2342. When the scores for each node within the input network $net_{11}$ as to the input data for a given frame F is supplied from the score calculating unit 341, the input firing pattern output unit 2342 configures and outputs the input firing pattern serving as the distribution of the scores thereof. The input firing pattern output by the input firing pattern output unit 2342 is supplied to the output firing pattern determining unit 2351 of the picture unit 317.

An output firing pattern determining unit 2351, instead of the generating node determining unit 351 in FIG. 24, is provided on the picture unit 317.

The output firing pattern determining unit 2351 determines the output firing pattern corresponding to the input firing pattern supplied from the input firing pattern output unit 2342, based on the inter-pattern correspondence information stored in the storage unit 311, and supplies this to the time-sequence generating unit 2361 of the generating unit 318.

In other words, the output firing pattern determining unit 2351 computes the function f( ) of the expression (6) wherein the input firing pattern as to the input data of the frame F supplied from the input firing pattern output unit 2342 serves as an argument, based on the parameters $s_j$, $\theta_j$, b which regulate the function f( ) in the expression (6) serving as the inter-pattern correspondence information stored in the storage unit 311, for example, thus predicting the output firing pattern as to the (estimation value of the) output data of a future frame by an amount equivalent to input/output time difference from the frame F, from the input firing pattern as to the input data of the frame F, and supplies this to the time-sequence generating unit 2361 of the generating unit 318.

A time-sequence generating unit 2361, instead of the time-sequence generating unit 361 in FIG. 24, is provided to the generating unit 318.

The time-sequence generating unit 2361 generates the time-sequence data corresponding to the output firing pattern supplied from the output firing pattern determining unit 2351 to serve as the (estimation value of the) output data, based on the inter-time-sequence correspondence information stored in the storage unit 311, and supplies this to the motor driving unit 303.

In other words, the time-sequence generating unit 2361 computes the function f( ) of the expression (6) wherein the output firing pattern as to the output data of the future frame by an amount equivalent to input/output time difference from the frame F, serving as an argument, which is predicted from the input firing pattern as to the input data of the frame F, supplied from the output firing pattern output unit 2351, based on the parameters $s_j$, $\theta_j$, b which regulate the function f( ) in the expression (6) serving as the inter-time-sequence correspondence information stored in the storage unit 311, for example, thus generating the time-sequence data serving as the estimation values of a portion or all of the output data of the future frame by an amount equivalent to input/output time difference from the frame F, and supplies this to the motor driving unit 303.

Next, learning processing which the robot shown in FIG. 39 performs, i.e., learning processing of the input/output relation model $M_{1112}$, will be described with reference to the flowchart in FIG. 40.

For example, in the event of causing a robot to perform a task of rolling a ball in front of itself to the left and right, the operator places the ball in front of the robot, holds the arm of the robot, and moves the arm such that the ball is rolled to the left and right.

In this case, the sensor 302 detects the state of the ball rolling to the left and right, and time-sequence sensor data representing that state is supplied to the data extracting unit 312 of the data processing device 301.

Also, at the motor driving unit 303, motor data corresponding to the movement of the arm which the operator is moving is generated, and supplied to the data extracting unit 312 of the data processing device 301.

With the data extracting unit 312, in step S421, the sensor data from the sensor 302 and the sensor motor data serving as time-sequence of a vector wherein the motor data from the motor driving unit 303 is a component thereof, serves as input data, and input data for each frame is extracted from the time-sequence of this input data and is supplied to the recognition learning processing unit 321 of the learning processing unit 313, and also output data for each frame is extracted from the time-sequence of the output data wherein sensor motor data serves as output data, and supplied to the recognition learning processing unit 2321 and the generating learning processing unit 2322, and the flow advances to step S422.

In step S422, the recognition learning processing unit 2321 uses the input data and output data in increments of frames from the data extracting unit 312 to perform self-organizing learning of the input network $net_{11}$ and output network $net_{12}$ of the input/output relation model $M_{1112}$ (FIG. 25) stored in the storage unit 311.

That is to say, in step S422, the processing of steps $S422_1$ and $S422_2$ is performed.

In step $S422_1$, the recognition learning processing unit 2321 obtains a score regarding input data in increments of frames from the data extracting unit 312, regarding each node of the input network $net_{11}$ in the input/output relation model $M_{1112}$ stored in the storage unit 311, and of the nodes of the input network $net_{11}$, determines the node with the best score to be the input winning node. Further, the recognition learning unit 2321 updates the input network $net_{11}$ in a self-organizing manner based on the input winning node as to the input data in increments of frames from the data extracting unit 312, and supplies an input firing pattern serving as the distribution of scores as to the input data in increments of frame of the input network net$_{11}$ to the data buffer 2331.

In step S422$_2$, the recognition learning processing unit 2321 obtains a score regarding output data in increments of frames from the data extracting unit 312, regarding each node of the output network net$_{12}$ in the input/output relation model M$_{1112}$ stored in the storage unit 311, and of the nodes of the output network net$_{12}$, determines the node with the best score to be the output winning node. Further, the recognition learning unit 2321 updates the output network net$_{12}$ in a self-organizing manner based on the output winning node as to the output data in increments of frames from the data extracting unit 312, and supplies an output firing pattern serving as the distribution of scores as to the output data in increments of frames, to the generating learning processing unit 2322 and the picture learning unit 314.

Following the processing in step S422, the flow advances to step S423, wherein the generating learning processing unit 2322 learns the inter-time-sequence correspondence information which correlates the output data of the frame of interest and the output firing pattern as to the output data of this frame of interest, based on the output data of a frame of interest wherein the frame of the output data supplied from the data extracting unit 312 serves as the frame of interest, and the output firing pattern as to the output data of this frame of interest, which is supplied from the recognition learning processing unit 2321, and stores this in the storage unit 311, and the flow advances to step S424.

In step S424, the picture learning unit 314 correlates the input firing pattern as to the input data of the frame of interest from the recognition learning processing unit 2321 and the output firing pattern as to the output data of a future frame by an amount equivalent to input/output time difference from the frame of interest, also from the recognition learning processing unit 2321, wherein a frame of the input data not yet serving as a frame of interest now serves as a frame of interest.

That is to say, in step S424, with the data buffer 2331 of the picture learning unit 314, the input firing pattern as to the input data for each frame from the recognition learning processing unit 2321 and the output firing pattern as to the output data for each frame are temporarily stored.

Further, in step S424, the reading unit 2332 of the picture learning unit 314 reads the input firing pattern as to the input data of the frame of interest within the input firing pattern stored in the data buffer 2331, and the output firing pattern as to the output data of a future frame by an amount equivalent to input/output time difference from the point-in-time of the frame of interest within the output firing pattern stored in the data buffer 2331, and supplies the pattern set which is the set of this input firing pattern and output firing pattern to the inter-pattern correspondence information updating unit 2333.

Then the flow advances from step S424 to step S425, wherein the inter-pattern correspondence information updating unit 2333 of the picture learning unit 314 learns the inter-pattern correspondence information, based on the pattern set supplied from the reading unit 2332, and stores this in the storage unit 311.

Figure 40:
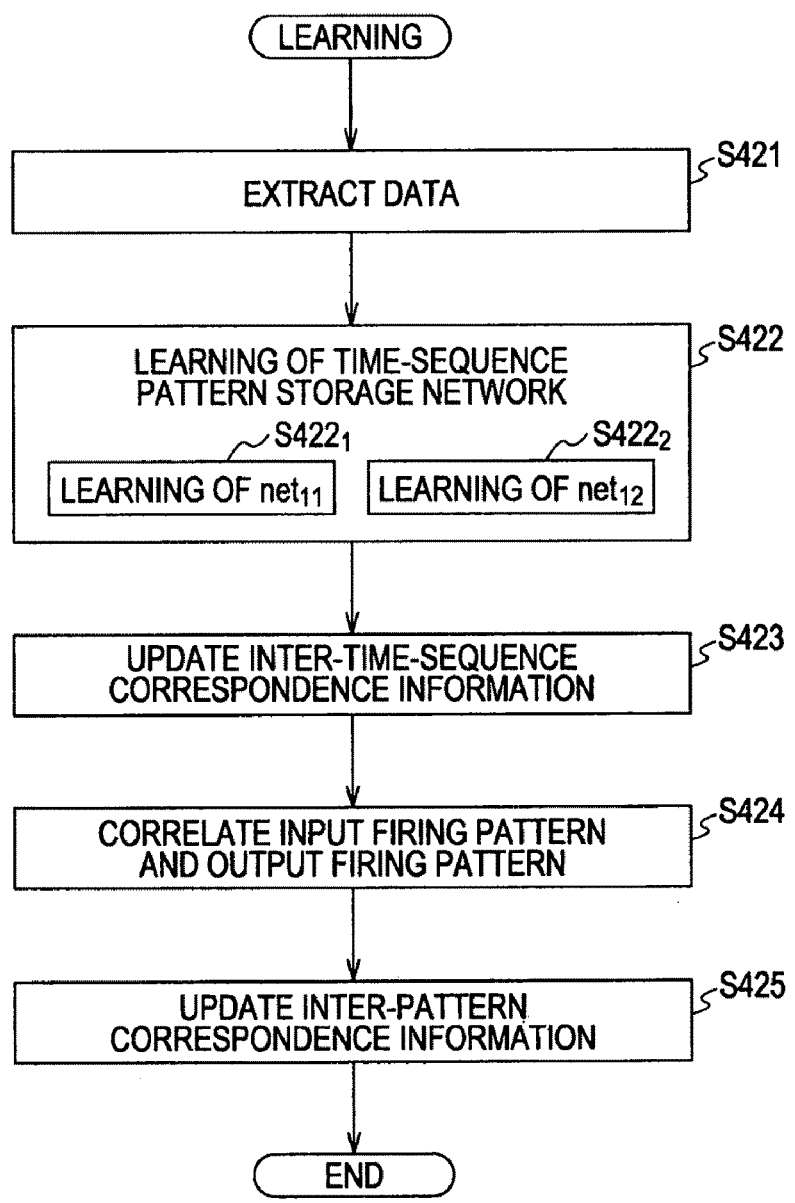
FIG. 40 is a flowchart for describing learning of the input/output relation model $M_{1112}$.

Note that the learning processing shown in FIG. 40 may be performed with the leading frame through the end frame being sequentially taken as the frame of interest and the processing of steps S422 through 425 being repeated, or may be performed with the leading frame through the end frame being sequentially taken as the frame of interest and the processing of steps 422 and 423 being repeatedly performed, following which the leading frame through the end frame are once more sequentially taken as the frame of interest and the processing of steps S424 and S425 is repeatedly performed.

Figure 41:
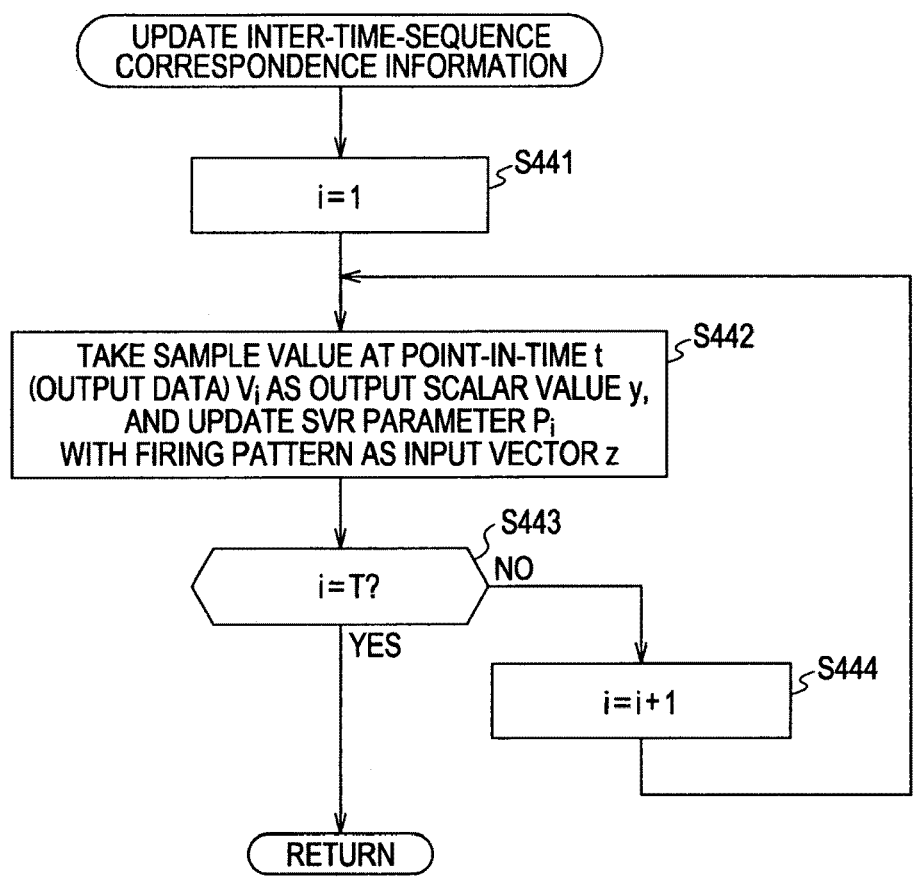
FIG. 41 is a flowchart for describing learning processing of the inter-time-sequence correspondence information.

Next, the processing in step S423 in FIG. 40 in the case of learning (updating) inter-time-sequence correspondence information with SVR will be further described, with reference to the flowchart in FIG. 41.

Note that here, the inter-time-sequence correspondence information, which correlates the sample values of all of the output data of the frames of interest supplied from the data extracting unit 312 to the generating learning processing unit 2322, and the output firing pattern as to the output data of the frames of interest supplied from the recognition learning processing unit 2321, is to be learned.

In step S441, the generating learning processing unit 2322 initializes the variable i to a 1, which counts the number of sample values from the start of the output data of the frames of interest supplied from the data extracting unit 312, and the flow advances to step S442.

In step S442, the generating learning processing unit 2322 takes the sample value v$_i$ of the i'th frame of interest as an output scalar value y serving as a learning sample, with regard to a function f$_i$( ) serving as the function f( ) of the expression (6) corresponding to the i'th (wherein i=1, 2, and so on through T) sample value v$_i$ from the beginning of the frames, and also learns (updates) the parameters s$_j$, θ$_j$, and b (hereafter called parameter P$_6$ as appropriate), which regulate the function f$_i$( ) wherein the vectors corresponding to the output firing pattern as to the output data of the frames of interest, i.e., the vectors, wherein the scores of each node within the output network net$_{12}$ as to the output data of the frames of interest are components therewithin, are set as the input vector z serving as a learning sample, and the flow advances to step S443.

In step S443, the generating learning processing unit 2322 determines whether or not the variable i is equal to the frame length T. In step S443, if the variable i is determined not to be equal to the frame length T, the flow advances to step S444, and the generating learning processing unit 2322 increases the variable i by just 1, and the flow returns to step S442 and the same processing is repeated.

Also, in step S443, if the variable i is determined to be equal to the frame length T, i.e. in the case that the SVR parameter P$_i$ is to be obtained for all T sample points for the frame, the generating learning processing unit 2322 stores the SVR parameter P$_i$ as inter-time-sequence correspondence information in the storage unit 311, and returns to the flow.

Figure 42:
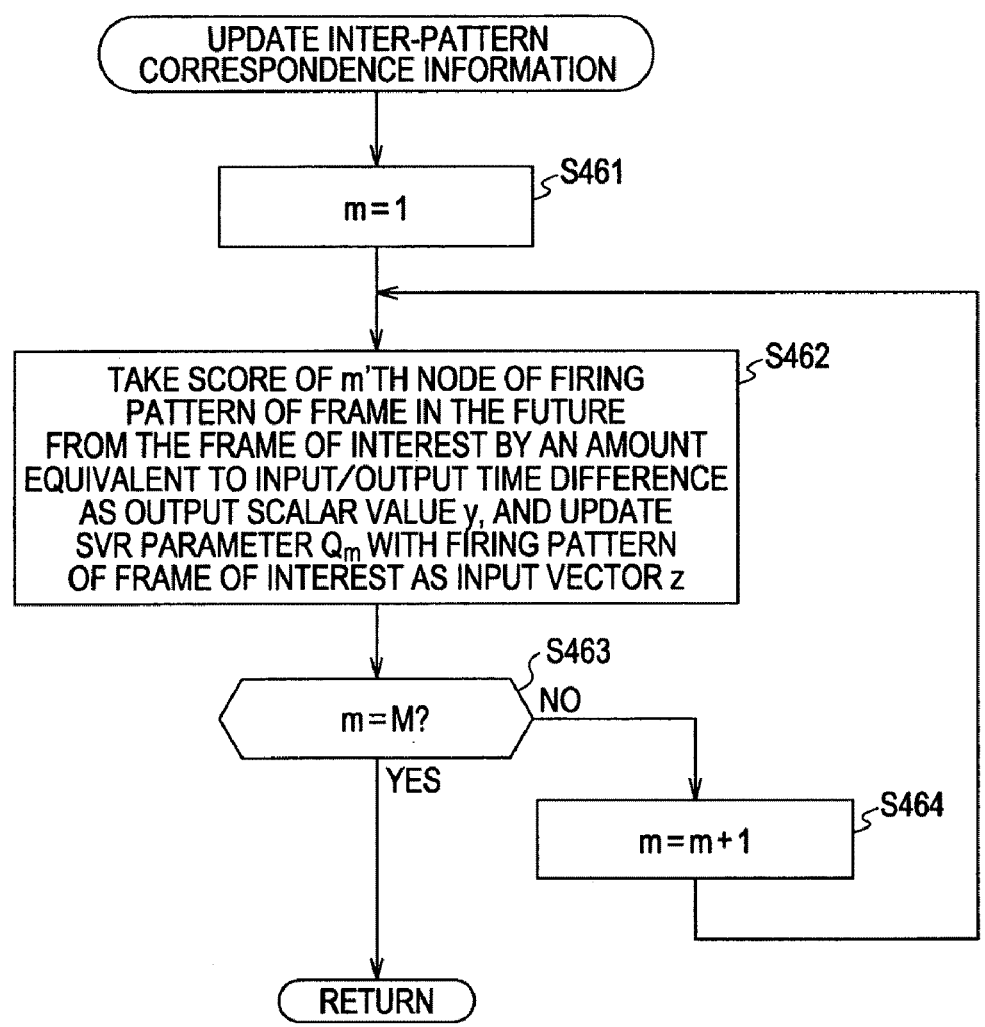
FIG. 42 is a flowchart for describing the learning processing of the inter-pattern correspondence information.

Next, the processing in step S425 in FIG. 40, in the case of performing learning (updating) of the inter-pattern correspondence information, using SVR, will be further described with reference to the flowchart in FIG. 42.

In step S461, if the inter-pattern correspondence information updating unit 2333 takes the output firing pattern of the pattern set supplied from the reading unit 2332, i.e., the frame having input data as the frame of interest, then the variable m, which counts the number of scores of the nodes within the output network net$_{12}$ which configures the output firing pattern as to the output data of the future frame by an amount equivalent to input/output time difference from the frame of interest, is initialized to 1, and the flow advances to step S462.

In step S462, the inter-pattern correspondence information updating unit 2333 takes the mth (i=1, 2, . . . , M) score u$_m$ of the output firing pattern as to the output data of a future frame by an amount equivalent to input/output time difference from the frame of interest, as an output scalar value y serving as a learning sample, with regard to a function f$_m$( ) serving as the function f( ) of the expression (6) corresponding to the mth (i=1, 2, ..., M) score $u_m$ of the output firing pattern, and also learns (updates) the parameters $s_j$, $\theta_j$, b (hereafter called SVR parameter $Q_m$) as appropriate) which regulate the function $f_m(\ )$ wherein the vectors corresponding to the input firing pattern as to the input data of the frames of interest, i.e., the vectors, wherein the scores of each node within the input network $net_{11}$ as to the input data of the frames of interest are components therewithin, are set as the input vector z serving as a learning sample, and the flow advances to step S463.

In step S463, the inter-pattern correspondence information updating unit 2333 determines whether or not the variable m is equal to the number M of the nodes within the output network $net_{12}$. In step S463, if the variable m is determined not to be equal to the number M of the nodes, the flow advances to step S464, and the inter-pattern correspondence information updating unit 2333 increases the variable m by just 1, and the flow returns to step S462 and the same processing is repeated thereafter.

Also, in step S463, if the variable m is determined to be equal to the number M of the nodes, i.e. in the case that the SVR parameter $Q_m$ is to be obtained for all nodes within the output network $net_{12}$, the inter-pattern correspondence information updating unit 2333 stores the SVR parameter $Q_m$ as inter-pattern correspondence information in the storage unit 311, and returns to the flow.

Next, description will be made regarding processing of perceptive actions of the robot shown in FIG. 39, i.e., the generating processing (recognition generating processing) of time-sequence data using the input/output relation model $M_{1112}$, with reference to the flowchart in FIG. 43.

In a case wherein a robot has learned to perform the task of rolling a ball placed in front of it to the left and right, as described with reference to FIG. 40 for example, upon a ball being placed before the robot (and rolled if necessary), the state of the ball is detected at the sensor 302, and time-sequence sensor data representing that state is supplied to the data extracting unit 315 of the data processing device 301.

Further, motor data is also supplied from the motor driving unit 303 to the data extracting unit 315 of the data processing device 301.

The data extracting unit 315 extracts input data for each frame from the time-sequence of the input data, such input data being sensor motor data serving as time-sequence of the vector wherein the sensor data from the sensor 302 and the motor data from the motor driving unit 303 are components therewithin, and supplies this to the score calculating unit 341 of the recognition unit 316, and the flow advances to step S482.

In step S482, at the recognizing unit 316, the score calculating unit 341 sequentially takes input data in increments of frames from the data extracting unit 315 as input data of a frame of interest, calculates the score of each node of the input network $net_{11}$ making up the input/output relation model $M_{1112}$ stored in the storage unit 311 as to the input data of the frame of interest, and supplies this to the input firing pattern output unit 2342.

Further, in step S482, the input firing pattern output unit 2342 uses the scores for each node within the input network $net_{11}$ as to the input data for the frame of interest from the score calculating unit 341, configures the input firing pattern serving as the score distribution thereof, supplies this to an output firing pattern determining unit 2351, and the flow advances to step S483.

In step S483, the output firing pattern determining unit 2351 computes the function $f(\ )$ of the expression (6) wherein the input firing pattern as to the input data of the frame of interest supplied from the input firing pattern output unit 2342 serves as an argument z, based on the SVR parameter $Q_m$, which regulates the function $f(\ )$ in the expression (6) serving as the inter-pattern correspondence information stored in the storage unit 311, thus predicting the output firing pattern as to the (estimation value of the) output data of a future frame by an amount equivalent to input/output time difference from the frame of interest thereof, from the input firing pattern as to the input data of the frame of interest, and supplies this to the time-sequence generating unit 2361 of the generating unit 318, and the flow advances to step S484.

In step S484, the time-sequence generating unit 2361 computes the function $f(\ )$ of the expression (6) wherein the output firing pattern from the output firing pattern output unit 2351 serves as an argument z, based on the SVR parameter $P_i$, which regulates the function $f(\ )$ in the expression (6) serving as the inter-time-sequence correspondence information stored in the storage unit 311, thus generating and outputting time-sequence data which is estimation values of the output data of a future frame by an amount equivalent to input/output time difference from the frame of interest.

This time-sequence data is sensor motor data, and the motor data within this sensor motor data is supplied to the motor driving unit 303 from the time-sequence generating unit 2361, whereby the motor driving unit 303 drives the motor according to the motor data from the time-sequence generating unit 2361, and thus the robot arm is moved.

Subsequently, the processing of steps S482 through S484 is performed regarding the input data in increments of frames that is supplied from the data extracting unit 315 to the recognizing unit 316.

Note that as described above, using a firing pattern as the internal expression of the input data, and generating time-sequence data (output data) from the firing pattern (output firing pattern), are applicable to the data processing device in FIG. 9.

Also, as described above, using a firing pattern as the internal expression of the input data and output data, predicting the output firing pattern from the input firing pattern, and generating output data from the predicted output firing pattern, are also applicable to the data processing device in FIG. 20.

Further, using a firing pattern as the internal expression of the input data and output data, predicting the output firing pattern from the input firing pattern, and generating output data from the predicted output firing pattern, can be performed on the nodes with not only a time-sequence pattern storage network, but also a SOM having a weight vector of the same dimension as the vector serving as the input data, rather than the time-sequence pattern model 21.

Incidentally, when time-sequence data for each frame is extracted from the time-sequence data such as the input data or output data, and the time-sequence data for each such frame is used for SOM learning such as with the time-sequence pattern storage network, the nodes expressing time-sequence patterns similar to one another are disposed in locations close to one another.

Accordingly, with the time-sequence data, in the case that the time-sequence pattern PF of the time-sequence data for a given frame F and the time-sequence pattern PF' of the time-sequence data for a frame F' which is close time-wise to the frame F are not similar to one another, even if the frames F and F' are close time-wise, the node expressing the time-sequence pattern PF of the time-sequence data for the frame F and the node expressing the time-sequence pattern PF' of the time-sequence data for the frame F' are not disposed in locations close to one another.

In other words, for example, if a concave-shaped time-sequence pattern and a convex-shaped time-sequence pattern extract the time-sequence data for each frame having a shorter cycle than the sine wave which is repeated with a relatively short cycle, and the time-sequence data for each frame is used to learn the time-sequence pattern storage network, then even if the time-sequence data of the frame of the concave-shaped time-sequence pattern and the time-sequence data of the frame of the convex-shaped time-sequence pattern are close to one another time-wise, the concave-shaped time-sequence pattern and the convex-shaped time-sequence pattern are not similar to one another, and therefore the nodes expressing the concave-shaped time-sequence pattern and the nodes expressing the convex-shaped time-sequence pattern are disposed in distant locations (in positions separated from one another).

Figure 44:
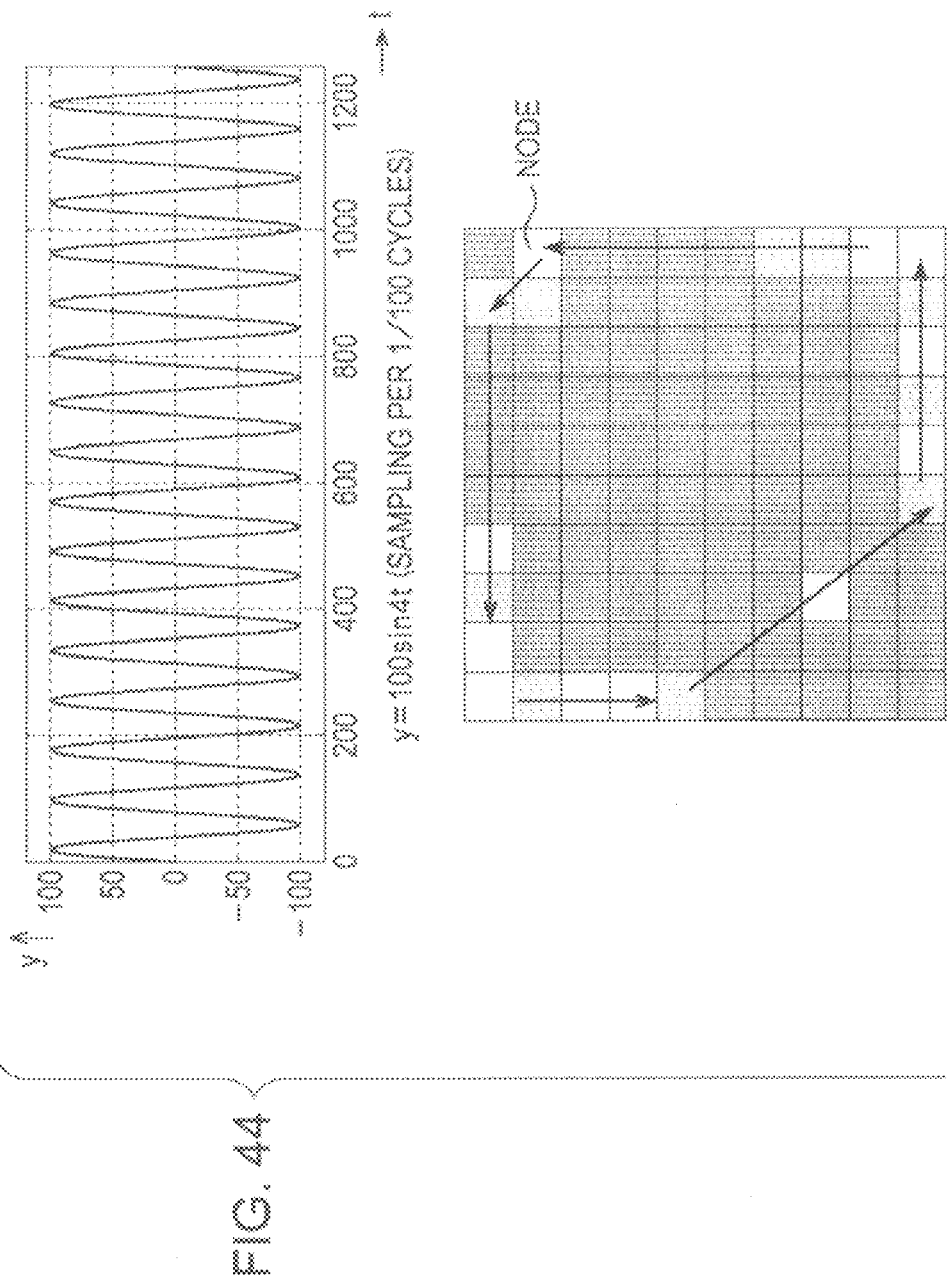
FIG. 44 is a diagram illustrating a path of the winning node.

Here, FIG. 44 illustrates the experiment results of an experiment obtaining the path of nodes to become winning nodes when the convex-shaped time-sequence pattern and convex-shaped time-sequence pattern provide the time sequence pattern storage network with the time-sequence data for each frame which is extracted from the sine wave repeated at a relatively short cycle, as input data for each frame.

Note that in this experiment, a time-sequence pattern storage network having a grid of 10 vertical×10 horizontal nodes is used as the time-sequence pattern storage network, wherein the nodes are provided with links so as to have an array configuration of a two-dimensional array as shown in FIG. 8.

Also, in this experiment, as shown in the upper portion of FIG. 44, time-sequence data is used wherein the convex-shaped time-sequence pattern and convex-shaped time-sequence pattern are repeated at a relatively short cycle, such time-sequence data being obtainable through sampling of the sine wave which is expressed with the expression $y=100 \sin(4t)$. With the sampling, a sample value of 314 points has been obtained in one cycle of the sine wave, i.e. a segment of $2\pi$ (wherein sampling is performed for every 0.01).

Further, learning of the time-sequence pattern storage network has been performed by extracting a sample value of 40 continuous sample points from the time-sequence data of a sine wave obtained by such sampling as described above, while shifting the sample values by 10 sample points each, and setting the sample values of the 40 sample points as the input data for each frame.

The lower portion of FIG. 44 shows the path of the winning node (white portion) which is obtained by providing input data for each frame to the time-sequence pattern storage network after learning.

As shown in the lower portion of FIG. 44, the winning node as to the input data of the next frame following one given frame may become a node separated greatly from the winning node as to the input data of the one given frame.

Thus, in the case that the winning node $N_{F1}$ as to the input data of a given frame $F_1$ and the winning node $N_{F2}$ as to the input data of the next frame $F_2$ following the given frame $F_1$, the firing pattern (input firing pattern) as to the input data of the frame $F_1$ and the firing pattern as to the input data of the frame $F_2$ become widely differing firing patterns which have no so-called temporal continuity.

As described above, in the case of performing learning of the inter-pattern correspondence information or the time-sequence correlating information with an approximation function such as SVR, if the firing pattern to become the input vector z serving as the learning sample for use in learning has no temporal continuity, the precision of approximation deteriorates, and consequently the prediction precision for predicting output firing patterns from the input firing patterns or the precision of the time-sequence data when generating the time-sequence data serving as output data from the predicted output firing pattern deteriorates.

Thus, following determining the winning node $NF_1$ as to the input data of a given frame $F_1$, the determining of the winning node $NF_2$ as to the input data of the next frame $F_2$ following the frame $F_1$ can be performed only for the nodes wherein the distance from the winding node $NF_1$ as to the input data of the frame $F_1$ is within a predetermined distance (distance-restricted node), as described above. Thus, the prediction precision when predicting the output firing pattern from the input firing pattern, or the precision of time-sequence data when generating the time-sequence data serving as the output data from the predicted output firing pattern, can be prevented from deteriorating. Note that for the above description, the same can be said for output data.

Figure 45:
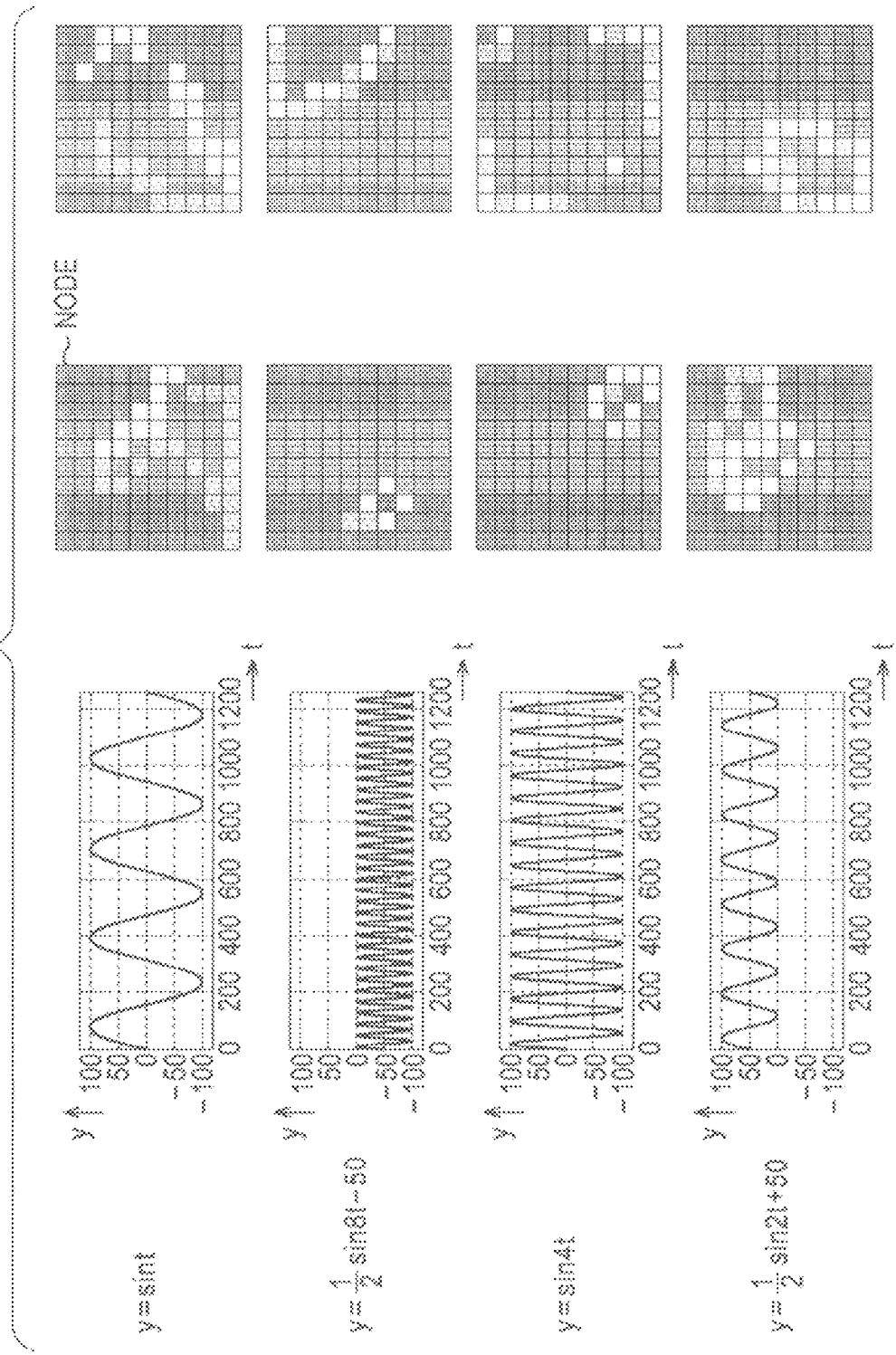
FIG. 45 is a diagram illustrating a path of the winning node.

FIG. 45 shows the path of the winning node when using four types of sine waves as time-sequence data to determine the winning node, in the case of subjecting only the distance-restricted nodes out of the time-sequence pattern storage network nodes, and in the case of subjecting all of the nodes therein.

Note that in FIG. 45, the time-sequence pattern storage network configured with the same 10×10 nodes as described in FIG. 44 is used, and for distance-restricted nodes, the nodes wherein the distance from the winning node as to the time-sequence data of the immediately preceding frame is within 1, i.e. the winning node as to the time-sequence data of the immediately preceding frame and the 8 nodes adjacent to the winning node are used.

The first pattern from the left in FIG. 45 shows four sine waves serving as time-sequence data. The first pattern from the top is a sine wave expressed with the expression $y=100 \sin(t)$, and the second from the top is a sine wave expressed with the expression $y=50 \sin(8t)-50$. Also, the third pattern from the top is a sine wave expressed with the expression $y=100 \sin(4t)$, and the fourth from the top (the first from the bottom) is a sine wave expressed with the expression $y=50 \sin(2t)+50$.

The second pattern from the left in FIG. 45 shows the path of the winning node in the case that for each of the four types of sine waves, only the distance-restricted nodes of the nodes in the time-sequence pattern storage network are subjected to determining of the winning node.

The third pattern from the left (first from the right) in FIG. 45 shows the path of the winning node in the case that for each of the four types of sine waves, all of the nodes in the time-sequence pattern storage network are subjected to determining of the winning node.

In the case of subjecting only the distance-restricted nodes of the nodes in the time-sequence pattern storage network to determining of the winning node, compared to the case wherein all nodes are subjected to the determining, FIG. 45 shows that the winning nodes collect locally and a time-sequence pattern of a given time-sequence data (time-sequence data prior to the time-sequence data for each frame) is learnt (captured) with the localized nodes.

Note that according to FIG. 45, the time-sequence data can be distinguished by the path of the winning node as to the time-sequence data for each frame is extracted from the time-sequence data.

As described above, FIG. 46 illustrates a configuration example of a robot which subjects only the distance-restricted nodes out of the time-sequence pattern storage network nodes to determining of the winning node, and uses a firing pattern as an internal expression of the input data and output data, and predicts the output firing pattern from the input firing pattern, as well as generates output data from an output firing pattern.

Note that portions which correspond to parts of the robot shown in FIG. 24 or 39 are denoted with the same reference numerals, and description thereof will be omitted as appropriate in the following.

In FIG. 46, a recognition learning processing unit 3321, instead of the recognition learning processing unit 2321 in FIG. 39, is provided on the learning processing unit 313.

Input data and output data for each frame is supplied from the data extracting unit 312 to the recognition learning processing unit 3321.

The recognition learning processing unit 3321 performs processing similar to that of the recognition learning processing unit 2321 in FIG. 39. However, the recognition learning processing unit 2321 in FIG. 39 determines the node with the best score as to the input data for each frame from the data extracting unit 312 out of the nodes in the input network $net_{11}$ to be the input winning node, and also determines the node with the best score as to the output data for each frame from the data extracting unit 312 out of the nodes in the output network $net_{12}$ to be the output winning node, whereas the recognition learning processing unit 3321 determines the node with the best score as to the input data for each frame from the distance-restricted nodes to be the input winning node, and also determines the node with the best score as to the output data for each frame as the output winning node.

Next, learning processing which the robot shown in FIG. 46 performs, i.e., learning processing of the input/output relation model $M_{1112}$, will be described with reference to the flowchart in FIG. 47.

For example, in the event of causing a robot to perform a task of rolling a ball in front of itself to the left and right, the operator places the ball in front of the robot, holds the arm of the robot, and moves the arm such that the ball is rolled to the left and right.

In this case, the sensor 302 detects the state of the ball rolling to the left and right, and time-sequence sensor data representing that state is supplied to the data extracting unit 312 of the data processing device 301.

Also, at the motor driving unit 303, motor data corresponding to the movement of the arm which the operator is moving is generated, and supplied to the data extracting unit 312 of the data processing device 301.

With the data extracting unit 312, in step S501, the sensor data from the sensor 302 and the sensor motor data serving as time-sequence of a vector wherein the motor data from the motor driving unit 303 is a component thereof, serves as input data, and input data for each frame is extracted from the time-sequence of this input data and is supplied to the recognition learning processing unit 321 of the learning processing unit 313, and also output data for each frame is extracted from the time-sequence of the output data wherein sensor motor data serves as output data, and supplied to the recognition learning processing unit 2321 and the generating learning processing unit 2322, and the flow advances to step S502.

In step S502, the recognition learning processing unit 3321 uses the input data and output data in increments of frames from the data extracting unit 312 to perform self-organizing learning of the input network $net_{11}$ and output network $net_2$ of the input/output relation model $M_{1112}$ (FIG. 25) stored in the storage unit 311.

That is to say, in step S502, the processing of steps $S502_1$, and $S502_2$ is performed.

In step $S502_1$, the recognition learning processing unit 3321 obtains a score regarding input data in increments of frames from the data extracting unit 312, regarding the nodes of the input network $net_{11}$ in the input/output relation model $M_{1112}$ stored in the storage unit 311, and of the distance-restriction nodes of the input network $net_{11}$, determines the node with the best score to be the input winning node. Further, the recognition learning processing unit 3321 updates the input network $net_{11}$ in a self-organizing manner, based on the input winning node as to the input data for each frame from the data extracting unit 312, and supplies the input firing pattern serving as the score distribution as to the input data for each frame of the input network $net_{11}$ to the data buffer 2331.

In step $S502_2$, the recognition learning processing unit 3321 obtains a score regarding output data in increments of frames from the data extracting unit 312, regarding the nodes of the output network $net_{12}$ in the input/output relation model $M_{1112}$ stored in the storage unit 311, and of the distance-restriction nodes of the output network $net_{12}$, determines the node with the best score to be the output winning node. Further, the recognition learning processing unit 3321 updates the output network $net_{12}$ in a self-organizing manner, based on the output winning node as to the output data for each frame from the data extracting unit 312, and supplies the output firing pattern serving as the score distribution as to the output data for each frame of the output network $net_{12}$ to the generating learning processing unit 2322 and the picture learning unit 314.

Following the processing in step S502, the flow advances to steps S503, S504, and S505 sequentially, and the processing the same as that in the steps S423, S424, and S425 in FIG. 40 are performed, respectively.

Figure 43:
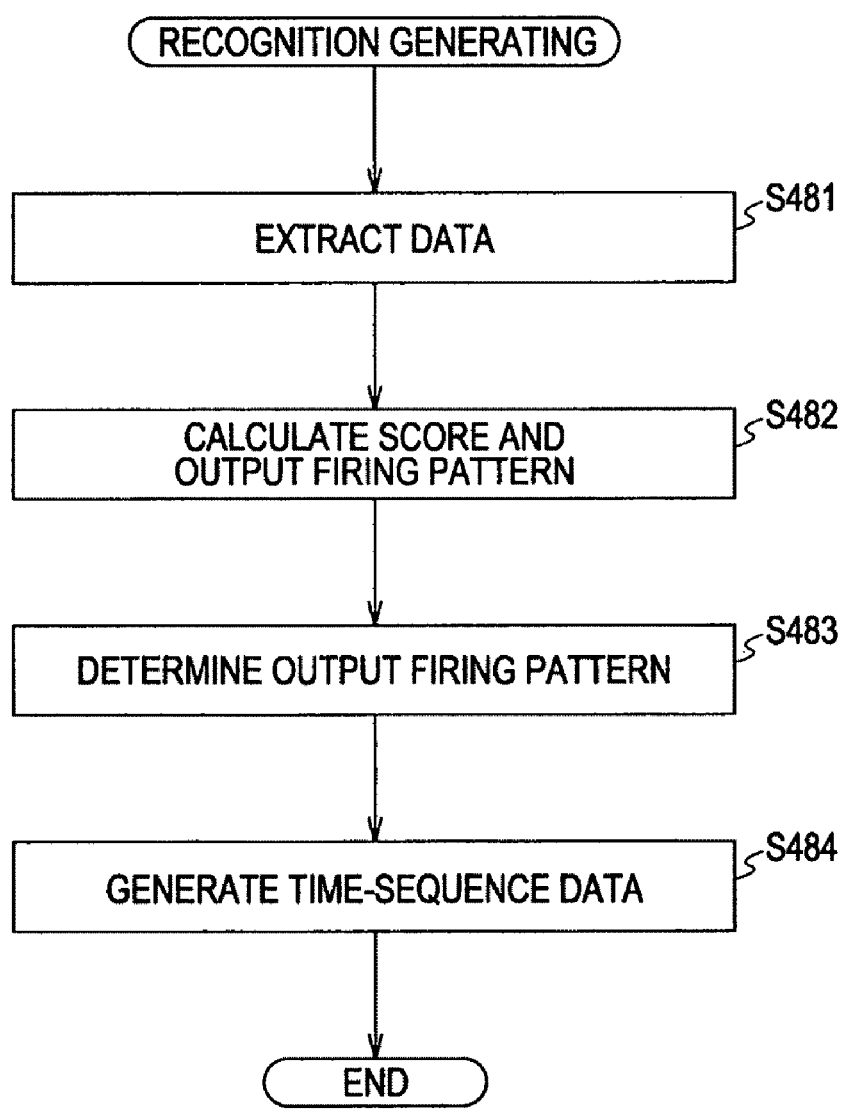
FIG. 43 is a flowchart for describing recognition generating processing of generating time-sequence data, using the input/output relation model $M_{1112}$.

Note that the processing of the perceptive actions performed by the robot in FIG. 46, i.e. the generating processing of the time-sequence data using the input/output relation model $M_{111}$ (the recognition generating processing) is the same processing of the perceptive actions performed by the robot in FIG. 39, which is described in FIG. 43, and so the description thereof will be omitted.

Next, the experiment results of the experiment performed using the robot in FIG. 46 will be described with reference to FIGS. 48 and 49.

FIG. 48 illustrates the experiment results of the experiment wherein the output firing pattern is predicted from the input firing pattern.

Note that in FIG. 48, the various location on an x-y plane show the node locations of the time-sequence pattern storage network, and the z-axis shows the scores of each node.

With this experiment, learning is performed for the input/output relation model $M_{1112}$ having the time-sequence pattern storage network serving as the input network $net_{11}$ and output network $net_{12}$ described in FIG. 44, wherein the time-sequence data expressed with the expression y=100 sin(x) is used as the sensor motor data serving as the input data and output data, to extract the input data and output data for each frame from the time-sequence data thereof, and using the input data and output data for each frame thereof.

The first pattern from the left in FIG. 48 shows an input firing pattern as to the input data of the frame at a given point-in-time t, out of the input data for each frame which is used for learning of the input/output relation model $M_{1112}$.

The second pattern from the left in FIG. 48 shows an output firing pattern as to the (estimation value of the) output data for a frame at future point-in-time t+1, which is predicted from the input firing pattern as to the input data of the frame at point-in-time t, which is shown in the first pattern from the left in FIG. 48.

The third pattern from the left (first from the right) in FIG. 48 shows an actual output firing pattern as to the output data of the frame at point-in-time t+1, out of the output data for each frame which is used for learning of the input/output relation model $M_{1112}$.

By comparing the patterns at the second from the left and the third from the left in FIG. 48, it is clear that the output firing pattern as to the (estimation value) of the output data at the future point-in-time t+1 can be precisely predicted from the input firing pattern as to the input data of the frame at point-in-time t.

Figure 49:
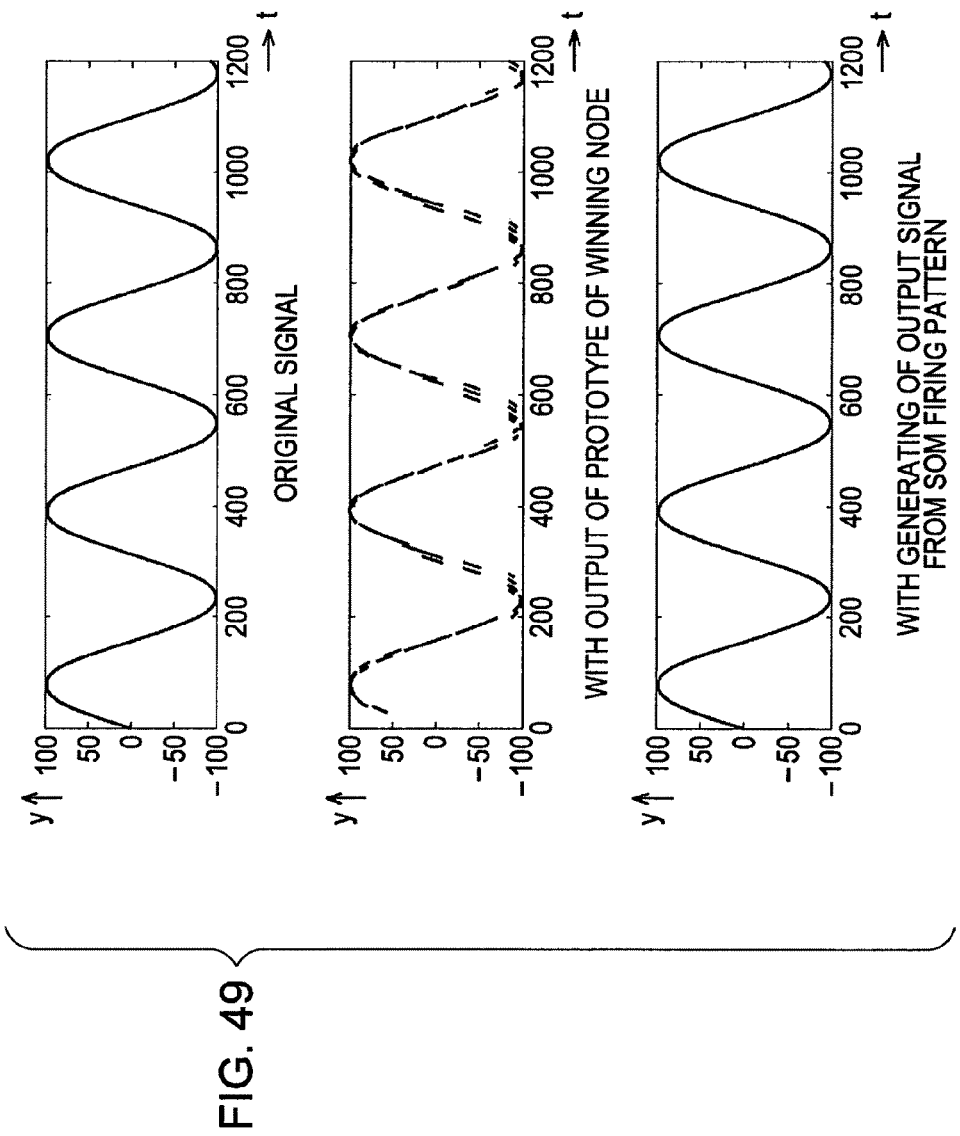
FIG. 49 is a diagram illustrating experiment results of an experiment generating (more particularly, estimation values of) output data from an output firing pattern.

FIG. 49 illustrates the experiment results of the experiment wherein the (estimation value of the) output data is generated from the output firing pattern.

With this experiment, learning is performed for the input/output relation model $M_{1112}$ having the time-sequence pattern storage network serving as the input network $net_{11}$ and output network $net_{12}$ described in FIG. 44, wherein the time-sequence data of the four sine waves shown in FIG. 45 is used as the sensor motor data serving as the input data and output data, to extract the input data and output data for each frame from the time-sequence data thereof, and using the input data and output data for each frame thereof.

Also, with this experiment, the time-sequence data for each frame is extracted from the time-sequence data expressed with the expression y=100 sin(x), the scores for each node of the output network net12 as to the time-sequence data for each frame thereof are obtained, and with the winning node obtained based on the scores thereof as the generating node, the time-sequence data is generated using this generating node, and also the time-sequence data is generated using the firing pattern obtained based on the scores.

The first pattern from the top in FIG. 49 shows time-sequence data expressed with the expression y=100 sin(x), which is used for obtaining the scores.

The second pattern from the top in FIG. 49 illustrates the time-sequence data generated using the generating nodes.

The third pattern from the top (first from the bottom) in FIG. 49 illustrates the time-sequence data generated using a firing pattern.

It is clear in FIG. 49 that compared to the situation wherein the generating nodes are used, the situation wherein the firing pattern is used can obtain smoother time-series data.

Next, with the robot in FIG. 46, learning of the input/output relation model $M_{1112}$ is performed as described in FIG. 47, and this learning can be largely divided into learning of the input network $net_{11}$ and output network $net_{12}$ included in the input/output relation model $M_{1112}$ (step S502), learning of the inter-time-sequence correspondence relation (step S503), and learning of the inter-pattern correspondence relation (step S505).

The learning of the input network $net_{11}$ and output network $net_{12}$, the learning of the inter-time-sequence correspondence relation, and the learning of the inter-pattern correspondence relation all can be performed with batch learning or online learning, and accordingly, the learning of the input/output relation model $M_{1112}$ can also be performed with batch learning or online learning.

Figure 50:
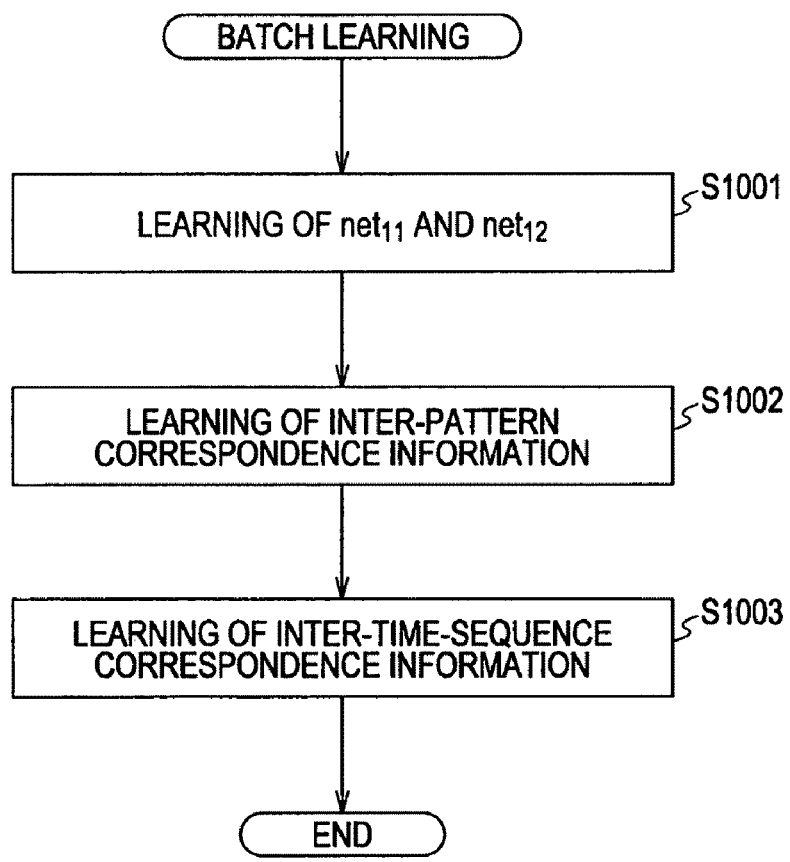
FIG. 50 is a flowchart for describing batch learning of the input/output relation model $M_{1112}$.

Now, a case of performing learning of the input/output relation model $M_{1112}$ with batch learning will be described with reference to the flowchart in FIG. 50.

In the case of performing learning of the input/output relation model $M_{1112}$ with batch learning, multiple sensor motor data is prepared in advance, which is used for the learning of the input/output relation model $M_{1112}$.

Then in step S1001, learning of the input network $net_{11}$ and output network $net_{12}$ is performed, using all of the multiple sensor motor data prepared in advance.

Next, in step S1002, learning of the inter-pattern correspondence relation is performed, again using all of the multiple sensor motor data prepared in advance.

Lastly, in step S1003, learning of the inter-time-sequence correspondence relation is performed, again using all of the multiple sensor motor data prepared in advance.

Figure 51:
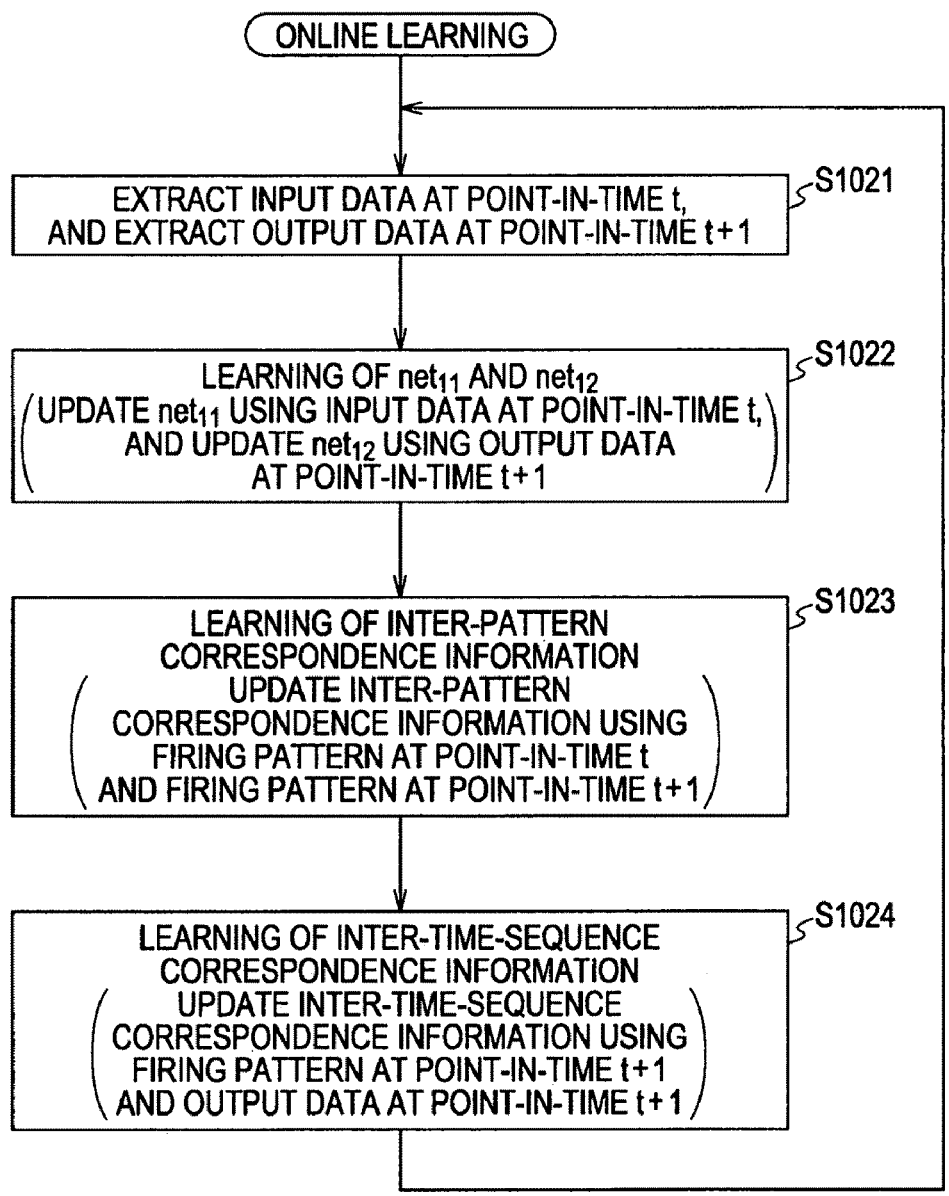
FIG. 51 is a flowchart for describing online learning of the input/output relation model $M_{1112}$.

Next, the case of learning of the input/output relation model $M_{1112}$ using online learning is described with reference to the flowchart in FIG. 51.

The online learning of the learning of the input/output relation model $M_{1112}$ is started when the sensor motor data of a given length used for the input/output relation model $M_{1112}$ is obtained.

That is to say, first in step S1021, with the sensor motor data serving as the input data and output data, the input data of the frame at point-in-time t and the output data of the frame at the next point-in-time t+1 are extracted while shifting the point-in-time t at the start of the frames in the direction from the start toward the end thereof.

Then in step S1022, learning (updating) of the input network $net_{11}$ is performed using the input data of the frame at point-in-time t, and also learning (updating) of the output network $net_{12}$ is performed using the output data of the frame at point-in-time t+1.

Next, in step S1023, using the input firing pattern as to the input data of the frame at point-in-time t and the output firing pattern as to the output data of the frame at point-in-time t+1, learning (updating) is performed of the inter-pattern correspondence information which corresponds the input firing pattern and the output firing pattern.

Following this, in step S1024, using the output data of the frame at point-in-time t+1, and the output firing pattern as to the output data thereof, learning (updating) is performed of the inter-pattern correspondence information which corresponds the output data and the output firing pattern.

Then point-in-time t is updated, and the processing in steps S1021 through S1024 is repeated until frames can no longer be extracted from the input data and output data serving as sensor motor data.

Note that with the present embodiment, the input/output relation model has been configured such that a time-sequence pattern storage network having a time-sequence pattern model 21 is used for the nodes, but the input/output relation model may also be configured using a known SOM having a weight vector with the same dimension as a vector serving as the input data (weight vector assigned to the nodes), instead of a time-sequence pattern model 21 for the nodes.

In the event of configuring an input/output relation model using known SOMs, the nodes represents a fixed-length time-sequence pattern of which the component of the weight vector is a sample value.

Also, in the case of configuring the input/output relation model using a known SOM, the number of dimensions of the weight vector of the nodes (the component numbers of the weight vector) needs to match the length T of the frame, and with regard to the scores of the nodes of the SOM as to the time-sequence data for each frame, for example, the distance between a vector having the sample values serving as components which configure the time-sequence data for each frame, and the weight vector of the nodes, can be used.

Further, with the present embodiment, the distribution of the scores of all nodes of the time-sequence pattern storage network has been set as the firing pattern, but instead of a distribution of the scores of all of the nodes, the distribution of the scores of the distance-restricted nodes can be used for the firing pattern. In the case of using the distribution of the scores of the distance-restricted nodes for the firing pattern, by setting the scores of the nodes other than distance-restricted nodes to 0, processing can be performed similar to the case wherein the distribution of the scores of all of the nodes of the time-sequence pattern storage network is used for the firing pattern.

Now, the input network $net_{11}$ and output network $net_{12}$ of the input/output relation model $M_{1112}$ may have the same number of nodes, links, and time-sequence pattern models 21 of the nodes, or these may be different, as with the case of the time-sequence pattern storage networks $net_{in}$ and $net_{out}$ of the input/output relation model shown in FIG. 19.

Further, in the case of performing learning of the input network $net_{11}$ and output network $net_{12}$ belonging to the input/output relation model $M_{1112}$ using the sensor motor data for each frame, and also using the same time-sequence pattern storage network serving as the input network $net_{11}$ and output network $net_{12}$, the learning results of the input network $net_{11}$ and output network $net_{12}$ are the same as one another, and therefore the input network $net_{11}$ and output network $net_{12}$ can be replaced by one time-sequence pattern storage network. In this case, the storage capacity necessary for storing one time-sequence pattern storage network (input network $net_{11}$ or output network $net_{12}$) can be conserved.

Next, the above-described series of processing can be carried out with dedicated hardware, or with software. In the event of performing the series of processing by software, the program configuring the software is installed in a general-use computer, a so-called built-in computer, etc.

FIG. 52 illustrates a configuration example of an embodiment of the computer to which a program for executing the above-described series of processing is installed.

The program may be stored in a hard disk 10105 or ROM 10103 serving as a recording medium, built into the computer, beforehand.

Or, the program may be temporarily or permanently stored (recorded) in a removable recording medium 10111 such as a flexible disk, CD-ROM (Compact Disc Read Only Memory), MO (magneto-optical) disk, DVD (Digital Versatile Disc), magnetic disk, semiconductor memory, or the like. Such removable recording media 10111 can be provided as so-called packaged software.

Note that the program is not restricted to being installed to a computer from a removable recording medium 10111 such as described above, by may also be wirelessly transmitted to the computer from a download site via a digital satellite broadcasting satellite, or transmitted to the computer by cable via a network such as the Internet or the like. At the computer, the program transferred thereto in this way can be received with a communication unit 10108 and installed in the built-in hard disk 10105.

The computer has built in a CPU (Central Processing Unit) 10102. The CPU 10102 is connected via a bus 10101 to an input/output interface 10110, and upon commands being input via the input/output interface 10110 by a user operating an input unit 10107 made up of a keyboard, mouse, microphone, or the like, the CPU 10102 executes the programs stored in ROM (Read Only Memory) 10103 in accordance therewith. Also, the CPU 10102 loads to RAM (Random Access Memory) 10104 the program stored in the hard disk 10105, the program transmitted by satellite or network and received at the reception unit 10108 and installed in the hard disk 10105, or the program read out from the removable recording medium 10111 mounted to a drive 10109 and installed to the hard disk 10105, and executes the program. Thus, the CPU 10102 performs processing according to the above-described flowcharts, or processing performed according to the configuration of the above-described block diagrams. The CPU 10102 further outputs the processing results from an output unit 10106 configured of an LCD (Liquid Crystal Display) or speakers or the like, for example, via the input/output interface 10111, or transmits the processing results from the communication unit 10108, or further records the processing results in the hard disk 10105 or the like, as necessary.

Note that in the present specification, the processing steps described in the program for causing a computer to perform the various types of processing do not necessarily need to be performed in the time-sequence described in the flowcharts, and processing executed in parallel or individually is also encompassed in the scope of the present invention (e.g., parallel processing, or object-oriented processing).

Also, the program may be processed with a single computer, or may be processed in a scattered manner with multiple computers. Further, the program may be transferred to and executed at a remote computer.

Also, it should be noted that motor data includes not only data for driving the motor, but a broad range of data for driving devices externally acting or devices providing external stimuli. Examples of devices acting externally or devices providing external stimuli include a display for displaying images by emitting light, a speaker for outputting audio, and so forth, and accordingly motor data includes, besides data for driving motors, image data corresponding to images to be displayed on a display, audio data corresponding to audio to be output from a speaker, and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing device for processing time-sequence data, said data processing device comprising:

data extracting means for extracting time-sequence data for a predetermined time unit from time-sequence data; and processing means of a control unit for obtaining scores for nodes of an SOM (Self-Organizational Map) configured from a plurality of nodes provided with a spatial array configuration, said scores showing the applicability to time-sequence data for a predetermined time unit of the nodes, wherein the node with the best score thereof is determined to be the winning node which is the node most applicable to time-sequence data for a predetermined time unit;

said processing means obtaining scores as to the time-sequence data for one predetermined time unit only regarding a distance-restricted node wherein the distance from the winning node as to the time-sequence for a predetermined time unit immediately preceding the time-sequence data of one predetermined time unit is within a predetermined distance;

and wherein, of said distance-restricted nodes, the node with the best said score is determined to be the winning node as to the time-sequence data for said one predetermined time unit.

2. The data processing device according to claim 1, wherein said processing means further updates said SOM in a self-organizing manner, based on said winning node.

3. A data processing method of a control unit for processing time-sequence data, said method including the steps of:

data extracting for extracting time-sequence data for a predetermined time unit from time-sequence data; and processing for obtaining scores for nodes of an SOM (Self-Organizational Map) configured from a plurality of nodes provided with a spatial array configuration, said scores showing the applicability to time-sequence data for a predetermined time unit of the nodes, wherein the node with the best score thereof is determined to be the winning node which is the node most applicable to time-sequence data for a predetermined time unit;

wherein, in said processing, scores are obtained as to the time-sequence data for one predetermined time unit, only regarding a distance-restricted node wherein the distance from the winning node as to the time-sequence for a predetermined time unit immediately preceding the time-sequence data of one predetermined time unit is within a predetermined distance;

and wherein, of said distance-restricted nodes, the node with the best said score is determined to be the winning node as to the time-sequence data for said one predetermined time unit.

4. A program embodied on a computer readable medium to be executed by a computer, wherein data processing for processing time-sequence data includes the steps of:

data extracting for extracting time-sequence data for a predetermined time unit from time-sequence data; and processing for obtaining scores for nodes of an SOM (Self-Organizational Map) configured from a plurality of nodes provided with a spatial array configuration, said scores showing the applicability to time-sequence data for a predetermined time unit of the nodes, wherein the node with the best score thereof is determined to be the winning node which is the node most applicable to time-sequence data for a predetermined time unit;

wherein, in said processing, scores are obtained as to the time-sequence data for one predetermined time unit, only regarding a distance-restricted node wherein the distance from the winning node as to the time-sequence for a predetermined time unit immediately preceding the time-sequence data of one predetermined time unit is within a predetermined distance;

and wherein, of said distance-restricted nodes, the node with the best said score is determined to be the winning node as to the time-sequence data for said one predetermined time unit.

5. A data processing device for processing time-sequence data, said data processing device comprising:

a data extracting unit operable to extract time-sequence data for a predetermined time unit from time-sequence data; and a processing unit of a control unit operable to obtain scores for nodes of an SOM (Self-Organizational Map) configured from a plurality of nodes provided with a spatial array configuration, said scores showing the applicability to time-sequence data for a predetermined time unit of the nodes, wherein the node with the best score thereof is determined to be the winning node which is the node most applicable to time-sequence data for a predetermined time unit;

said processing unit obtaining scores as to the time-sequence data for one predetermined time unit, only regarding a distance-restricted node wherein the distance from the winning node as to the time-sequence for a predetermined time unit immediately preceding the time-sequence data of one predetermined time unit is within a predetermined distance;

and wherein, of said distance-restricted nodes, the node with the best said score is determined to be the winning node as to the time-sequence data for said one predetermined time unit.

* * * * *